United States Patent [19]

Katz

[11] Patent Number: 5,259,023
[45] Date of Patent: * Nov. 2, 1993

[54] TELEPHONIC-INTERFACE STATISTICAL ANALYSIS SYSTEM

[75] Inventor: Ronald A. Katz, Los Angeles, Calif.

[73] Assignee: First Data Resources Inc., Omaha, Nebr.

[*] Notice: The portion of the term of this patent subsequent to Dec. 20, 2005 has been disclaimed.

[21] Appl. No.: 803,264

[22] Filed: Dec. 3, 1991

Related U.S. Application Data

[60] Division of Ser. No. 640,337, Jan. 11, 1991, which is a continuation of Ser. No. 335,923, Apr. 10, 1989, which is a continuation of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^5$ .................... H04M 1/64; H04M 1/66; H04M 11/08
[52] U.S. Cl. ........................... 379/88; 379/91; 379/92; 379/97; 379/101; 379/127; 379/196; 379/214
[58] Field of Search ............ 379/88, 89, 67, 92, 379/97, 207, 127, 142, 247, 246, 245, 201, 265, 266, 196, 91, 101

[56] References Cited

U.S. PATENT DOCUMENTS

| | | | |
|---|---|---|---|
| 4,071,698 | 1/1978 | Barger et al. | 379/92 |
| 4,290,141 | 9/1981 | Anderson et al. | 455/2 |
| 4,320,256 | 3/1982 | Freeman | 379/73 |
| 4,451,700 | 5/1984 | Kempner et al. | 379/92 |
| 4,517,410 | 5/1985 | Williams et al. | 379/73 |
| 4,539,435 | 9/1985 | Eckmann | 379/76 |
| 4,566,030 | 1/1986 | Nickerson et al. | 358/84 |
| 4,577,062 | 3/1986 | Hilleary et al. | 379/88 |
| 4,577,067 | 3/1986 | Levy et al. | 379/101 |
| 4,580,012 | 4/1986 | Matthews et al. | 379/89 X |
| 4,598,367 | 7/1986 | DeFrancesco et al. | 364/408 |
| 4,611,094 | 9/1986 | Asmuth et al. | 379/201 X |
| 4,649,563 | 3/1987 | Riskin | 379/97 |
| 4,756,020 | 7/1988 | Fodale | 379/112 |
| 4,763,191 | 8/1988 | Gordon et al. | 358/86 |
| 4,785,408 | 11/1988 | Britton et al. | 379/88 X |
| 4,866,756 | 9/1989 | Crane et al. | 379/88 |
| 4,908,850 | 3/1990 | Masson et al. | 379/88 |
| 4,942,616 | 7/1990 | Linstroth et al. | 381/51 |
| 4,996,705 | 2/1991 | Entenmann et al. | 379/91 |

Primary Examiner—Thomas W. Brown

[57] ABSTRACT

A system D interfaces with a multiplicity of individual terminals T1-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

27 Claims, 6 Drawing Sheets

FIG. 2

| CALLER'S TELEPHONE NUMBER AND INITIALS | DATA: AGE, WEIGHT---PULSE | CALL RECORD SEQUENCE | ASSIGNED DESIGNATION | ACKNOWLEDGE DIGITS |
|---|---|---|---|---|
| 627-2222-53 | 47 176--------77 | 4951 | 4951/684 | 6173 |

| CARD TYPE | CARD # | CARD EXP. DATE | CUST. # | NAME ADDRESS DATA | ITEM 1 | COLOR SIZE CODE | ACKNOWLEDGE DIGITS |
|---|---|---|---|---|---|---|---|

| CALLER'S TELEPHONE NUMBER | USES/MONTH | TIME | I.D. DATA | DESIGNATION | QUESTION ANSWERS |
|---|---|---|---|---|---|

201 / 202 / 204 / 206 / 208 / 210

200

TELEPHONIC-INTERFACE STATISTICAL ANALYSIS SYSTEM

BACKGROUND AND SUMMARY OF THE INVENTION

This is a divisional of application Ser. No. 07/640,337 filed Jan. 11, 1991 and entitled "Telephonic-Interface Statistical Analysis System" which is a continuation of application Ser. No. 335,923 filed Apr. 10, 1989 and entitled "Telephonic-Interface Statistical Analysis System" which is a continuation of application Ser. No. 194,258 filed May 16, 1988 and entitled "Telephonic-Interface Statistical Analysis System," now U.S. Pat. No. 4,845,739 issued Jul. 4, 1989, which is a continuation-in-part of application Ser. No. 018,244 filed Feb. 24, 1987, and entitled "Statistical Analysis System For Use With Public Communication Facility," now U.S. Pat. No. 4,792,968, issued Dec. 20, 1988, which was a continuation-in-part of application Ser. No. 753,299 filed Jul. 10, 1985 and entitled "Statistical Analysis System For Use With Public Communication Facility," now abandoned.

Various forms of publicly accessible communication systems for providing access to a central station have been proposed, some involving telecommunications. However, sometimes a need for ancillary functions arise in that regard, e.g. it may be desirable to positively identify a large group of persons, as a demographically controlled group, or a specifically entitled group, then statistically analyze data from the group so as to accurately identify certain persons in the group and select a subset of at least one person. Specifically, it may be desirable to obtain medical data from an entitled group of people, to correlate such data, perhaps introduce external data, then identify a select subset of the group. In that regard, a need exists for an improved, effective, economical, and expedient system of telecommunication incorporating means for performing qualification, identification, analysis and selection of individual persons.

It has been proposed to interface persons at telephone calling stations directly with a computer facility. In accordance with such arrangements, recorded voice messages prompt callers to provide data by actuating the alphanumeric buttons that are conventionally employed for dialing from one telephone station to another. In one prior arrangement, a caller may actuate dialing buttons to selectively attain a communication channel or to address specific information in a computer. In another arrangement, dialing buttons may be actuated to specify a billing designation as for requested services. Generally, such systems are believed to have been somewhat limited in scope, often involving difficulties that are frustrating or confusing to a caller. Nevertheless, such techniques have been widely used to enhance and broaden communication.

In general, the present invention comprises a telephonic-interface system and related process for selectively utilizing both analog (voice) and digital telephonic communication in a variety of different interface formats or programs, as to select or qualify a set of callers, enable positive identification of at least certain of the callers in the set, acquire data from callers in the set, statistically analyze acquired data, as in combination and in association with external data (time independent), and accordingly to isolate a subset of the callers with verifiable identification. That is, the external data (separate from caller-provided data) may be introduced at any of a variety of different times in relation to the caller data.

For example, a voice origination apparatus may prompt individual callers who (after qualification) provide select digital data to develop a record for further processing either immediately, upon the evolution of a defined set of callers or upon the establishment of select external data. Thus, following a qualification phase, the information acquisition phase may be concurrent or consecutive with respect to the processing phase. When appropriate, abort capability allows a caller to remain "off hook" and go to analog (vocal) communication. The caller then interfaces directly with an operator.

The system of the present invention may qualify an entitled set of callers, then receive answer data in the course of the call and develop identification or designation data, sequence data and statistical data. The system may then provide data cells for storing individual data while assigning confirmable identifications to the entitled set. From the set, a subset is defined. That is, in accordance with various formats, acquired data is processed in statistical relationship, or in relation to applied external data to accomplish such functional operating formats as an auction sale, a contest, a lottery, a poll, a merchandising operation, a game, and so on.

A variety of memory techniques are used to selectively activate the voice origination apparatus. Accordingly, statistical analysis and selection can be effectively and economically accomplished with respect to a substantial set of callers who are accommodated individual communication through a telephone system.

BRIEF DESCRIPTION OF THE DRAWINGS

In the drawings, which constitute a part of this specification, exemplary embodiments exhibiting various objectives and features hereof are set forth, specifically:

FIG. 2 is a fragmentary diagrammatic representation of a storage cell format as may be developed in the system of FIG. 1;

FIG. 5 is a fragmentary diagrammatic representation of a storage cell format as may be developed in the system of FIG. 1 with the processor of FIG. 4;

FIG. 7 is a diagrammatic representation of a storage cell format as may be developed in the system of FIG. 4;

DESCRIPTION OF THE ILLUSTRATIVE EMBODIMENTS

As required, detailed illustrative embodiments of the present invention are disclosed herein. However, physical communication systems, data formats, and operating structures in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
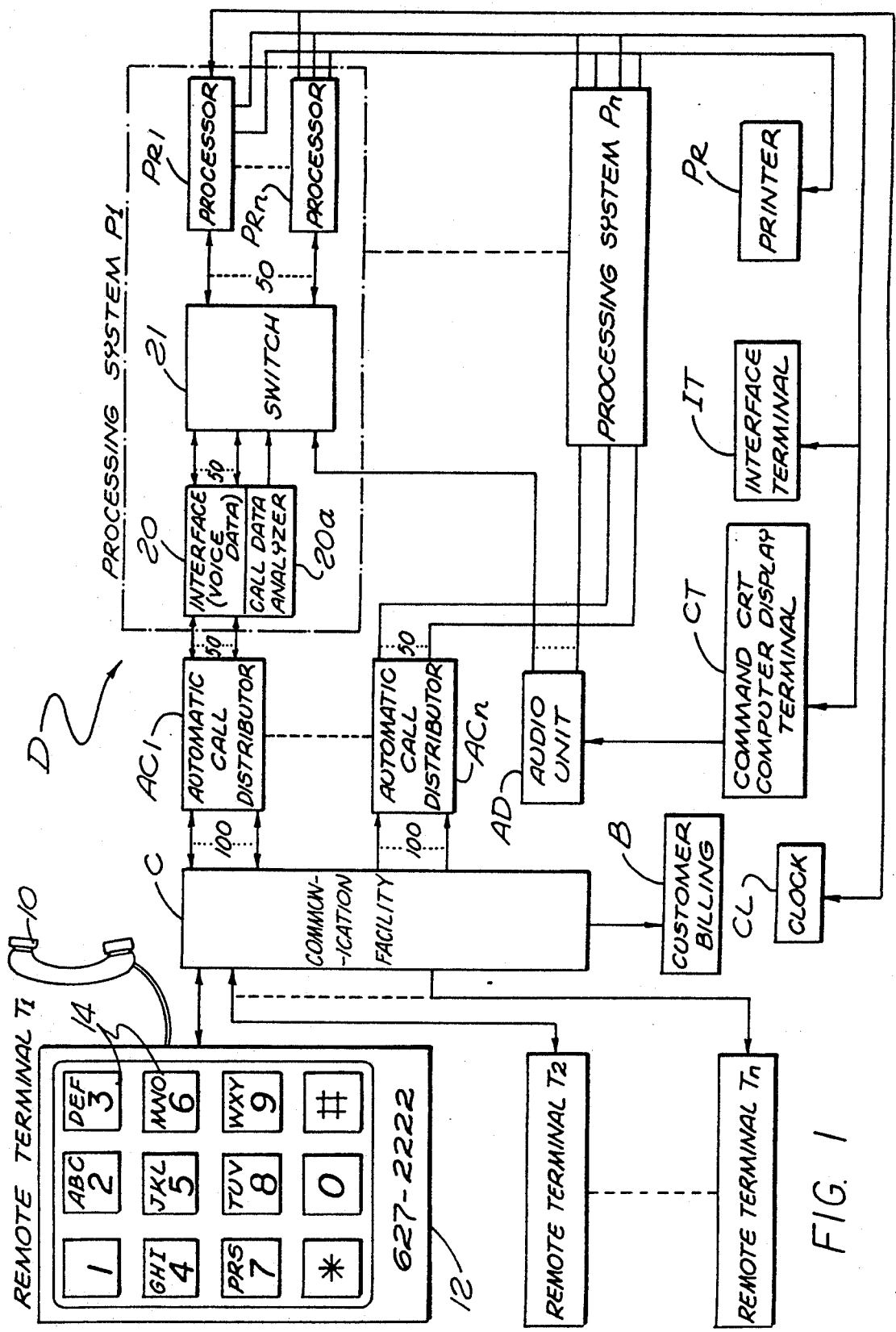
FIG. 1 is a block diagram of a system constructed in accordance with the present invention.

Referring initially to FIG. 1, a series of remote telephone-instrument terminals T1 through Tn are represented (left). The terminals are generally similar, and accordingly, only the terminal T1 is illustrated in detail.

In the disclosed embodiment, the remote terminals T1 through Tn represent the multitude of conventional telephone terminals that are coupled to a communication facility C which may take the form of a comprehensive public telephone system for interconnecting any associated terminals T1-Tn. In accordance with the present system, the terminals T1-Tn operate through the communication facility C to be coupled with a central station D, an embodiment of which is illustrated in some detail.

Generally in accordance with the present development, individual callers use the individual telephone stations T1 through Tn to interfac  ation D through the communication facility C. Callers may be screened or qualified. Also in accordance herewith, the data of individual callers may be collected, correlated and tested in the station D for processing in accordance with various programs and external data. As a consequence, various objectives are accomplished. For example, a select subset of the callers may be isolated and specifically identified, or related data may be processed, or transactions may be actuated. The possibilities for application of the system are substantial and varied as will be apparent from the exemplary structure and functions as described in detail below.

In one operating process format, the public might be polled with regard to locating the specific purchasers of a defective or dangerous product. Alternatively, the public might be polled with the objective of locating persons susceptible to a specific ailment or disease. Public auctions of unprecedented participation are possible. Legal lotteries are enabled that are interesting, effective and very economical on an individual participant basis. The system also might be employed in various game formats or to automate a promotion or mail-order operation, even to the extent of including inventory control as detailed below.

In each functional operating format, the callers may be variously qualified on the basis of entitlement and may be identified for subsequent verification. The callers then may be prompted, either through the interface or externally, to provide appropriate data.

Considering the system of FIG. 1 in somewhat greater detail, it is to be understood that the communication facility C has multiplexing capability for individually coupling the terminals T1-Tn to the central station D on request. In the illustrative embodiment of the system, the communication facility C comprises a public telephone network and the individual terminals T1-Tn take the various forms of existing traditional or conventional telephone instruments.

The exemplary telephone terminal T1 is represented in some detail to include a hand piece 10 (microphone and earphone) and a panel 12 provided with a rectangular array of push buttons 14 in the conventional configuration. Of course, the hand piece 10 accommodates analog signals while the panel 12 is a digital apparatus.

Generally in accordance herewith, the hand piece 10 serves to manifest analog signals vocally to the caller.

In accordance with conventional telephone practice, alphabetic and numeric designations are provided on the buttons 14. For example, several of the buttons 14 carry three letters along with a decimal digit. Specifically, the button designated with the numeral "2" also carries the letters "A", "B" and "C". In that manner, the buttons 14 encompass the numerals "0-9", two symbols, and the alphabet except for the letters "Q" and "Z". Consequently, the buttons 14 accommodate the entry of decimal data, and to some extent alphabetic data.

The buttons 14 designated with symbols "*" and "#", along with the numeral "0", can be used by predetermined assignment to represent the letters "Q" and "Z" or any of a variety of other data or command components. Generally, in accordance herewith, the buttons 14 are employed to formulate digital data at the central station D in various formats determined by the instant specific use and operating format of the system.

Considering the central station D in somewhat greater detail, the communication facility C is coupled to interface a series of processing systems P1 through Pn (FIG. 1, left). Specifically, the communication facility C is connected to the processing systems P1-Pn through an associated series of automatic call distributors AC1 through ACn. Each of the automatic call distributors AC1-ACn accommodates one hundred lines from the communication facility C and accordingly, may accommodate and queue up to 100 calls.

Each of the automatic call distributors AC1-ACn may take various forms as well know in the prior art, functioning to queue incoming calls for connection to a lesser number of lines. In the disclosed embodiment, from each of the call distributors AC1-ACn, fifty lines are connected respectively to the individual data processing systems P1-Pn through an interface 20 and a switch 21. Thus, in the disclosed embodiment, each of the automatic call distributors AC1-ACn can accommodate one hundred lines, fifty of which may be active in association with one of the processing systems P.

The processing systems P1-Pn are similar, therefore, only the processing system P1 is shown in any detail. Collectively, the processing systems P1-Pn are interconnected with a command computer terminal CT, at least one interface terminal IT, at least one printer PR and an audio unit AD. The command terminal CT is separately coupled to the audio unit AD.

As represented, the processing systems P1 through Pn each contain a number of individual function units or processors PR1 through PRn. Although various other configurations and arrangements may be employed, the explanation is facilitated by including a plurality of individual function units as treated in detail below.

Considering the processing system P1, fifty lines from the automatic call distributor AC1 are connected to the interface 20, an exemplary form of which may be a commercially available Centrum 9000 unit. The interface 20 incorporates modems, tone decoders, switching mechanisms, DNIS and ANI capability (call data analyzer 20a) along with voice interface capability. Note that the interface may actually perform analysis on data. However, to preserve the disclosed embodiment manageable, major analysis is explained with reference to processors.

Generally, DNIS capability is a function of the communication facility C (composite telephone system) to provide called terminal digital data indicating the called number. ANI capability is a similar function whereby the digital data indicates the calling number with calling terminal digital signals. Both capabilities are available for use with equipment as the interface 20 and to provide control through the call data analyzer 20a.

Accommodating up to fifty independent calls on separate communication paths to the central station D, the interface 20 is capable of providing analog (voice) signals to prompt each caller. Also accommodated are digital signals including the DNIS and ANI signals. The system contemplates the possibility of utilizing sequences of lines in rotary as well as blocking sequences of lines, the numbers for which command a particular program or operation format of a function unit as disclosed in detail below.

The interface 20 provides the connection of the fifty lines to a switch 21 which is in turn coupled to fifty function units, or processors PR1-PRn. As indicated above, multiple function units, or processors, are described in the disclosed embodiment to facilitate the explanation. Of course, non-parallel techniques and multiplexed operations might well be employed as alternatives. For a similar reason, as disclosed herein, each of the processors PR1-PRn includes memory cells for each of the callers' individual data. Development and compilation of data in such cells according to various operating formats is described below. In the disclosed embodiment, the processors PR1-PRn are connected collectively to the command computer terminal CT (incorporating a CRT display), the interface terminal IT, and the printer PR. Note that the CRT display serves to visually display data regarding select subsets as explained in detail below.

Exemplary detailed structures for the processors PR1-PRn are described below; however, in general, the units may comprise a microcomputer, for example, programmed as suggested above and as disclosed in detail below to accomplish specific operating formats. As an integral part of such formats, a caller may be qualified as belonging to an entitled set of persons or to accommodate specific demographic objectives. Also, callers may be designated both with respect to their significance and their identification. For example, callers may have different significance in a format, depending on the time or sequence of their call. Also, the designation of a caller may be exceedingly important in relation to the caller eventually being isolated as part of a subset, the members of whom must be accurately verified. As described below, the designations may involve multiple elements which may include: random number assignments, encryption techniques, utilization of calling numbers, identification data, sequence of call and so on to facilitate reliable verification. Note that the communication facility C has a customer billing structure B that is interfaced by the system.

On the qualification and designation of callers, the system enters a data accumulation phase during which digital data (formatted at one of the telephone terminals T1-Tn is processed by one of the processors PR1-PRn. In general, the processing evolves a subset (at least one caller) the members of which may be verified and confirmed.

Either during the data accumulation phase, or after the processing phase to isolate a subset, a distinct operation may involve actuating the interface terminal T1 for direct local communication between the caller and an operator at the terminal T1. Another distinct operation may involve actuation of the printer PR to provide documents in relation to the operating format, as for providing award certificates as for verifying members of an isolated subset. Also, charge slips may be generated containing at least part of the data of a particular transaction.

An appreciation of the philosophical operation of a system in accordance with the present invention may now be enhanced by considering an exemplary operation of the illustrative embodiment of FIG. 1 to isolate a subset of people who are susceptible to a particular disease or infirmity. The exemplary operation might involve a geographical area, as a large city or population center, in which a particular health problem is somewhat acute. For example, a major population center might be polled where coronary artery disease is a significant problem. Accordingly, persons most susceptible to such disease could be identified for corrective recommendations.

People of the population center could be informed of the availability of a service for statistical health analysis. Accordingly, persons interested in their individual statistical situation would be motivated to utilize the service. Specifically, individual callers would use the remote terminals T1-Tn to contact the central station D through the communication facility C and thereby provide personal information that would enable a statistical analysis in relation to existing data so as to isolate and inform (either real time or batch basis) those persons statistically most likely to be in need of corrective measures. In such applications, it may be important that the caller's identity be subject to reliable verification. Other applications or programs also may present a critical need for positively verifiable identification to the extent that credit card numbers and/or personal identification numbers may be employed.

Figure 3:
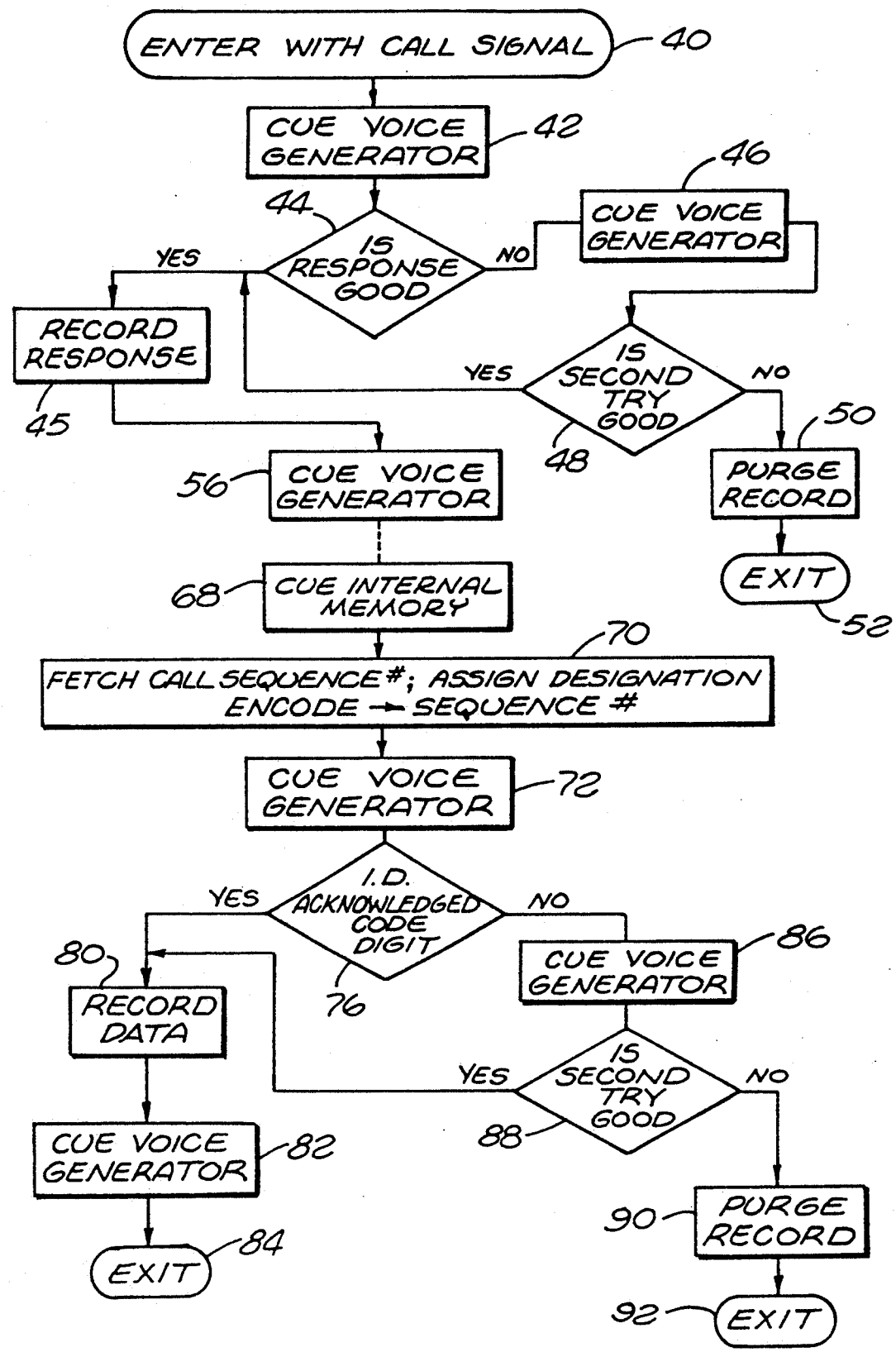
FIG. 3 is a flow diagram of one operating format of the system of FIG. 1.

An exemplary operation of the system, with regard to a specific caller, will now be treated referring somewhat concurrently to FIGS. 1, 2 and 3. As indicated above, FIG. 2 indicates a data storage format for a memory cell in an exemplary processor PR and now will be considered with regard to an operating format in which data is composed for a caller. Pursuing the above example, assume the existence of a caller at the remote terminal T1 (telephone number (213) 627-2222) who wishes to pursue health-related information on the basis of statistical analysis. The caller lifts the hand piece 10 and in accordance with conventional techniques actuates the push buttons 14 to call for a select operating format, e.g. telephone number (213) 627-3333 and thereby establish communication through the facility C with a designated function unit in the central station D. Receiving the call signal, the automatic call distributor AC1 associates the called number ((213) 627-3333, rendered available using standard telephone DNIS techniques) through the interface 20 and the switch 21 to attain connection with the specific processor, e.g. the processor PR1 formatting the health-related program. Accordingly, the processor PR1 cooperates with the interface 20 to cue the interface 20 to operate as a voice generator.

The sequence of operations is represented to be initiated in FIG. 3 by the "enter" block 40 which is accordingly followed by a "cue voice generator" command block 42. If the ANI equipment is not employed, the voice generator in the interface 20 formulates speech, a representative form of which might be: "Thank you for participating in the coronary artery disease statistical analysis. Please give us your telephone number by actuating the call buttons on your telephone instrument."

Acting on the instructions, the caller would push the buttons 14 in sequence to indicate his telephone number, e.g. "(213) 627-2222". Alternatively, the interface 20 can accept the calling number ((213) 627-2222) according to its provision by standard ANI equipment of the communication facility C.

The resulting data signals are communicated from the interface unit 20 (FIG. 1) to the processor PR1 for testing the telephone number as valid or entitled. Essentially, the format of a proper number prompts production of a valid or "good" signal. The test is indicated by the block 44 (FIG. 3). If the response is not valid or entitled, for example contains an inappropriate number of digits or has been used to a point of excess, the operation of block 46 is initiated again cuing the voice generator 30 (FIG. 1). The voice generator accordingly instructs the caller, e.g.: "You have not entered a proper telephone number. Please reenter your telephone number by pressing the appropriate call buttons." The caller is then allotted a predetermined period of time to make a proper entry with the consequence that the system moves to a test operation as indicated by the block 48 (FIG. 3). Specifically, block 48 poses the query: "Is the second try good?"

If the caller is again unsuccessful, the system purges the record as indicated by the block 50 and the call is terminated as indicated by the block 52. In an alternative mode, the processor PR1 may abort the interface and couple the interface terminal IT for direct personal communication with the caller. The interchange would then proceed, person-to-person.

If the caller responds with a proper telephone number, the operation proceeds. Specifically, the system sequences to record the response of the proper telephone number as indicated by the block 45. That is, the caller's telephone number is recorded in an assigned specific memory cell identified with the caller. The format of the cell Cl is indicated in FIG. 2. The first portion, section 53, contains a form of identification data, i.e., the caller's telephone number, i.e. "(213) 627-2222".

Note that as explained above, if the second attempt to formulate a proper number is successful, as manifest by the block 48 (FIG. 3), the response is recorded at that stage. In either case, exiting from the block 54 (FIG. 3) invokes the next operation of again queuing the voice generator as indicated by the block 56.

As an alternative format, if a selective-group polling operation is performed, or callers are otherwise to be cleared for entitlement as mentioned above, a caller may be qualified by providing a "one-time" key number. The processor PR1 may incorporate a look-up table for proper key numbers which numbers may be coded using any of a wide variety of techniques. As a simple illustrative example, the key may comprise a precise number of digits that always total a particular numerical value.

The system proceeds after the caller is qualified. Specifically, the cue to the voice generator of the interface 20 (FIG. 1) as represented by the block 56 produces a request for further information from the caller with further identification data and answer data. For example, the voice generator might request information by stating: "Please use the telephone buttons to indicate initials of your name."

The detailed operation is not represented in FIG. 3 as it is similar to the operation illustrated by the blocks 42 through 54. However, again, a proper response is registered in the storage cell Cl as illustrated in FIG. 2 by the number "53" also registered in the first section 53 of the cell.

The cycle of obtaining digital information from the caller next is repeated with respect to answer data, i.e. specific health data. For example, as illustrated in FIG. 2, the next section 58 in the cell Cl receives an accumulation of health data, including the caller's age, weight, ..., pulse rate, and so on. Representative digital numbers are illustrated in FIG. 2.

During the course of the telephonic communication, the processor PR1 formulates identification data for the caller specifically including: the chronological sequence of the call, the assigned designation of the call, and a set of acknowledgment digits for the call. Such data identification is registered in the caller's assigned cell Cl in accordance with the format of FIG. 2 being stored in sections 62, 64 and 66. Note that the data may be stored in a coded interrelationship. For example, the acknowledgment digits may be related to the call record sequence. In the illustrative example, the chronological order number of the caller is 4951. The acknowledge digits may be derived from the sequence number. For example, as illustrated, a coded relationship may be established by adding "two" to each of the individual record sequence digits. Considering the example numerically:

|  | 4951 |
|---|---|
|  | 2222 |
| Adding without propagated carries: | 6173 |

Note that the confirmation data as acknowledgement digits can be extremely important, as to communicate with an isolated member of a subset. For example, identification could be published or circulated, as by a television broadcast, then respondents checked by use of confirmation data that may be confidential.

Continuing with the above example, the call chronological sequence registered for the caller is 4951 as represented in the section 62 while the acknowledge digits are 6173 as registered in the section 66. Additionally, the processor PR1 develops an assigned designation number, e.g. designation "4951684", which is registered in the section 64, the acknowledge code or digits, e.g. 6173, being registered in the section 66. These values are formulated in accordance with conventional number techniques during the data acquisition phase. With the exemplary numerals formulated, the operation proceeds.

The processor PR1 (FIG. 1) cues the internal memory. That operation is indicated by the block 68 (FIG. 3). Thus, the processor PR1 fetches the call record sequence number, assigns a designation (if not previously assigned), and encodes the sequence number as the acknowledgment digits (if not previously accomplished). These operations are indicated by the block 70 (FIG. 3).

Next, the processor PR1 (FIG. 1) cues the voice generator in the interface 20, as indicated by the block 72 (FIG. 3) to provide information to the caller. Specifically, for example, the voice generator in the interface 20 (FIG. 1) might signal: "This transaction has been designated by the number 4951684, and is further identified by the acknowledgment digits 6173. Please make a record of these numbers as they will be repeated. Specifically, the designation number is 4951684. The acknowledgment digits are 6173. Please acknowledge this transaction by pressing your telephone buttons to indicate the acknowledge digits 6173." In various applications as those involving security, the order and acknowledgment of callers may be very important. Therefore, data for confirmation associated with the order is important.

The system next proceeds to the test mode as indicated by the block 76 (FIG. 3). If the caller provides the correct acknowledgment digits, the data is confirmed in the record as indicated by the block 80 and is registered in the cell Cl (FIG. 2). Additionally, the voice generator is sequenced as indicated by the block 82 (FIG. 3) to indicate the close of the communication and that the transaction is terminated as represented by the exit block 84.

In the event that a caller cannot confirm his acknowledgment digits, as indicated by the block 76, a repeat operation is performed as indicated respectively by the blocks 86 and 88. Specifically, the voice generator is queued for a second instructional message. In the event that the second attempt also fails, the data is purged and the call discounted as indicated by block 90 and an exit block 92. If the second try is successful (test block 88), as indicated by the block 80, the record is perfected as indicated above.

As a result of the likelihood of a large number of calls, as described above, data cells in the processors PR1-PRn (FIG. 1) are developed with specific information indicative of a statistical sampling of the populace of concern. The data of that statistical sampling may be self-generating of specific conclusions with respect to a subset of individuals, and/or supplemental data to clearly manifest a significant subset. For example, the data may indicate a significant departure from an assumed normal characteristic. Such data, accumulated from the polling may be considered by logic comparisons in the computer 22 to select the subset of persons who should be isolated.

In addition to the self-generating conclusions available from the received data, the system may involve the introduction of external data. In the physical fitness example, such external data might take the form of national statistical data. In any event, the processing operation usually involves comparison testing which compares caller data from individual memory cells of the processors P1-Pn (FIG. 1) with test data that is supplied through the command terminal CT.

In the above example, members of the public in general were invited to use the service. A number of alternatives exist which might well impact on the statistical analysis. For example, a list may be preserved by a use-rate calculator to implement a consumable key operation. That is, a user is qualified to a specific limited number of uses during a defined interval.

As another example, callers might be restricted to the purchasers of a specific product as a medical apparatus for measuring blood pressures, heart rates, or so on. In such situations, it will be apparent that the statistical data will be somewhat distorted from an average or normal sampling. Clearly, the processors P1-Pn can be programmed to take into account such considerations. In that regard, the processors might also verify identification data proffered by a caller. Such data might take the form of a credit card number or a personal identification number. Methods for verification of such numbers using computer techniques are discussed below.

Figure 4:
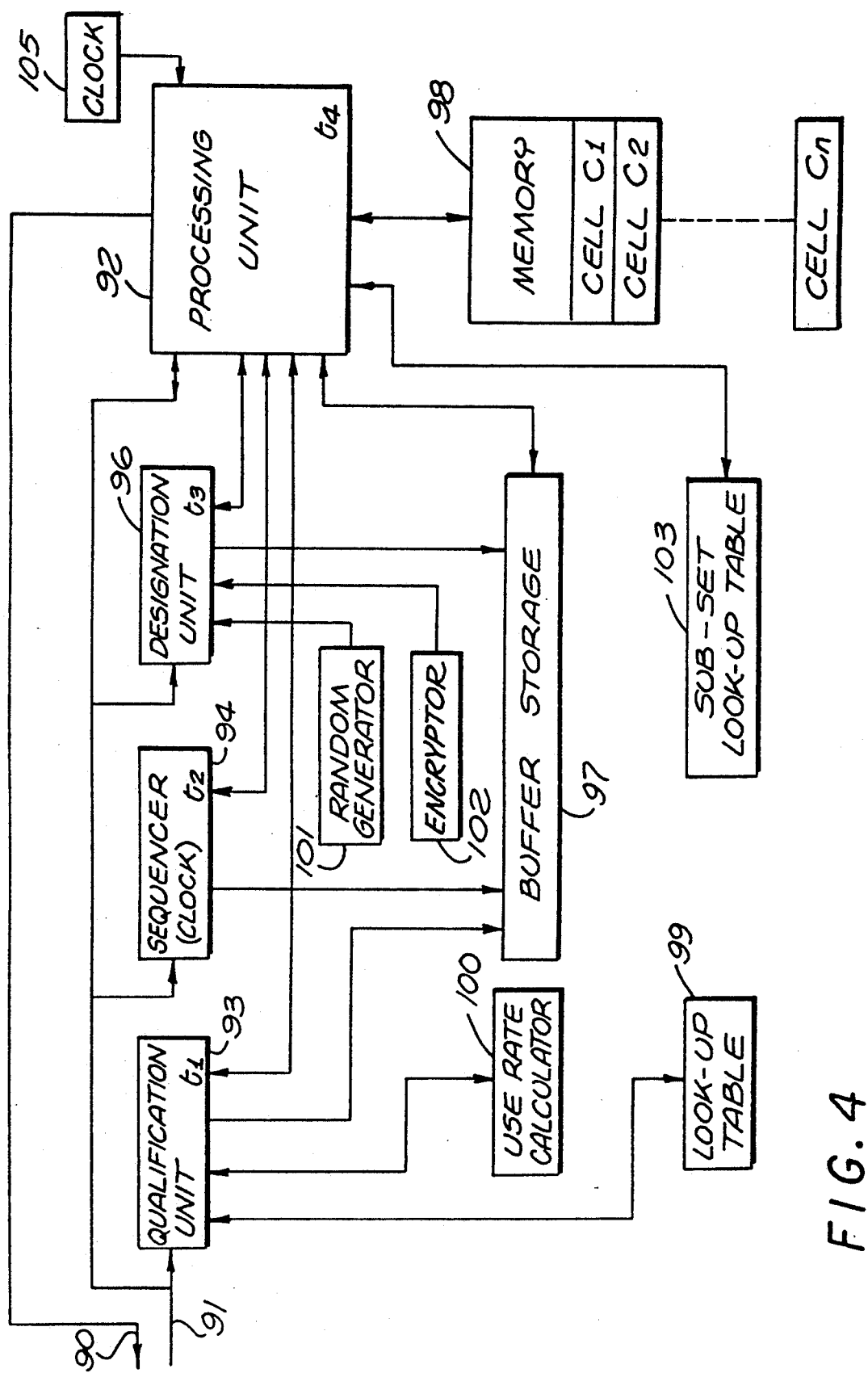
FIG. 4 is a block diagram of a form of processor or function unit as may be employed in the system of FIG. 1.

As indicated above and detailed below, the system can be programmed or formatted for use in a variety of applications. Preliminary to considering exemplary forms of such applications, reference will now be made to FIG. 4 showing an exemplary structural form for the processors PR1-PRn. From the switch 21 (FIG. 1) a pair of communication lines 90 and 91 are indicated in FIG. 4 (top left). The line 90 provides signals from a processing unit 92 while the line 91 provides signals to the processing unit 92 along with other components as represented in FIG. 4. The separate lines 90 and 92 facilitate explanation.

The processing unit 92 may take the form of a minicomputer programmed to accommodate the functions of various applications, as disclosed in detail below. As indicated above, the system may utilize a plurality of independent function units or processing units, e.g., processing unit 92, operating in a somewhat parallel configuration, or alternatively, a limited number of processors may be driven sequentially to accommodate the functional operations as described.

The input line 91 (upper left) is connected specifically to a qualification unit 93, a sequencer 94 and a designation unit 96, as well as the processing unit 92 as indicated above. The qualification unit qualifies access from a remote terminal T1-Tn to the processing unit 92 as described in detail below. In accordance with various applications or operating formats, the qualification unit 93, the sequencer 94 and the designation unit 96 operate preliminarily with respect to individual callers. Generally, these units qualify or test callers for entitlement, develop a sequence-of-calls record and provide forms of designations for callers that may be authenticated. As described in detail below, the units function in sequence to accomplish such operations and accordingly are each individually connected to the processing unit 92 and a buffer storage 97. Essentially, the buffer storage 97 is illustrated separately from the processing unit 92 along with the unit 93, sequencer 94, unit 96, and so on, again in order to facilitate the explanation. Similarly illustrated are a memory 98 (with cells C1-Cn), a look-up table 103 and a clock 105.

Considering the processor of FIG. 4 in further detail, the qualification unit 93 (upper left) is connected to a look-up table 99 and a use-rate calculator 100. The designation unit 96 (top center) is connected to a random number generator 101 and an encryptor 102.

In view of the above structural description of the system, consideration will now be given to certain specific applications in relation to the operation of the system. In that regard, the operation of the system will next be considered to automate a mail-order facility.

Assume that a caller at a terminal T1 (FIG. 1) dials a specific number to identify a mail order interface with the system of FIG. 1. For example, assume the telephone number "(213) 627-4444" for such an interface. Accordingly the caller dials the number at the remote terminal T1. As a result, the communication facility C couples the terminal T1 through the automatic call distributor AC1, the interface 20 and the switch 21 to a select processor PR1 identified and programmed for a mail-order operating format. Note that the communication facility C provides the dialed number ("(213) 627-4444") to the processing system P1 through well known telephonic equipment DNIS. Accordingly, a program is selected to execute the mail order interface.

As a preliminary action, a voice responder in the interface 20 might be cued by the processing unit to identify the mail-order house and indicate that the order will be taken by computer. Either before or after qualification, the caller might be advised that if he prefers to communicate directly with a person, or needs such contact at any point in the communication, he may accomplish it simply by pushing the asterisk button (*) at the terminal T1. Such action forms an abort signal that is detected by the processing unit 92 to transfer the communication to the interface terminal IT (FIG. 1). Alternatively, the customer may be asked by the voice generator to provide (by voice) detailed information as name, address, etc. which is recorded for later processing.

After the preliminary information is supplied to a caller, the qualification phase is initiated. For example, the interface 20 might actuate the terminal T1 to announce: "Please indicate the type of credit card you will use for your purchase by pushing the button number 'one' for Mastercharge, 'two' for . . . ".

The caller's response, indicating a specific credit card, will be stored in a data cell; however, the data is developed initially in the buffer 97. The format and data for the present example (in the buffer 97) will be explained with reference to a storage block format 104 as illustrated in FIG. 5. The first data block 130 accordingly registers a digit to indicate the card that will be used to support the caller's purchase.

Using voice prompt, the interface 20 next instructs the caller to use the telephone buttons to indicate his credit card number and the expiration date of the card. That data is stored in the register 104, specifically in the blocks 132 and 134 as illustrated in FIG. 5.

Next, the caller is asked for his customer number, as it may appear on his catalog. That number is stored in a block 136 of the block format register 104. Note that the caller may not be identified in the files of the mail-order house and in that event, the operation may be shifted to a manual operation to be continued through the interface terminal IT (FIG. 1) as explained above. For a television-initiated mailorder transaction, other numerical codes might be employed as to key into broadcast schedules. For example, a code might be used to indicate program times and thereby enable evaluation of the productivity of such program times. Such operation may be performed during the designation phase as described below.

To continue with the explanation of the automated format, assume that the customer has a file customer number and that it is stored in the block format register 104 along with his credit card number and expiration date. From that location, the data is checked by the qualification unit 93 (FIG. 4) for propriety as part of the test or qualification phase of operation. The check or test is in two stages and both are performed during an interval designated t1, the qualification unit 93 operating under control of the processing unit 92.

First, the data is verified as representing valid and proper data formats for the customer's number, the credit card number and expiration date. The second operation involves consulting a so-called negative list to assure that the identified card and customer's number have not been cancelled, as for example in the case of credit cards that have been lost or stolen. Detailed structure for such tests is described in the parent case from which this case continues and may be incorporated in the qualification unit 93.

With the successful completion and verification of the preliminary data in the block format register 104, the qualification phase of operation is concluded and the system next interfaces with the caller to acquire and process data for a specific order of merchandise. Note that in the mail-order operating format, the sequence of the call is not normally significant. However, the sequencer 94 may log the time during a period t2 if deemed worthwhile.

Somewhat as described above in relation to the initial operating format (health poll), the voice generator in the interface 20 prompts the caller through a series of exchanges that load the storage block format register 104 with a merchandise order. Thus, as purchase items are confirmed, the register 104 is loaded as exemplified by the blocks 140 and 142. The interchange continues until the customer indicates he does not wish to order any additional items. The system then operates the designation unit 96 (FIG. 4) during the interval t3 to develop and announce the acknowledgement digits as stored in the block 144 (FIG. 5). The acknowledgement digits serve to identify the order both for the caller and the mailorder house. Accordingly, tracing is facilitated. The data (FIG. 5) is then transferred from the buffer 97 (FIG. 4) to a select memory cell C1-Cn.

During the next interval t4, the processing unit 92 (FIG. 4) isolates data of the cells C1-Cn to facilitate the mail-order process. In that regard, the processor 92 may incorporate structure and processing techniques as disclosed in the parent case.

Of the wide variety of other operating formats and applications in accordance herewith, further examples will now be described with reference to the systems of FIGS. 1 and 4. However, from a consideration of the operating formats treated below, it will be apparent that certain structural elements have reoccurring significance in the combination. Specifically, such elements include the structures: (1) utilizing the called number to select a specific operating format, (2) for screening or selecting callers who will be accepted based on various criteria, (3) for designating callers in a manner to enable subsequent positive identification and (4) various processing aspects of the data manipulations including the provision of at least a portion of certain ID data provided directly from the telephone apparatus. With respect to the data processing, distinctive elemental features include the utilization of external data not available during the interval of gathering data, the utilization of an interrelationship between the composite data collected during a data acquisition period, and the operation of utilizing time or sequence of callers to accomplish a subset.

As the next illustrative operating format, an instant lottery system will be described. Accordingly, assume the existence of a legalized state lottery accommodated by the telephone system utilizing a pay-to-dial number ("(213) 976-xxxx") and restricted to a limited number of uses for defined intervals of time. For example, a person might be entitled to play the lottery a limited number of times or to the extent of a limited dollar value during a predetermined interval.

From the terminal T1 (FIG. 1) the caller would actuate the push buttons 14 to establish contact with the processing system P1 coupling would be through the communication facility C, the automatic call distributor AC1, the interface 20 and the switch 21 as described in detail above. The initial operation then involves qualification of the caller to participate in the instant winner lottery. Again, ANI or caller interface techniques may be employed. If the caller is involved, the interface 20 is actuated by the qualification unit 93 during the operating interval t1 to instruct the caller: "Please key in your telephone calling number". As indicated above, an alternative involves the system simply registering the calling number on the basis of its provision by ANI equipment.

In any event, after the caller's telephone number is registered, the instruction is given: "Participation in instant winner lottery is for persons over twenty-one years of age. Accordingly, please key in the year of your birth". A driver's license or credit card number may be similarly registered to confirm age. Alternatively, the combination of telephone number and date of birth could be used. In any event, the caller's data is registered and the qualification unit 93 then functions to test the data as provided. Specifically, the caller's telephone number is checked in a look-up table 99 to determine whether or not it is a proper and currently a valid number for use in the lottery. Concurrently, the number is checked by the use-rate calculator 100 to determine the number of times it has been used in excess of a predetermined number of calls or dollar value to participate in the lottery during a current interval of monitoring.

If the data indicates a qualified caller, the system proceeds to the next phase of designating the transaction. Note that the sequence is not significant in this operating format with the consequence that the interval t2 and the operation of the sequencer 94 may be bypassed. Rather, the designation unit 96 operates during the interval t3 to provide the caller with a designation for the current transaction and if applicable, updates the file as to current use or dollar value remaining for the caller's use. As explained above, the random generator 101 with or without the encryptor 102 may be employed to create an identification number which may include an encrypted form of the caller's telephone number. Accordingly, data for the transaction is established in the buffer 97 then set in a cell of the memory 98 (FIG. 4). Specifically, the completed data cell format might be as follows: Telephone No.—Birth Year—Designation—Random No.

The system next functions to generate the random number as indicated above which will then be tested against a series of other numbers to determine whether or not the caller is a winner. In that regard, elements in the processing unit 92 which accomplish the operation are illustrated in FIG. 6 which will now be considered in detail.

A random number generator 160 functions on command to provide a three-digit number. With the consummation of a call, the random number generator 160 is actuated to provide the caller's random number in a selected caller cell 162. From that location, the caller's random number is compared with numbers from a register 164 by a comparator 166. The numbers in the register 164 were previously passed through a gate 174 from the generator 160. In the event of coincidence, the comparator provides an output "yes" signal to a line 168. Conversely, the failure of coincidence prompts the comparator 166 to provide a "no" output to a line 170. Essentially, a "yes" indicates a win while a "no" indicates the caller has lost.

Figure 6:
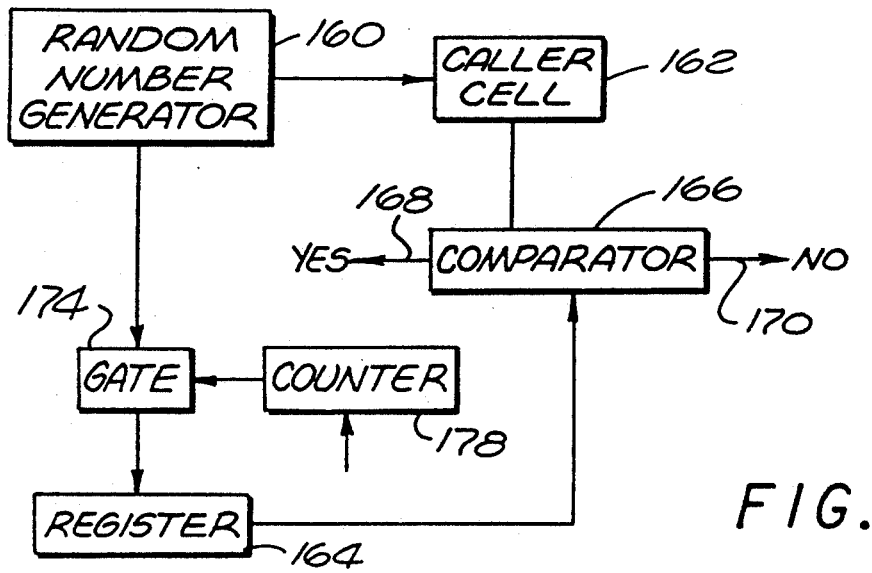
FIG. 6 is a block diagram of elements in an operating function unit of FIG. 4.

The elements of FIG. 6 provide a random operating format to determine winners on a somewhat statistical basis; however, the system increases the probability with the passage of time when no win occurs. In that regard, at the outset of an operating cycle, the random number generator 160 provides a random number that is passed through the gate 174 to the register 164. In the exemplary format, a three-digit number would be provided. At that stage, the caller's random number, from the cell 162, would be compared with the single number in the register 164 by the comparator 166. However, with the passage of time, calls are tallied or time is metered by a counter 178. Accordingly, upon the attainment of a predetermined count, the gate 174 is again qualified to enter another number in the register 164. Accordingly, an increasing set of numbers are held in the register 164 for comparison with each caller's number. Of course, the more numbers in the register 164, the higher probability of a caller winning and that relationship depends upon the duration or number of calls since the last winner.

Either a win or a loss as indicated within the processing unit 92 (FIG. 4) prompts the interface 20 to respond appropriately to the caller announcing his results. If there is a win, the designation may be reinforced and additional identification may be taken as explained above. Of course, if the prize simply involves a credit on the caller's telephone bill or his credit account, identification and designation become less critical considerations.

In the event of substantial awards to be claimed, the processing system P1 (FIG. 1) may actuate the printer PR to produce a positive identification of the winner, which document may be redeemed only by the caller providing the assigned designation along with confirmation of his identification data.

Generally in relation to awards, the processing unit 92 may also utilize a random number format for determining the significance of awards. That is, a random number may be actuated to provide numerals from one through twenty, for example, the magnitude of the number generated for a caller indicating the significance of his award. Normally such information would be provided to the caller and registered in his memory cell.

With respect to memory cells generally, it is to be noted that actuated memory cells may be cleared for callers who are not winners. Accordingly, a limited number of memory cells store the subset of winners for subsequent confirmation processing and so on.

As another operating process format in accordance with the present invention, consider an auction sale. As disclosed herein, the auction format is associated with television as, for example, in the form of a cable channel for dedicated use during an interval of an auction sale.

Preliminarily, in accordance with the disclosed exemplary format, persons wishing to participate in the auction sale would make preliminary arrangements involving utilization of the system to establish authorization data for qualified bidders in cells C1–Cn of the memory 98 (FIG. 4). In an alternative format, the bidders could simply be qualified immediately before bidding, as on the basis of a charge-card number or other identification.

Generally, it is contemplated that callers are coupled into the system only during the bidding on specific items of merchandise. Accordingly, some prequalification may be desirable to facilitate the rapid accumulation of a bidding group with the introduction of a unit of merchandise.

In accordance with the disclosed format, an auctioneer conducts the sale in a somewhat traditional manner, recognizing that he is interfacing a relatively large audience through the system of the present invention and with a television connection. Specifically, the auctioneer is cued as to audience reaction by a monitor incorporated in the command computer terminal CT (FIG. 1). Essentially, the auctioneer is given an abstract or summary of the relative bidding as the auction progresses. In one format, the caller sees the auction on a television receiver. That is, the monitor may be covered by a television camera to inform the audience and particularly interested bidders. Consider the detailed steps of the operation.

As the auctioneer announces the next item for sale, it is televised to potentially interested bidders. In addition to being informed of the merchandise, potential bidders might also be reminded of the telephone number for participating in the auction. Accordingly, any interested person at a remote terminal T1-Tn may dial the auction number and obtain access to the processing systems P1-Pn. The caller would have a television set available, tuned for example to a cable channel.

Any preliminary qualification as indicated above will then be performed along with any appropriate designation. With regard to the designation, unless callers are identified as part of the qualification step, the designation unit 96 (FIG. 4) assigns a limited-digit number to individual callers for use by the auctioneer interfacing the command computer and terminal CT. Further designation and sequencing as disclosed herein also constitute part of the process. To the extent that qualification and designation operations may be performed, the operations are performed as described above with reference to FIG. 4 by the qualification unit 93 and the designation unit 96. Of course, any of the safeguards and limitations as described herein may be employed as deemed appropriate for an auction format.

After the preliminaries, the auctioneer initiates the bidding with respect to a particular item that is observed by the callers on a television receiver as through a cable channel. Note that the audio may be variously coordinated through the telephone communication facility C and the audio channel of the caller's television. In a simple format, after an introductory phase, communication to callers with respect to the bidding is provided through the television link. Alternatively, the audio unit AD (FIG. 1) may be employed.

Essentially, the auctioneer initiates the bidding by stating an initial value for the opening bid. Callers are invited to bid by actuating the push buttons 14 (FIG. 1). For example, the auctioneer may invite an initial bid of one hundred dollars asking callers to so bid by entering an asterisk (*) by punching the button so designated. In accordance with one operating format, cells in the memory 98 (FIG. 4) are actuated to register the bidding number in identified relationship with several calls. Note that although a record may be desirable, it is not usually necessary to record all bids, particularly at initial bidding figures. In any event, the individual processing units, e.g. unit 92 in individual processors PR1-PRn are interconnected (FIG. 1) and operate to select the final and key bids.

After attaining the initial bid, the auctioneer may invite further bidding by seeking a bid of two hundred dollars or any bid. Such a bid might be accomplished either by punching the asterisk button to attain the solicited bid, or by using number buttons to enter a different bid, e.g. two hundred fifty by buttons "2", "5" and "0". Again, cells of the memory 98 are actuated to record select bids (sequence) at the higher value.

The status of the bidding is presented to the auctioneer by the monitor of the command computer terminal CT (FIG. 1). Specifically, the auctioneer is provided an indication of the number of bidders at each level. If a sizeable number of callers bid at a specific value, the auctioneer may wish to advance the price significantly for the next round of bidding. Thus, the auctioneer proceeds until a small group of remaining callers are addressed. Note that the display of the command terminal CT (FIG. 1) may also inform the auctioneer of fresh bidders.

As the selection process proceeds, signals from the clock CL (FIG. 1) are introduced to indicate the sequence of bidders. For example, assume the bidding has proceeded to a stage where only three bidders remain active. The auctioneer is informed by the command terminal CT of the order in which the callers made their bids. The sequence is also of record in the cells of the memory 78 (FIG. 4) to indicate the sequence in the event that the final bid involves more than one caller. Of course, the first caller to respond with a bid would have priority in the purchase.

Normally at the conclusion of the bidding on a particular item, the contents of the cells in the memory 98 would be purged with only the final bidders being held in general memory within the processing unit 92. Of course, it is important to maintain a record of back-up bidders in the event the sale is not consummated with respect to the first of the highest bidders. That is, a subset of the highest bidders is preserved for each item of merchandise in the event that the highest bidder fails to qualify or the sale otherwise cannot be consummated. Of course, a distinct advantage of the system is the ability to accommodate a vast auction participation group for items of substantial value and as a consequence the distillation of a subset of callers is exceedingly valuable information.

To consider another operating format in association with the television media, a system will now be described whereby television viewers participate on a real-time basis in a game show for prizes. The ability to involve television viewers in a program has the potential of expanding program interest along with the expanded participation.

Game shows in accordance herewith may take any of a wide variety of forms as several well known programs in which studio contestants compete for prizes. In utilizing the system of the present invention to involve remote participants, it may be desirable to preliminarily qualify and designate callers as explained above. Specifically, prior to participating in an actual game show, interested participants interface the system as depicted in FIG. 1, and in the course of an exchange as described above, the qualification unit 93 and the designation unit 96 cooperate with the processing unit 92 to accomplish preliminary data on potential participants in cells of the memory 96.

Various games will involve different screening processes and clearances. For example, a child's television game format may require parental clearance and in that regard written communication may be required for approvals. Such approval may require the assignment of a personal identification number to the child player as qualifying identification data.

As explained above, clearances may be perfected through the look-up table 99 (FIG. 4) in association with the qualification unit 93 or approvals through a consumable key step may be extended to incorporate functions of the processing unit 92 in association with the memory 98. For example, if qualification simply involves a check-off operation, the look-up table 99 will normally be employed. However, in the case of preregistration for a participant, as in the case of the auction sale, the memory 98 is involved with the qualification unit 93 through the processing unit 92 to establish a data cell C1–Cn for each qualified participant. Thus, each potential participant to be qualified interfaces with the processing unit 92 during a preliminary interval of operation to provide data in one of the cells C1–CN to facilitate qualification for participation during a real-time game show.

At the time of the show, callers are qualified simply by reference to their assigned memory cell data for a verification. Thereafter, the caller's exchange information to supplement their data as with respect to the play which follows. Specifically for example, a caller might select a studio audience participant with whom the caller is to be allied. The interface operation may be essentially as described above wherein a voice generator in the interface 20 (FIG. 1) provides signals which activate the remote telephone unit to speak the instruction: "If you wish to play with Player No. 1, please push button No. 1; if you wish to play with Player No. 2, please push button No. 2 . . . and so on". The caller may also be instructed to indicate the extent of a wager. For example, "Push the number button indicating the points you wish to risk".

The participant data is stored in an assigned cell of the memory 98 (FIG. 4) for the caller and as the game proceeds, the processing unit 92 tallies the caller's score. Scores are interrelated between individual processing units to actuate the terminal CT. Thus, individual accounting occurs for each of the calling participants on an on-line basis dependent upon the success of the studio players and their association with the callers. On-going accounting data may be provided at intervals or real time by the recorded voice to each contestant.

According to the described format, after an interval of play, the processing units, as the unit 92 (FIG. 4), operate to isolate a subset of caller-players who have amassed the highest scores. Of course, various arrangements may be provided for awarding prizes to the select subset of winning callers.

The above format involves a real-time game show with an on-line operating format. A somewhat similar format involves nonreal-time operation and in that sense, callers may interface with the system of the present invention before and after the show; however, not primarily during the show. Such a show might involve a quiz for callers based on their ability to perceive and remember occurrences within the show. Preregistration may be employed, however, is not essential. Rather, callers may call after the broadcast of a program. In that event, sequence or time clocking may be very important to limit or control individual interfaces to a specific time or geographic "window". That is, as suggested above, allocation-routing equipment and techniques may be employed in various of the formats to window callers. With the system, callers are screened or qualified at the time of a call, identified in a particular calling sequence, designated for identification and quiz answers are given for subsequent processing. Alternatively, players could participate by providing their credit card for billing or be billed through the "pay-to-dial" network. Consider an exemplary format.

A key to participation in the game show may involve the purchase of a particular product. For example, a person desiring to participate may purchase a product which carries a concealed key number. The number serves as a caller's key to participation in the game show.

In accordance with the disclosed operating format, after watching the broadcast of a television show (possibly a serial episode) the participant actuates the push buttons 14 at one of the remote terminals T1–Tn to accomplish an interface communication with the select operating format. For example, the caller may actuate the buttons 14 for the station number "277-7777" which identifies the game format of current description.

Assume responsive operation of the communication facility C to couple the caller through the automatic call distributor AC1 to the interface 20. Upon establishing a connection, the interface 20 receives the caller's telephone number through ANI equipment and a data cell in the memory 98 (FIG. 4) is assigned to the caller. Specifically, for example, associative coupling is provided for the caller through the switch 21 (FIG. 1) to the processor PR1 containing the memory 98 (FIG. 4) and a cell C2 assigned to the caller. A block format 200 is illustrated in FIG. 7 indicating the data that is developed in the cell C2. At the outset, the caller's telephone number is stored in a section 201 followed by uses/month in section 202.

Next, the caller is greeted and requested to give the key number entitling him to participate in the game show. The instruction constitutes an initial action to take place in an interval of qualification during the time t1. The caller actuates the buttons 14 providing digital representations to the qualification unit 93 (FIG. 4) and the look-up table 99 is consulted. Note that the table 99 may be a large, shared unit that tabulates each of the key numbers and accounts for their use. If the caller has identified a proper key number, the process proceeds and the key number is accounted, i.e. incremented or decremented to the limit of use if any. Alternatively, a repeat information operation may be requested as described in detail above.

As a further check during the qualification stage, the use-rate calculator 100 may function to determine whether or not an excessive number of calls have originated from the designated number. Thus, consideration involves calls or value with reference to a predetermined period of time. Again, a shared calculator may be used or addressing may obtain selectivity on the basis of calling numbers. If a large number of calls have originated from a single telephone terminal, a fraudulent situation may be suggested. Assuming no such indication occurs, the number of uses is registered in a section 200 (FIG. 7) and the operation proceeds from the interval t1 to interval t2.

During the interval t2, the sequencer 94 registers the precise time of the call in the buffer storage 97, specifically in a section 204 as illustrated in FIG. 7. With the entry of such data, the system passes from the operating interval t2 to t3.

The caller is next asked to identify himself in some specific manner. For example, the caller may simply be asked to provide the year of his birth. Alternatively, somewhat comprehensive information may be taken as in the form of drivers' license numbers, social security numbers and so on. Of course, such data may be employed for subsequent identification of the caller and, accordingly, is registered in the buffer storage 97 (FIG. 4). Specifically, identification information is registered in section 206 of the block 200 as shown in FIG. 7.

In addition to receiving identification information from a caller, the system assigns a designation to the caller. Specifically, the random number generator 101 (FIG. 4) provides a number which may be encrypted along with other identification data as the caller's personal identification to provide a numerical designation that is registered in the storage 97. Specifically, the designation is stored in a section 208 as illustrated in FIG. 7. With the designation operation complete, the interval t3 terminates initiating the data accumulation phase which occurs during an operating interval t4.

At this juncture, operating elements within the processing unit 92 will be considered in relation to an explanation of the manner in which select questions are provided to a caller and his answers received and recorded for subsequent processing to determine winners.

Figure 8:
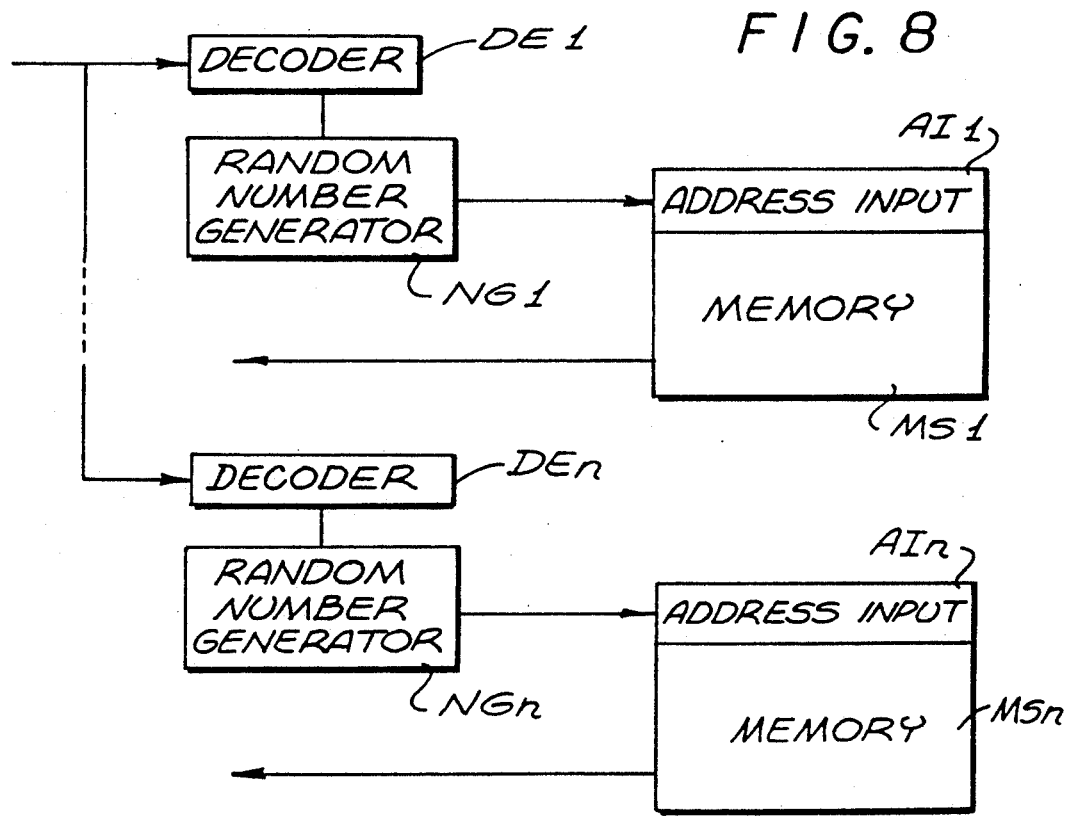
FIG. 8 is a block diagram of elements in an operating function unit of FIG. 4.

Preliminarily, reference will be made to FIG. 8 showing elements involved in the operating format which are contained in the processing unit 92 (FIG. 4) in association with the memory 98. To avoid confusion, the elements identified in FIG. 8 are designated by fresh numerals.

To accommodate the exemplary operating format, a dramatic program might be recorded preparatory to the television broadcast. A substantial number of questions would then be formulated based on the dramatic program. For example, "How many people were present when the will was read?"

It is contemplated that the dramatic program would be broadcast to different geographical segments of the country during different time intervals. To accommodate the different time intervals, it is proposed to utilize different questions for each geographic segment. That is, the basic format can remain the same, only the questions change by time zone to avoid study and collaboration on questions as a result of time shifts. A question propounded to a Chicago caller should not be repeated to a Los Angeles caller. In any event, callers might be given three questions randomly drawn from a pool serving one geographic segment and three questions drawn from a different pool serving another geographic segment.

The signals for prompting a voice generator are registered in memory sections MS1 through MSn. Each of the memory sections MS1-MSn is served by an address input AI1-AIn respectively. Similarly, the address inputs AI1-AIn are instructed by random number generators NG1-NGn, in turn actuated by decoders DE1-DEn. Consider the operating sequence of the memory MSI as an example.

The decoder DE1 is responsive to telephone calling numbers (provided by ANI equipment) indicative of a particular geographic area. Note, for example, that area code numbers afford an effective geographic classification of callers which is very useful in many formats or processes of statistical analysis in accordance herewith. Note that geographic (or other) classification in accordance herewith is also accomplished by the called numbers provided. Each of several television stations would solicit calls for different numbers as a result, either by DNIS or call channeling. Select processors would be reached through the interface units, e.g. interface 20 FIG. 1. In operation, the decoder DE1 determines a call is from a specific geographic area and accordingly provides a signal to actuate the random number generator NG1. As a consequence, the random number generator NG1 provides a series of three random numbers in the form of addresses for the memory MS1. That is, the addresses may simply comprise three alphanumeric bits supplied to the address input AI1 to prompt the provision of three sets of voice generator signals for announcing the three questions in sequence. For example, the first question might be as suggested above: "Push the button on your telephone for the number of persons present in the room when the will was read".

The voice generator signals are supplied from the memory MSI (within the processing unit 92, FIG. 4) to the interface 20 (FIG. 1) which generates audio signals to actuate the caller's hand piece 10. Accordingly, the caller is instructed to answer three questions, the responses being recorded in a section 210 of the data block 200 (FIG. 7). Note that the clock 105 (FIG. 4) may be utilized to limit the response period allowed each caller.

As indicated above, to accommodate broadcast of the program in a different time slot for a different geographic area, the decoder DEn (FIG. 8) actuates the random number generator NGn to address the memory MSn to provide three different questions as a result of a random selection. Accordingly, within a time or times (perhaps limited and offset) after the conclusion of the program, a substantial number of callers are accounted for in cells of the memory 98 and similar units of the composite system. The cells indicate sequences of calling and also may contain billing data where appropriate. That is, pay-to-dial operations avoid the need for billing, yet it may still be made of record.

Subsequent to the data accumulation phase of operation, the processing unit 92 (and its equivalents) is actuated during an off-line processing interval to isolate the subset of callers correctly responding to the questions. In accordance with one format, the subset of successful callers may be reduced to a sub-subset as by a random computer "draw" to define a group of significant winners. That is, a random number generator may be employed as explained above.

As an alternative to subsequent processing, the system may inform callers of their success during the course of the interface telephone call. That is, callers might simply be informed by cuing the voice generator: "Your answers are correct and in accordance with the program game, you will now be entered in the sweepstakes draw for the prize . . . ". Thus, the format defines a subset then further selects a sub-subset of winners. In any of the various formats, the status of the analysis can be televised by selecting a camera focused on the interface terminal IT.

Still another operating format for the system takes the form of polling operations to determine opinion or facts. An illustrative form of the format is disclosed below again in association with a television broadcast.

Generally, the illustrative polling format is contemplated in association with a television broadcast addressing a matter of current interest as, for example, a political issue or election. A master of ceremonies propounds questions to a viewing audience, many of whom are on-line through an interface of a system of the present invention. The master of ceremonies or commentator instructs the callers who are regulated and controlled by the system of the present invention to provide digital data which the system processes to inform the commentator as with regard to subsets of callers. For example, the commentator may be statistically informed as to the numbers of callers holding specific views. Consider a specific exemplary operating format.

Assume the existence of a system in accordance with the present invention installed for use in association with a television broadcasting facility. Of course, various previous arrangements could be involved; however, according to one arrangement a commentator simply invites members of the viewing audience to call a specific number and express their views with respect to a specific issue. Callers located at terminals T1-Tn (FIG. 1) activate the terminals to accomplish an interface with one of the processing systems P1-Pn as explained above. Note that the processor (or the interface 20 may involve operation of the qualification unit 93 (FIG. 4) to prevent callers from loading the poll. That is, to prevent multiple calls from a single terminal that would distort a poll, the qualification unit 93 registers calls in association with the use-rate calculator 100. Interfacing a specific processor, callers are screened by the qualification unit 93 (FIG. 4). In such a poll, it may be important to control the sampling group on a statistical basis. For example, it may be desirable to limit callers from each of several geographic areas. Accordingly, by the use of ANI equipment, the caller's telephone number is provided to the qualification unit 93 during the preliminary interval t1, and a determination is performed with regard to the number of involved callers from the geographic area using the look-up table 99. On attaining a full quota from a specific area, a subsequent caller may be informed that the lines are full. Alternatively, the caller may be requested to provide his telephone number for screening in the event ANI equipment is not available.

The caller may be requested to provide additional information so as to poll a balanced group. For example, a caller might be asked questions concerning age, political registration and so on by prompting the interface unit 20 to pose audio questions and testing the digital results through the qualification unit 93 as with reference to the look-up table 99.

As indicated above, in the event that the broadcast television program is one of a series, it may be desirable to limit the extent of participation over a period of several programs. Accordingly, the use-rate calculator 100 (FIG. 4) may be employed in association with the qualification unit 93. That is, if a calling number has participated in a prior poll, it may be denied access for a subsequent poll or its data not counted. Such operation would involve the use-rate calculator 100 in association with the qualification unit 93 performing logic tests to actuate the voice generator of the interface 20 for providing an appropriate interchange with a caller.

With the screening or qualification of a select group of callers, the sequencer 94 (FIG. 4) may or may not be involved to identify the order of callers. Also, the designation unit 96 may or may not be involved in view of the fact that for many polls there is little interest in subsequently identifying callers.

In the poll-format operation of the system, it is important to provide a capability of defining select intervals during which callers may provide data. In one arrangement, with the consummation of a communication interface between a caller and a processor unit, the audio of the television broadcast is keyed from the audio unit AD through the switch 21 (FIG. 1) for communication to the caller.

With a multiplicity of callers in interface relationship with the processor PR1-PRn as function units, a polling question is stated, for example: "If you favor expanded trade with . . . at the tone press button one; if you do not, press button two".

To control the interval of polling, the command computer terminal CT (FIG. 1) is actuated to enable the callers timely access to the processors.

At the explanation of the polling interval, the interfaces may be terminated or additional questions may be propounded. In any event, subsequent to the data-gathering phase, the bulk data is supplied to the command computer terminal CT incorporating computing facility to isolate subsets for communication by the broadcast. Accordingly, an effective on-line poll can be conducted with statistical sampling control and prompt display of responses.

As explained above, the arrangement of the function unit (or units) may be variously embodied in a single processor or many processors, depending on various considerations as time sharing, multiplexing, paralleling and so on. The systems as described above embody the components bulked together in one location. However, components of the system could be spaced apart geographically, using dedicated lines or polling techniques. An illustrative embodiment is shown in FIG. 9.

Call distributors CD1-CDn are at different geographic locations along with associated interface units IA1-IAn and IB1-IBn. Each of the interface units, as unit IA1 is coupled to a central processor 251 as indicated by lines 252, 254, 256 and 258. Each of the lines may take the form of a dedicated telephone line or a polling telephonic coupling.

Figure 9:
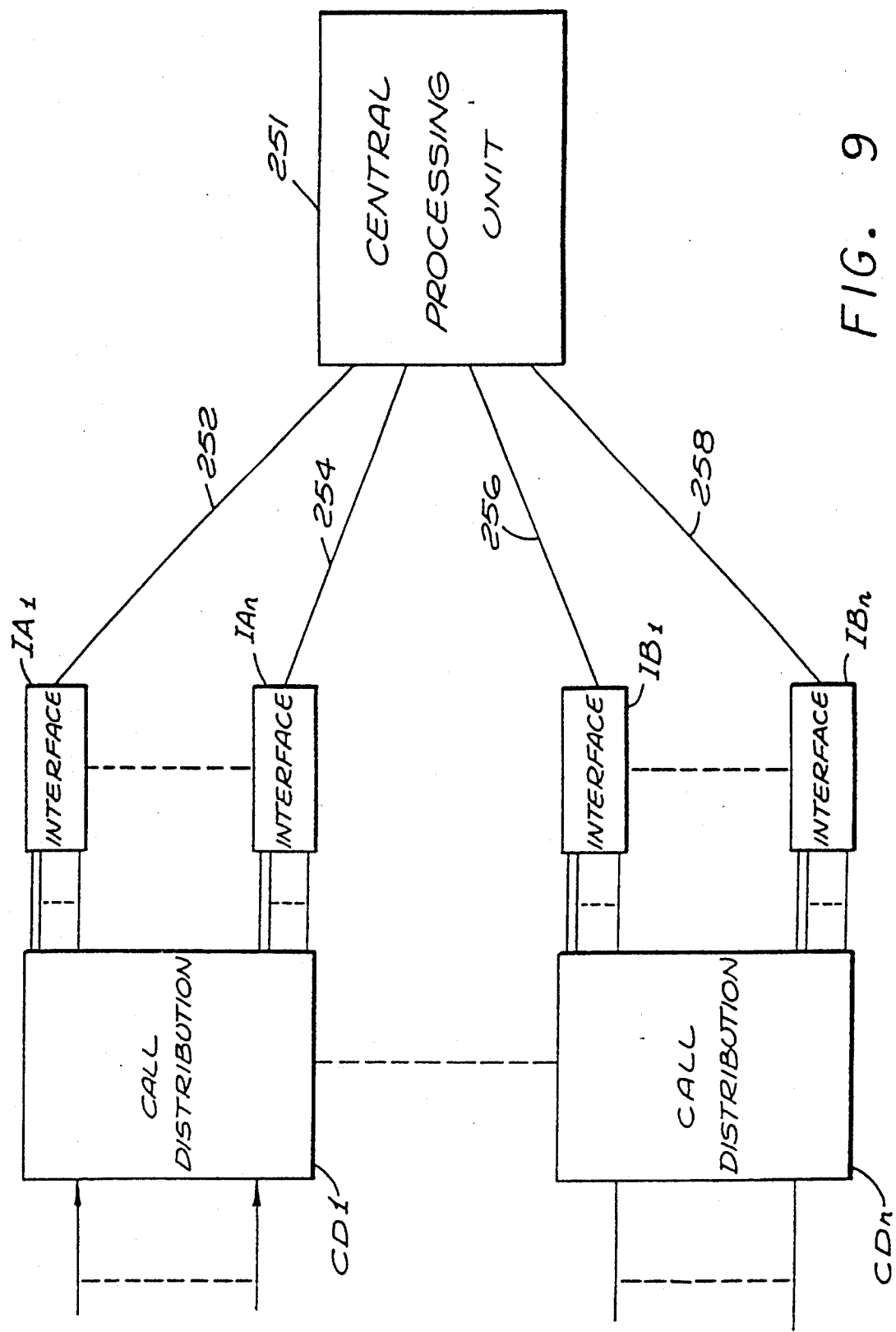
FIG. 9 is a block diagram of the connections between the CPU and remote stations.

In the operation of the system of FIG. 9, the call distributors CD are coupled to a telephonic communication system and accordingly allow the interface units I to provide interface communication between the central processing unit 251 and a multitude of remote terminals T1-Tn as illustrated in FIG. 1. With data accumulated in the cells, it may be variously down loaded as to a central processing station. Thus, the distributed-component system is capable of executing the various formats as explained above with reference to the illustrative structure.

In view of the above explanation of exemplary systems, it will be appreciated that other embodiments of the present invention may be employed in many applications to accumulate statistical data, process such data, and defined subsets of callers of concern. While certain exemplary operations have been stated herein, and certain detailed structures have been disclosed, the appropriate scope hereof is deemed to be in accordance with the claims as set forth below.

What is claimed is:

1. An analysis control system for use with a communication facility including remote terminals for individual callers, wherein each of said remote terminals may comprise a conventional telephone instrument including voice communication means and digital input means in the form of an array of alphabetic numeric buttons for providing data, said analysis control system comprising:

interface structure selectively coupled to said communication facility to interface said terminals for voice and digital communication and including means to provide signals representative of data developed by said terminals;

voice generator structure selectively coupled through said interface structure to said terminals for providing vocal operating instructions to individual ones of said callers;

record memory means connected to said interface structure for initiating a file and storing data relating to certain select ones of said individual callers including data developed by said terminals;

designation structure means selectively coupled to said interface structure and said record memory mean for assigning individual designations to callers and storing said designations in said record memory means; and analysis structure connected to said record memory means for processing said data relating to certain select ones of said individual callers to isolate a subset of said callers.

2. An analysis control system according to claim 1 wherein said analysis structure isolates a subset of said callers by inter-related processing with said data relating to certain select ones of said individual callers.

3. An analysis control system according to claim 2 further including a random number generator to isolate said subset.

4. An analysis control system according to claim 1 further including memory means for storing cue questions for said callers and random selection means for addressing said memory means to actuate said voice generator structure.

5. An analysis control system according to claim 1 wherein said designation structure means includes means for storing sequence data indicative of the calling sequence of said individual callers.

6. An analysis control system according to claim 5 wherein said sequence data is indicative of caller significance.

7. An analysis control system according to claim 1 further including acknowledgement means for confirming caller designations as provided to a caller.

8. An analysis control system according to claim 1 wherein said voice generator structure is driven to prompt said certain select ones of said callers to provide telephone number data for storage in said record memory means.

9. An analysis control system according to claim 1 wherein said analysis structure includes a random number generator.

10. An analysis control system for use with a communication facility including remote terminals for individual callers, wherein each of said remote terminals may comprise a conventional telephone instrument including voice communication means and digital input means in the form of an array of alphabetic numeric buttons for providing data, said analysis control system comprising:

interface structure selectively coupled to said communication facility to interface said terminals for voice and digital communication and including means to provide signals representative of data developed by said terminals;

voice generator structure selectively coupled through said interface structure to said terminals for providing vocal operating instructions to individual ones of said callers;

record memory means selectively connected to said interface structure for initiating a file and storing data relating to certain select ones of said individual callers including data developed by said terminals;

designation structure means selectively coupled to said interface structure and said record memory means for assigning individual designation data to substantially all callers and storing said designation data in said record memory means;

analysis structure connected to said record memory means for processing said data relating to certain select ones of said individual callers to isolate to subset of said callers; and qualification structure for qualifying the operation of said analysis structure under control of said signals representative of data developed by said terminals.

11. A controlled interface system for use with a telephonic communication facility including remote terminals for individual callers, wherein said remote terminals may comprise a conventional telephone instrument, and wherein said telephone communication facility may provide called terminal DNIS signals, said controlled interface system comprising:

function unit means for supplying information of various formats, at least one of said formats being associated with an audio of a broadcast;

interface means for interfacing said telephonic communication facility with said function unit means for voice and digital communication including means to receive terminal formed digital signals and means to provide signals representative of vocal communication to individual callers, said interface means further including means for voice communication to cue callers for actuating said remote terminals to provide terminal-formed signals; and coupling means for coupling a caller at a terminal through said interface means to said function unit means for selective communication in accordance with a specific one of said formats under control of said called terminal DNIS signals.

12. A controlled interface system in accordance with claim 11 wherein said coupling means is controlled by said terminal-formed signals.

13. A controlled interface system in accordance with claim 11 wherein said interface mean further includes means for voice communication to cue callers for actuating said remote terminals to provide terminal-formed signals and including memory means for storing representations of said terminal-formed signals in the form of billing identification data.

14. A controlled interface system in accordance with claim 13 and further including qualification means for qualifying callers and wherein said coupling means is further controlled by said qualification means.

15. A statistical analysis system for use with a communication facility including remote terminal apparatus for individual callers, wherein said remote terminal apparatus may comprise a conventional telephone instrument including voice communication means, and digital input means in the form of an array of alphabetic numeric buttons for providing identification and statistical data, said statistical analysis system comprising:

interface means selectively coupled to said communication facility to interface said terminal apparatus for voice and digital communication and including means to provide signals values from data developed by said terminal apparatus;

voice generator means selectively coupled through said interface means to said terminal apparatus for providing vocal operating instructions to an individual caller; and processing means including a random number generator means for providing processing data, and storage means for registered processing data, said processing means for isolating a subset of said individual callers based on repeated comparisons of said registered processing data and processing data associated with individual callers.

16. An analysis system according to claim 15 wherein said processing means includes means for adding processing data to said storage means for comparison with processing data from said random number generator means associated with a caller whereby to vary probability of said caller winning.

17. An analysis system according to claim 15 wherein said processing means processes said processing data in combination with said identification and statistical data.

18. An analysis system according to claim 15 further including means for receiving signal values from data developed by said terminal apparatus for qualifying the operation of said processing means.

19. An analysis system according to claim 18 wherein said values from data developed by said terminal apparatus represents the designation of an interfaced terminal apparatus.

20. An analysis control system according to claim 6 wherein a select subset is isolated in accordance with said caller significance.

21. An analysis control system according to claim 10 wherein said qualification structure further limits caller to a one time use of said analysis control system.

22. An analysis control system for use with a communication facility including remote terminals for individual callers, wherein each of said remote terminals may comprise a conventional telephone instrument including voice communication means and digital input means in the form of an array of alphabetic numeric buttons for providing data and wherein said communication facility has a capability (ANI) to provide terminal digital data, for example, indicating a calling number, said analysis control system comprising:
  interface structure coupled to said communication facility to interface said terminals for voice and digital communication and including means to provide caller data signals representative of data relating to said callers developed by said terminals and said terminal digital data indicative of the calling number using said capability (ANI);
  analysis structure for processing said caller data signals representative of data relating to said callers developed by said terminals to compose and store said terminal digital data indicative of the calling number and said data relating to said callers developed by said terminals in a specific format; and
  control structure for controlling said analysis structure in accordance with said terminal digital data indicative of the calling number.

23. A system according to claim 22 further including voice generator structure coupled through said interface structure for actuating said terminals as to provide vocal operating instructions to said individual callers.

24. A system according to claim 22 wherein said analysis structure including means for initiating a file and storing data relating to at least one specific of said callers and whereby said control structure controls access by said specific of said callers to said analysis structure.

25. A system according to claim 22 further including record structure connected to said interface structure to receive said terminal digital data to control access by callers to said analysis structure.

26. An analysis control system for use with a communication facility including remote terminals for individual callers, wherein each of said remote terminals may comprise a conventional telephone instrument including voice communication means and digital input means in the form of an array of alphabetic numeric buttons for providing data, said analysis control system comprising:
  interface structure coupled to said communication facility to interface said terminals for voice and digital communication and including means to provide signals representative of data developed by said terminals;
  voice generator structure coupled through said interface structure for actuating said terminals as to provide vocal operating instructions to specific ones of said individual callers;
  record means, including memory and control means, connected to said interface structure for initiating a file and storing data relating to certain select ones of said individual callers; and
  designation means coupled to said interface structure and said record means for assigning individual designations to callers and storing said designations in said record means, said designation means including means for storing representations of the telephone number of each of the terminals used by said callers and wherein said signals representative of data developed by said terminals include signals representative of a number designating a particular remote terminal apparatus and provided by said communication facility as a result of a call.

27. An analysis control system for use with a communication facility including remote terminal apparatus for individual callers, wherein said remote terminal apparatus may comprise a conventional telephone instrument including voice communication means and digital input means in the form of an array of alphabetic numeric buttons for providing data, said analysis control system comprising:
  interface structure coupled to said communication facility to interface said terminal apparatus for voice and digital communication and including means to provide caller data signals representative of data relating to said callers developed by said terminal apparatus;
  voice generator structure coupled through said interface structure for actuating said terminal apparatus as to provide vocal operating instructions to individual ones of said callers;
  record means, including memory and control means, connected to receive said caller data signals from said interface structure for initiating a file and storing caller data relating to certain select ones of said individual callers;
  designation structure means coupled to said interface structure and said record means for assigning individual designations to callers and storing said designations in said record means; and
  acknowledgement structure whereby a caller confirms an assigned individual designation.

* * * * *

UNITED STATES PATENT AND TRADEMARK OFFICE
CERTIFICATE OF CORRECTION

PATENT NO.    : 5,259,023
DATED         : November 2, 1993
INVENTOR(S)   : Ronald A. Katz It is certified that error appears in the above-identified patent and that said Letters Patent is hereby corrected as shown below:

<u>Column 3,</u>
Line 24, after "interfac" insert -- e the st --;

<u>Column 5,</u>
Line 60, after "Tn" insert -- ) --;

<u>Column 11,</u>
Line 42, change "mailorder" to -- mail-order --;

<u>Column 12,</u>
Line 23, change "mailorder" to -- mail-order --;
Line 63, change "uate" to -- ate --, so as to read "actuate";

<u>Column 17,</u>
Line 15, change "CN" to -- Cn --;

<u>Column 18,</u>
Line 30, after "uses/" delete the dash;

<u>Column 19,</u>
Line 55, change "MSI" to -- MS1 --;

<u>Column 20,</u>
Line 14, change "MSI" to -- MS1 --;

<u>Column 21,</u>
Line 15, after "20" insert -- ) --;

<u>Column 22,</u>
Line 9, change "explanation" to -- expiration --;

<u>Column 24,</u>
Line 6, change "to" to -- a --;
Line 40, change "mean" to -- means --;

UNITED STATES PATENT AND TRADEMARK OFFICE
CERTIFICATE OF CORRECTION

PATENT NO.    : 5,259,023
DATED         : November 2, 1993
INVENTOR(S)   : Ronald A. Katz It is certified that error appears in the above-identified patent and that said Letters Patent is hereby corrected as shown below:

Column 25,
Line 28, change "caller" to -- callers --;
Line 61, change "including" to -- includes --;

Signed and Sealed this

Eleventh Day of February, 2003

JAMES E. ROGAN
*Director of the United States Patent and Trademark Office*

(12) EX PARTE REEXAMINATION CERTIFICATE (8161st)
United States Patent
Katz

(10) Number: US 5,259,023 C1
(45) Certificate Issued: Apr. 19, 2011

(54) TELEPHONIC-INTERFACE STATISTICAL ANALYSIS SYSTEM

(75) Inventor: Ronald A. Katz, Los Angeles, CA (US)

(73) Assignee: First Data Resources Inc., Omaha, NE (US)

Reexamination Request:
No. 90/006,977, Mar. 26, 2004
No. 90/007,058, Jun. 2, 2004

Reexamination Certificate for:
Patent No.: 5,259,023
Issued: Nov. 2, 1993
Appl. No.: 07/803,264
Filed: Dec. 3, 1991

Certificate of Correction issued Feb. 11, 2003.

Related U.S. Application Data

(60) Division of application No. 07/640,337, filed on Jan. 11, 1991, now abandoned, which is a continuation of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
| | |
|---|---|
| H04M 3/487 | (2006.01) |
| H04M 3/36 | (2006.01) |
| H04M 3/38 | (2006.01) |
| H04M 3/436 | (2006.01) |
| H04M 3/46 | (2006.01) |
| H04M 3/493 | (2006.01) |
| H04M 3/51 | (2006.01) |
| H04M 11/00 | (2006.01) |
| H04M 3/42 | (2006.01) |
| H04M 3/50 | (2006.01) |
| H04Q 3/64 | (2006.01) |
| H04Q 3/00 | (2006.01) |
| H04Q 3/545 | (2006.01) |
| H04Q 3/66 | (2006.01) |
| H04Q 3/72 | (2006.01) |
| H04Q 3/74 | (2006.01) |
| A63F 3/08 | (2006.01) |
| G07C 11/00 | (2006.01) |
| G07C 15/00 | (2006.01) |

(52) U.S. Cl. ............ 379/88.09; 379/88.1; 379/88.16; 379/88.2; 379/91.01; 379/196; 379/214.01

(58) Field of Classification Search ................ None
See application file for complete search history.

(56) References Cited

U.S. PATENT DOCUMENTS

| | | | |
|---|---|---|---|
| 2,902,541 A | 9/1959 | Singleton |
| 2,941,161 A | 6/1960 | Scantlin |
| 2,998,489 A | 8/1961 | Riesz |

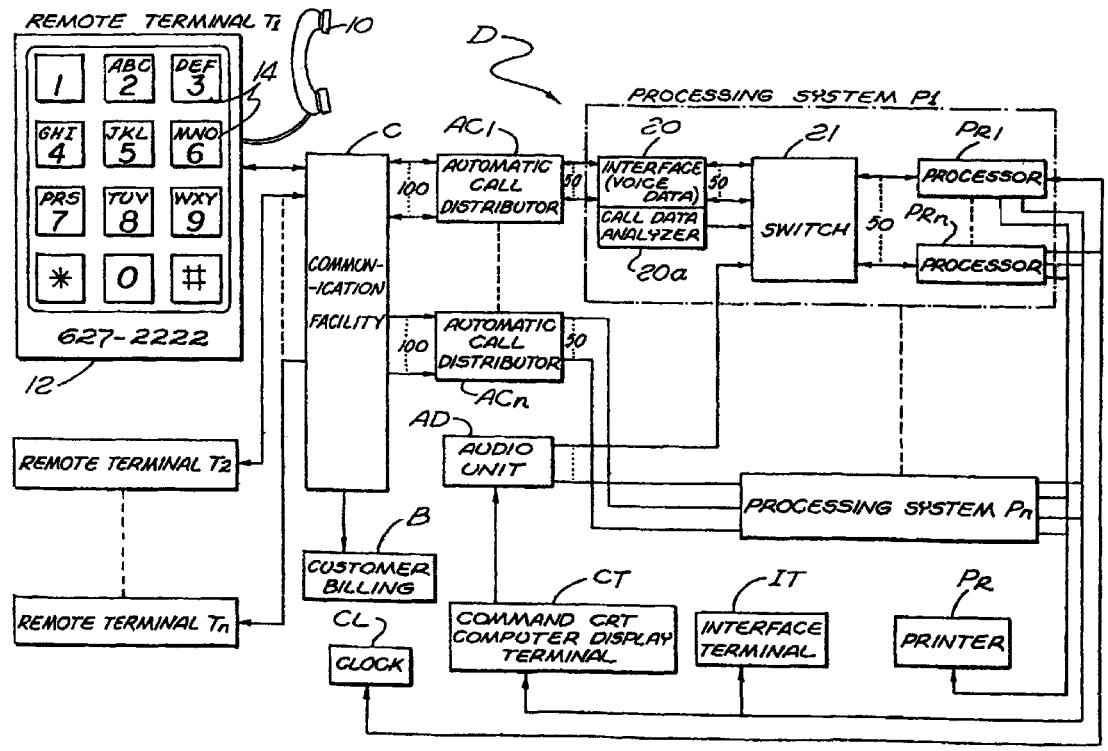

| Patent No. | Type | Date | Inventor(s) | Class |
|---|---|---|---|---|
| 3,022,381 | A | 2/1962 | Pferd | |
| 3,060,275 | A | 10/1962 | Meacham et al. | |
| 3,076,059 | A | 1/1963 | Meacham et al. | |
| 3,082,402 | A | 3/1963 | Scantlin | |
| 3,128,349 | A | 4/1964 | Boesch et al. | |
| 3,141,931 | A | 7/1964 | Zarouni | |
| 3,159,818 | A | 12/1964 | Scantlin | |
| 3,189,687 | A | 6/1965 | Miller | |
| 3,194,892 | A * | 7/1965 | Glenner | 379/246 |
| 3,243,514 | A * | 3/1966 | Moore et al. | 379/183 |
| 3,246,082 | A | 4/1966 | Levy | |
| 3,249,919 | A | 5/1966 | Scantlin | |
| 3,299,210 | A | 1/1967 | Bandy | |
| 3,337,847 | A | 8/1967 | Olsson et al. | |
| 3,347,988 | A | 10/1967 | Marill et al. | |
| 3,371,162 | A | 2/1968 | Scantlin | |
| 3,381,276 | A | 4/1968 | James | |
| 3,393,272 | A | 7/1968 | Hanson | |
| 3,394,246 | A | 7/1968 | Goldman | |
| 3,453,389 | A | 7/1969 | Shaer | |
| 3,482,057 | A | 12/1969 | Abbott et al. | |
| 3,484,560 | A | 12/1969 | Jaeger | |
| 3,515,814 | A | 6/1970 | Morgan | |
| 3,544,769 | A | 12/1970 | Hedin | |
| 3,553,378 | A | 1/1971 | Alter et al. | |
| 3,555,198 | A | 1/1971 | Stepan | |
| 3,556,530 | A | 1/1971 | Barr | |
| 3,557,311 | A | 1/1971 | Goldstein | |
| 3,564,210 | A | 2/1971 | Presti | |
| 3,568,157 | A | 3/1971 | Downing et al. | |
| 3,569,939 | A | 3/1971 | Doblmaier et al. | |
| 3,571,799 | A | 3/1971 | Coker, Jr et al. | |
| 3,573,747 | A | 4/1971 | Adams et al. | |
| 3,581,072 | A | 5/1971 | Nymeyer | |
| 3,594,004 | A | 7/1971 | Barr et al. | |
| 3,617,638 | A | 11/1971 | Jochimsen et al. | |
| 3,618,038 | A | 11/1971 | Stein | |
| 3,622,995 | A | 11/1971 | Dilks | |
| 3,624,292 | A | 11/1971 | Guzak, Jr. | |
| 3,644,675 | A | 2/1972 | Watlington | |
| 3,647,973 | A | 3/1972 | James et al. | |
| 3,651,480 | A | 3/1972 | Downing et al. | |
| 3,651,503 | A | 3/1972 | Kono | 340/174.1 |
| 3,652,795 | A | 3/1972 | Wolf et al. | |
| 3,656,113 | A | 4/1972 | Lince | |
| 3,665,107 | A | 5/1972 | Kopec et al. | |
| 3,675,513 | A | 7/1972 | Flanagan et al. | |
| 3,676,597 | A | 7/1972 | Peterson | |
| 3,688,126 | A | 8/1972 | Klein | |
| 3,689,703 | A | 9/1972 | Allen et al. | |
| 3,696,335 | A | 10/1972 | Lemelson | |
| 3,697,702 | A | 10/1972 | Buonsante et al. | |
| 3,702,392 | A | 11/1972 | St. Jean | 235/61.7 |
| 3,725,596 | A * | 4/1973 | Maxon et al. | |
| 3,725,597 | A * | 4/1973 | Streisand | |
| 3,727,186 | A | 4/1973 | Stephenson, Jr. et al. | |
| 3,728,486 | A | 4/1973 | Kraus | |
| 3,752,904 | A | 8/1973 | Waterbury | |
| 3,769,463 | A | 10/1973 | Graham et al. | |
| 3,778,553 | A | 12/1973 | Rackman | 379/93.27 |
| 3,781,810 | A | 12/1973 | Downing | |
| 3,787,632 | A | 1/1974 | Male et al. | |
| 3,792,446 | A | 2/1974 | McFiggins et al. | |
| 3,794,774 | A | 2/1974 | Kemmerly et al. | |
| 3,800,283 | A | 3/1974 | Gropper | |
| 3,829,628 | A | 8/1974 | Tripsas | |
| 3,833,885 | A | 9/1974 | Gentile et al. | 235/379 |
| 3,858,032 | A | 12/1974 | Scantlin | |
| 3,870,821 | A | 3/1975 | Steury | |
| 3,870,866 | A | 3/1975 | Halpern | |
| 3,881,160 | A | 4/1975 | Ross | |
| 3,889,050 | A | 6/1975 | Thompson | |
| 3,909,553 | A | 9/1975 | Marshall | |
| 3,912,874 | A | 10/1975 | Botterell et al. | |
| 3,914,747 | A | 10/1975 | Barnes et al. | |
| 3,918,174 | A | 11/1975 | Miller et al. | |
| 3,920,908 | A | 11/1975 | Kraus | |
| 3,928,724 | A | 12/1975 | Byram et al. | |
| 3,929,278 | A | 12/1975 | Balavoine et al. | |
| 3,934,095 | A | 1/1976 | Matthews et al. | |
| 3,938,091 | A | 2/1976 | Atalla et al. | |
| 3,940,569 | A | 2/1976 | Schonbrun et al. | |
| 3,947,972 | A | 4/1976 | Freeman | |
| 3,950,618 | A | 4/1976 | Bloisi | |
| 3,959,603 | A | 5/1976 | Nilssen et al. | 377/42 |
| 3,974,338 | A | 8/1976 | Luzier et al. | |
| 3,982,103 | A | 9/1976 | Goldman | |
| 3,985,998 | A | 10/1976 | Crafton | |
| 3,987,252 | A | 10/1976 | Vicari | |
| 3,989,899 | A | 11/1976 | Norwich | |
| 3,991,406 | A | 11/1976 | Downing et al. | |
| 3,998,465 | A | 12/1976 | Mascola | |
| 4,007,336 | A | 2/1977 | Hutton, Sr. | 179/18 |
| 4,009,342 | A | 2/1977 | Fahrenschon et al. | |
| 4,012,599 | A | 3/1977 | Meyer | |
| 4,017,835 | A | 4/1977 | Randolph | |
| 4,024,345 | A | 5/1977 | Kochem | |
| 4,028,494 | A | 6/1977 | Zarouni | |
| 4,031,324 | A | 6/1977 | Dudonis | |
| 4,054,756 | A | 10/1977 | Comella et al. | |
| 4,068,099 | A | 1/1978 | Mikkola et al. | |
| 4,071,698 | A | 1/1978 | Barger, Jr. et al. | |
| 4,078,316 | A | 3/1978 | Freeman | |
| 4,087,638 | A | 5/1978 | Hayes et al. | |
| 4,088,838 | A | 5/1978 | Nakata et al. | |
| 4,090,034 | A | 5/1978 | Moylan | |
| 4,090,038 | A | 5/1978 | Biggs | |
| 4,097,923 | A | 6/1978 | Eckert, Jr. | |
| 4,108,361 | A | 8/1978 | Krause | |
| 4,117,278 | A | 9/1978 | Ehrlich et al. | |
| 4,121,052 | A | 10/1978 | Richard | |
| 4,122,308 | A | 10/1978 | Weinberger et al. | |
| 4,139,739 | A | 2/1979 | von Meister | |
| 4,145,578 | A | 3/1979 | Orriss | |
| 4,149,042 | A * | 4/1979 | Balzer et al. | 370/486 |
| 4,150,255 | A | 4/1979 | Theis et al. | |
| 4,152,547 | A | 5/1979 | Theis | |
| 4,160,125 | A | 7/1979 | Bower et al. | |
| 4,160,129 | A | 7/1979 | Peyser et al. | |
| 4,162,377 | A | 7/1979 | Mearns | |
| 4,187,498 | A | 2/1980 | Creekmore | |
| 4,191,376 | A | 3/1980 | Goldman et al. | |
| 4,191,860 | A | 3/1980 | Weber | |
| 4,192,972 | A | 3/1980 | Bertoglio et al. | |
| 4,194,089 | A | 3/1980 | Hashimoto | |
| 4,197,430 | A | 4/1980 | Dowden | |
| 4,200,770 | A | 4/1980 | Hellman et al. | |
| 4,201,887 | A | 5/1980 | Burns | |
| 4,204,113 | A | 5/1980 | Giraud et al. | |
| 4,221,933 | A | 9/1980 | Cornell et al. | |
| 4,223,183 | A | 9/1980 | Peters, Jr. | |
| 4,232,199 | A | 11/1980 | Boatwright et al. | |
| 4,241,942 | A | 12/1980 | Bachman | |
| 4,242,539 | A | 12/1980 | Hashimoto | |
| 4,243,844 | A | 1/1981 | Waldman | |
| 4,255,618 | A | 3/1981 | Danner et al. | |
| 4,255,619 | A | 3/1981 | Saito | |
| 4,256,928 | A | 3/1981 | Lesea | |
| RE30,580 | E | 4/1981 | Goldman et al. | |
| 4,260,854 | A | 4/1981 | Kolodny et al. | |
| 4,264,924 | A | 4/1981 | Freeman | |
| 4,264,925 | A | 4/1981 | Freeman et al. | |

| Patent | Kind | Date | Inventor |
|---|---|---|---|
| 4,270,024 | A | 5/1981 | Theis et al. |
| 4,277,649 | A | 7/1981 | Sheinbein |
| 4,290,141 | A | 9/1981 | Anderson et al. |
| 4,299,637 | A | 11/1981 | Oberdeck et al. |
| 4,302,632 | A | 11/1981 | Vicari |
| 4,302,810 | A | 11/1981 | Bouricius et al. |
| RE30,821 | E | 12/1981 | Goldman |
| 4,303,804 | A | 12/1981 | Johnson et al. |
| 4,307,266 | A | 12/1981 | Messina |
| 4,310,727 | A | 1/1982 | Lawser |
| 4,313,035 | A | 1/1982 | Jordan et al. |
| 4,314,103 | A | 2/1982 | Wilson |
| 4,317,961 | A | 3/1982 | Johnson |
| 4,320,256 | A | 3/1982 | Freeman |
| 4,323,770 | A | 4/1982 | Dieulot et al. |
| 4,328,396 | A | 5/1982 | Theis |
| 4,338,494 | A | 7/1982 | Theis |
| 4,339,798 | A | 7/1982 | Hedges et al. |
| 4,345,315 | A | 8/1982 | Cadotte et al. |
| 4,348,554 | A | 9/1982 | Asmuth |
| 4,355,207 | A | 10/1982 | Curtin |
| 4,355,372 | A | 10/1982 | Johnson et al. |
| 4,360,827 | A | 11/1982 | Braun |
| 4,360,875 | A | 11/1982 | Behnke |
| 4,367,402 | A | 1/1983 | Giraud et al. |
| 4,371,752 | A | 2/1983 | Matthews et al. |
| 4,376,875 | A | 3/1983 | Beirne |
| 4,389,546 | A | 6/1983 | Glisson et al. |
| 4,393,277 | A | 7/1983 | Besen et al. |
| 4,398,708 | A | 8/1983 | Goldman et al. |
| 4,400,587 | A | 8/1983 | Taylor |
| 4,401,856 | A | 8/1983 | Curtin et al. |
| 4,405,829 | A | 9/1983 | Rivest et al. |
| 4,410,765 | A | 10/1983 | Hestad et al. |
| 4,420,656 | A | 12/1983 | Freeman |
| 4,427,848 | A | 1/1984 | Tsakanikas |
| 4,428,296 | A | 1/1984 | Scheuchzer et al. |
| 4,429,187 | A * | 1/1984 | Butcher ............... 379/101.01 |
| 4,438,824 | A | 3/1984 | Mueller-Schloer |
| 4,439,635 | A | 3/1984 | Theis et al. |
| 4,439,636 | A | 3/1984 | Newkirk et al. |
| 4,445,001 | A | 4/1984 | Bertoglio |
| 4,449,040 | A | 5/1984 | Matsuoka et al. |
| 4,451,087 | A | 5/1984 | Tamamushi |
| 4,467,424 | A | 8/1984 | Hedges et al. |
| 4,468,528 | A | 8/1984 | Reece et al. |
| 4,468,529 | A | 8/1984 | Samuel et al. |
| 4,475,189 | A | 10/1984 | Herr et al. |
| 4,484,031 | A | 11/1984 | Gray et al. |
| 4,489,438 | A | 12/1984 | Hughes |
| 4,490,583 | A | 12/1984 | Bednarz et al. |
| 4,494,197 | A | 1/1985 | Troy et al. |
| 4,501,958 | A | 2/1985 | Glize et al. |
| 4,511,764 | A | 4/1985 | Nakayama et al. |
| 4,513,175 | A | 4/1985 | Smith |
| 4,517,410 | A | 5/1985 | Williams et al. |
| 4,517,412 | A | 5/1985 | Newkirk et al. |
| 4,518,824 | A | 5/1985 | Mondardini |
| 4,518,827 | A | 5/1985 | Sagara |
| 4,521,643 | A | 6/1985 | Dupuis et al. |
| 4,523,055 | A | 6/1985 | Hohl et al. |
| 4,531,023 | A | 7/1985 | Levine |
| 4,532,378 | A | 7/1985 | Nakayama et al. |
| 4,539,435 | A | 9/1985 | Eckmann |
| 4,539,436 | A | 9/1985 | Theis |
| 4,541,087 | A | 9/1985 | Comstock |
| 4,544,804 | A | 10/1985 | Herr et al. |
| 4,547,851 | A | 10/1985 | Kurland |
| 4,549,047 | A | 10/1985 | Brian et al. |
| 4,549,291 | A | 10/1985 | Renoulin et al. |
| 4,555,594 | A | 11/1985 | Friedes et al. |
| 4,556,970 | A | 12/1985 | Flanagin et al. ............ 370/58 |
| 4,559,415 | A | 12/1985 | Bernard et al. |
| 4,559,416 | A | 12/1985 | Theis et al. |
| 4,562,342 | A | 12/1985 | Solo |
| 4,565,903 | A | 1/1986 | Riley |
| 4,566,030 | A | 1/1986 | Nickerson et al. |
| 4,567,323 | A | 1/1986 | Lottes |
| 4,567,359 | A | 1/1986 | Lockwood |
| 4,570,930 | A | 2/1986 | Matheson |
| 4,577,062 | A | 3/1986 | Hilleary et al. |
| 4,577,067 | A | 3/1986 | Levy et al. |
| 4,578,700 | A | 3/1986 | Roberts et al. |
| 4,580,011 | A | 4/1986 | Glaser |
| 4,580,012 | A | 4/1986 | Matthews et al. |
| 4,581,486 | A | 4/1986 | Matthews et al. |
| 4,582,956 | A | 4/1986 | Doughty |
| 4,584,602 | A | 4/1986 | Nakagawa |
| 4,585,903 | A | 4/1986 | Schiller et al. |
| 4,585,906 | A | 4/1986 | Matthews et al. |
| 4,586,707 | A | 5/1986 | McNeight et al. |
| 4,587,379 | A | 5/1986 | Masuda |
| 4,591,190 | A | 5/1986 | Clark |
| 4,591,664 | A | 5/1986 | Freeman |
| 4,591,665 | A | 5/1986 | Foster et al. |
| 4,592,546 | A | 6/1986 | Fascenda et al. |
| 4,594,476 | A | 6/1986 | Freeman |
| 4,595,983 | A | 6/1986 | Gehalo et al. |
| 4,598,367 | A | 7/1986 | DeFrancesco et al. |
| 4,599,493 | A | 7/1986 | Cave |
| 4,600,809 | A | 7/1986 | Tatsumi et al. ............ 179/2 |
| 4,603,232 | A | 7/1986 | Kurland et al. |
| 4,611,094 | A | 9/1986 | Asmuth et al. |
| 4,611,096 | A | 9/1986 | Asmuth et al. |
| 4,612,416 | A | 9/1986 | Emerson et al. |
| 4,614,367 | A | 9/1986 | Breen |
| 4,616,852 | A | 10/1986 | Cash |
| 4,625,079 | A | 11/1986 | Castro et al. |
| 4,625,081 | A | 11/1986 | Lotito et al. |
| 4,625,276 | A | 11/1986 | Benton et al. |
| 4,630,200 | A | 12/1986 | Ohmae et al. |
| 4,630,201 | A | 12/1986 | White |
| 4,634,809 | A | 1/1987 | Paulsson et al. |
| 4,635,251 | A | 1/1987 | Stanley et al. |
| 4,640,991 | A | 2/1987 | Matthews et al. |
| 4,645,873 | A | 2/1987 | Chomet |
| 4,649,563 | A | 3/1987 | Riskin |
| 4,652,998 | A | 3/1987 | Koza et al. |
| 4,654,482 | A | 3/1987 | DeAngelis |
| 4,656,623 | A | 4/1987 | Dalby |
| 4,656,624 | A | 4/1987 | Collins et al. |
| 4,658,417 | A | 4/1987 | Hashimoto et al. |
| 4,663,777 | A | 5/1987 | Szeto |
| 4,665,502 | A | 5/1987 | Kreisner |
| 4,669,730 | A | 6/1987 | Small |
| 4,671,512 | A | 6/1987 | Bachman et al. |
| 4,672,660 | A | 6/1987 | Curtin |
| 4,673,802 | A | 6/1987 | Ohmae et al. |
| 4,674,044 | A | 6/1987 | Kalmus et al. |
| 4,677,552 | A | 6/1987 | Sibley, Jr. |
| 4,677,553 | A | 6/1987 | Roberts et al. |
| 4,677,609 | A | 6/1987 | Piereth |
| 4,680,785 | A | 7/1987 | Akiyama et al. |
| 4,685,123 | A | 8/1987 | Hsia et al. |
| 4,685,127 | A | 8/1987 | Miller et al. |
| 4,688,170 | A | 8/1987 | Waite et al. |
| 4,689,742 | A | 8/1987 | Troy et al. |
| 4,692,817 | A | 9/1987 | Theis |
| 4,694,490 | A | 9/1987 | Harvey et al. |
| 4,696,028 | A | 9/1987 | Morganstein et al. |
| 4,696,029 | A | 9/1987 | Cohen |
| 4,697,282 | A | 9/1987 | Winter et al. |

| | | | | | | |
|---|---|---|---|---|---|---|
| 4,704,725 A | 11/1987 | Harvey et al. | | 4,853,882 A | 8/1989 | Marshall |
| 4,706,275 A | 11/1987 | Kamil | | 4,856,050 A | 8/1989 | Theis et al. |
| 4,710,955 A | 12/1987 | Kauffman | | 4,856,066 A | 8/1989 | Lemelson |
| 4,715,061 A | 12/1987 | Norwich | | 4,858,123 A | 8/1989 | Alexoff |
| 4,716,583 A | 12/1987 | Groner et al. | | 4,866,756 A | 9/1989 | Crane et al. |
| 4,719,647 A | 1/1988 | Theis et al. | | 4,870,679 A | 9/1989 | Hanna et al. |
| 4,722,526 A | 2/1988 | Tovar et al. | | 4,876,592 A | 10/1989 | Von Kohorn |
| 4,726,056 A | 2/1988 | An | | 4,876,717 A | 10/1989 | Barron et al. |
| 4,734,858 A | 3/1988 | Schlafly | | 4,878,240 A | 10/1989 | Lin et al. |
| 4,737,983 A | 4/1988 | Frauenthal et al. | | 4,879,744 A | 11/1989 | Tasaki et al. |
| 4,745,468 A | 5/1988 | Von Kohorn | | 4,881,261 A | 11/1989 | Oliphant et al. |
| 4,747,124 A | 5/1988 | Ladd | | 4,882,473 A | 11/1989 | Bergeron et al. |
| 4,748,668 A | 5/1988 | Shamir et al. | | 4,893,325 A | 1/1990 | Pankonen et al. |
| 4,750,199 A | 6/1988 | Norwich | | 4,893,328 A | 1/1990 | Peacock |
| 4,755,872 A | 7/1988 | Bestler et al. | | 4,893,330 A | 1/1990 | Franco |
| 4,756,020 A | 7/1988 | Fodale | | 4,894,857 A | 1/1990 | Szlam et al. |
| 4,757,267 A | 7/1988 | Riskin | | 4,896,345 A | 1/1990 | Thorne |
| 4,759,056 A | 7/1988 | Akiyama | | 4,896,346 A | 1/1990 | Belfield et al. |
| 4,761,684 A | 8/1988 | Clark et al. | | 4,897,867 A | 1/1990 | Foster et al. |
| 4,761,807 A | 8/1988 | Matthews et al. | | 4,897,870 A | 1/1990 | Golden |
| 4,761,808 A | 8/1988 | Howard | | 4,899,373 A | 2/1990 | Lee et al. |
| 4,763,191 A | 8/1988 | Gordon et al. | | 4,899,375 A | 2/1990 | Bauer et al. |
| 4,763,353 A | 8/1988 | Canale et al. | | 4,907,079 A | 3/1990 | Turner et al. |
| 4,764,666 A | 8/1988 | Bergeron | | 4,908,761 A | 3/1990 | Tai |
| 4,766,604 A | 8/1988 | Axberg | | 4,908,850 A | 3/1990 | Masson et al. |
| 4,768,222 A | 8/1988 | Kalfon | | 4,908,852 A | 3/1990 | Hird et al. |
| 4,768,223 A | 8/1988 | Kinoshita et al. | | 4,916,726 A | 4/1990 | Morley, Jr. et al. |
| 4,769,834 A | 9/1988 | Billinger et al. | | 4,918,719 A | 4/1990 | Daudelin |
| 4,774,655 A | 9/1988 | Kollin et al. | | 4,922,519 A | 5/1990 | Daudelin ................... 379/67 |
| 4,776,004 A | 10/1988 | Bauer | | 4,922,520 A | 5/1990 | Bernard et al. |
| 4,781,377 A | 11/1988 | McVean et al. | | 4,922,522 A | 5/1990 | Scanlon |
| 4,782,508 A | 11/1988 | Borchering et al. | | 4,926,462 A | 5/1990 | Ladd et al. |
| 4,782,510 A | 11/1988 | Szlam | | 4,926,996 A | 5/1990 | Eglise et al. |
| 4,782,519 A | 11/1988 | Patel et al. | | 4,932,021 A | 6/1990 | Moody |
| 4,783,796 A | 11/1988 | Ladd | | 4,932,042 A | 6/1990 | Baral et al. |
| 4,783,800 A | 11/1988 | Levine | | 4,933,965 A | 6/1990 | Hird et al. |
| 4,785,408 A | 11/1988 | Britton et al. | | 4,937,853 A | 6/1990 | Brule et al. |
| 4,785,473 A | 11/1988 | Pfeiffer et al. | | 4,942,598 A | 7/1990 | Davis |
| 4,788,682 A | 11/1988 | Vij et al. | | 4,942,599 A | 7/1990 | Gordon et al. |
| 4,788,715 A | 11/1988 | Lee | | 4,942,616 A | 7/1990 | Linstroth et al. |
| 4,788,716 A | 11/1988 | Zebe | | 4,943,995 A | 7/1990 | Daudelin et al. |
| 4,788,718 A | 11/1988 | McNabb et al. | | 4,951,307 A | 8/1990 | Willard |
| 4,789,928 A | 12/1988 | Fujisaki | | 4,951,310 A | 8/1990 | Honda et al. |
| 4,791,640 A | 12/1988 | Sand | | 4,955,047 A | 9/1990 | Morganstein et al. |
| 4,791,664 A | 12/1988 | Lutz et al. | | 4,959,783 A | 9/1990 | Scott et al. |
| 4,791,666 A | 12/1988 | Cobb et al. | | 4,959,855 A | 9/1990 | Daudelin |
| 4,792,968 A | 12/1988 | Katz | | 4,961,217 A | 10/1990 | Akiyama |
| 4,792,973 A | 12/1988 | Gilhousen et al. | | 4,964,157 A | 10/1990 | Aoshima |
| 4,796,293 A | 1/1989 | Blinken et al. | | 4,965,825 A | 10/1990 | Harvey et al. |
| 4,797,818 A | 1/1989 | Cotter | | 4,969,183 A | 11/1990 | Reese |
| 4,797,910 A | 1/1989 | Daudelin | | 4,969,185 A | 11/1990 | Dorst et al. |
| 4,797,911 A | 1/1989 | Szlam et al. | | 4,972,461 A | 11/1990 | Brown et al. |
| 4,797,913 A | 1/1989 | Kaplan et al. | | 4,974,252 A | 11/1990 | Osborne |
| 4,799,156 A | 1/1989 | Shavit et al. | | 4,975,945 A | 12/1990 | Carbullido |
| 4,799,255 A | 1/1989 | Billinger et al. | | 4,985,913 A | 1/1991 | Shalom et al. |
| 4,800,583 A | 1/1989 | Theis | | 4,989,233 A | 1/1991 | Schakowsky et al. |
| 4,805,207 A | 2/1989 | McNutt et al. | | 4,989,234 A | 1/1991 | Schakowsky et al. |
| 4,805,209 A | 2/1989 | Baker, Jr. et al. | | 4,992,940 A | 2/1991 | Dworkin |
| 4,812,843 A | 3/1989 | Champion, III et al. | | 4,996,705 A | 2/1991 | Entenmann et al. |
| 4,815,031 A | 3/1989 | Furukawa | | 5,000,486 A | 3/1991 | Rua, Jr. et al. |
| 4,815,121 A | 3/1989 | Yoshida | | 5,001,710 A | 3/1991 | Gawrys et al. |
| 4,815,741 A | 3/1989 | Small | | 5,003,574 A | 3/1991 | Denq et al. |
| 4,827,500 A | 5/1989 | Binkerd et al. | | 5,003,585 A | 3/1991 | Richer |
| 4,829,563 A | 5/1989 | Crockett et al. | | 5,003,595 A | 3/1991 | Collins et al. |
| 4,832,341 A | 5/1989 | Muller et al. | | 5,014,298 A | 5/1991 | Katz |
| 4,835,630 A | 5/1989 | Freer | | 5,017,917 A | 5/1991 | Fisher et al. |
| 4,842,278 A | 6/1989 | Markowicz | | 5,018,736 A | 5/1991 | Pearson et al. |
| 4,845,739 A | 7/1989 | Katz | | 5,023,904 A | 6/1991 | Kaplan et al. |
| 4,847,890 A | 7/1989 | Solomon et al. | | 5,027,384 A | 6/1991 | Morganstein |
| 4,850,007 A | 7/1989 | Marino et al. | | 5,029,196 A | 7/1991 | Morganstein |
| 4,852,154 A | 7/1989 | Lewis et al. | | 5,033,076 A | 7/1991 | Jones et al. |

| | | | | | |
|---|---|---|---|---|---|
| 5,033,088 A | 7/1991 | Shipman | CA | 1143494 | 1/1980 |
| 5,036,535 A | 7/1991 | Gechter et al. | CA | 1162336 | 1/1981 |
| 5,046,183 A | 9/1991 | Dorst et al. | CA | 162336 * | 2/1984 |
| 5,054,059 A | 10/1991 | Stern et al. | CA | 1162336 | 2/1984 |
| 5,068,891 A | 11/1991 | Marshall | CA | 1225759 | 8/1987 |
| 5,083,272 A | 1/1992 | Walker et al. | CA | 2009937-2 | 8/1990 |
| 5,097,528 A | 3/1992 | Gursahaney et al. | DE | 2351949 A1 | 4/1975 |
| 5,109,414 A | 4/1992 | Harvey et al. | DE | 2503423 A1 | 7/1975 |
| 5,125,024 A | 6/1992 | Gokcen et al. | DE | 2903450 A1 | 8/1980 |
| 5,127,003 A | 6/1992 | Doll, Jr. et al. | DE | 2903479 A1 | 8/1980 |
| 5,128,984 A | 7/1992 | Katz | DE | OS 2929416 | 2/1981 |
| 5,146,491 A | 9/1992 | Silver et al. | DE | 32 25 562 | 1/1984 |
| 5,148,474 A | 9/1992 | Haralambopoulos et al. | DE | 3406615 A1 | 8/1984 |
| 5,153,906 A | 10/1992 | Akiyama | DE | OS 3726366 | 2/1988 |
| 5,164,981 A | 11/1992 | Mitchell et al. | DE | 4005365 A1 | 8/1990 |
| 5,168,548 A | 12/1992 | Kaufman et al. | EP | 0015120 A1 | 2/1980 |
| 5,179,585 A | 1/1993 | MacMillan, Jr. et al. | EP | 0009684 A1 | 4/1980 |
| 5,181,236 A | 1/1993 | LaVallee et al. | EP | 0041261 A1 | 6/1981 |
| 5,181,238 A | 1/1993 | Medamana et al. | EP | 0048868 A1 | 8/1981 |
| 5,186,471 A | 2/1993 | Vancraeynest | EP | 0060643 A2 | 3/1982 |
| 5,199,062 A | 3/1993 | Von Meister et al. | EP | 0066823 A1 | 5/1982 |
| 5,214,689 A | 5/1993 | O'Sullivan | EP | 0088639 A2 | 3/1983 |
| 5,222,120 A | 6/1993 | McLeod et al. | EP | 0 120 322 | 2/1984 |
| 5,233,654 A | 8/1993 | Harvey et al. | EP | 0 217 308 A2 | 4/1987 |
| 5,236,199 A | 8/1993 | Thompson, Jr. | EP | 0 229 170 A | 7/1987 |
| 5,243,643 A | 9/1993 | Sattar et al. | EP | 0249575 | 12/1987 |
| 5,251,252 A | 10/1993 | Katz | EP | 0 249 795 | 12/1987 |
| 5,255,183 A | 10/1993 | Katz | EP | 0295837 | 12/1988 |
| 5,263,723 A | 11/1993 | Pearson et al. | EP | 0342295 | 11/1989 |
| 5,289,531 A | 2/1994 | Levine | EP | 0434181 | 6/1991 |
| 5,299,260 A | 3/1994 | Shaio | EP | 0 451 693 A2 | 10/1991 |
| RE34,587 E | 4/1994 | Crane et al. | EP | 0 451 695 A2 | 10/1991 |
| 5,303,298 A | 4/1994 | Morganstein et al. | EP | 0 453 831 A2 | 10/1991 |
| 5,303,299 A | 4/1994 | Hunt et al. | EP | 0 454 363 A2 | 10/1991 |
| 5,327,554 A | 7/1994 | Palazzi, III et al. | EP | 0 568 114 A | 11/1993 |
| 5,333,185 A | 7/1994 | Burke et al. | EP | 0 620 669 A | 10/1994 |
| 5,335,277 A | 8/1994 | Harvey et al. | EP | 0 438 860 B1 | 9/1996 |
| 5,351,276 A | 9/1994 | Doll, Jr. et al. | EP | 0 382 670 B1 | 4/1997 |
| 5,351,285 A | 9/1994 | Katz | EP | 0 382 212 B1 | 7/1998 |
| 5,353,335 A | 10/1994 | D'Urso et al. | EP | 0 917 335 A2 | 5/1999 |
| 5,354,069 A | 10/1994 | Guttman et al. | FR | 2349899 A1 | 11/1977 |
| 5,361,295 A | 11/1994 | Solomon et al. | FR | 2522850 A2 | 9/1983 |
| 5,369,685 A | 11/1994 | Kero | FR | 2542115 A1 | 9/1984 |
| 5,402,472 A | 3/1995 | MeLampy et al. | FR | 2 575 016 | 7/1986 |
| 5,403,999 A | 4/1995 | Entenmann et al. | FR | 9002131 | 8/1990 |
| 5,415,416 A | 5/1995 | Scagnelli et al. | GB | 1162484 | 4/1967 |
| 5,416,830 A | 5/1995 | MacMillan, Jr. et al. | GB | 1124945 | 8/1968 |
| 5,418,844 A | 5/1995 | Morrisey et al. | GB | 1352600 | 5/1974 |
| 5,475,205 A | 12/1995 | Behm et al. | GB | 1400654 | 7/1975 |
| 5,490,207 A | 2/1996 | Schorr | GB | 1442883 | 7/1976 |
| 5,511,112 A | 4/1996 | Szlam | GB | 1505718 | 3/1978 |
| 5,537,143 A | 7/1996 | Steingold et al. | GB | 1520529 | 8/1978 |
| 5,561,710 A | 10/1996 | Helms | GB | 1544542 | 4/1979 |
| 5,599,046 A | 2/1997 | Behm et al. | GB | 2046556 B | 11/1980 |
| 5,623,536 A | 4/1997 | Solomon et al. | GB | 2057740 | 4/1981 |
| 5,651,048 A | 7/1997 | Leeuw | GB | 2065353 A | 6/1981 |
| 5,709,603 A | 1/1998 | Kaye | GB | 2118341 A | 10/1983 |
| 5,768,348 A | 6/1998 | Solomon et al. | GB | 2120507 | 11/1983 |
| 5,787,156 A | 7/1998 | Katz | GB | 2141309 A | 12/1984 |
| 5,790,636 A | 8/1998 | Marshall | GB | 2184327 A | 6/1987 |
| 5,815,551 A | 9/1998 | Katz | GB | 2 230 403 A | 10/1990 |
| 5,835,576 A | 11/1998 | Katz | GB | 2 252 270 B | 8/1992 |
| 5,841,837 A | 11/1998 | Fuller et al. | GB | 2253542 | 9/1992 |
| 5,898,762 A | 4/1999 | Katz | IL | 74048 | 1/1985 |
| 5,917,893 A | 6/1999 | Katz | IL | 76993 | 12/1995 |
| | | | JP | 48-90110 | 11/1973 |
| | FOREIGN PATENT DOCUMENTS | | JP | 52-17739 | 2/1977 |
| CA | 1022674 | 12/1977 | JP | 52-016941 | 2/1977 |
| CA | 1025118 | 1/1978 | JP | 52-021738 | 2/1977 |
| CA | 1056500 | 6/1979 | JP | 52-17740 | 9/1977 |
| CA | 1059621 | 7/1979 | JP | 53-039808 | 4/1978 |

| | | |
|---|---|---|
| JP | 53-039808 | 10/1978 |
| JP | 53-115109 | 10/1978 |
| JP | 53-132919 | 11/1978 |
| JP | 54-62708 | 5/1979 |
| JP | 54-061807 | 5/1979 |
| JP | 54-089509 | 7/1979 |
| JP | 55-010246 | 1/1980 |
| JP | 55-107375 | 8/1980 |
| JP | 55-166370 | 12/1980 |
| JP | 56-004969 | 1/1981 |
| JP | 56-020371 | 2/1981 |
| JP | 56-044958 | 4/1981 |
| JP | 56-098966 | 8/1981 |
| JP | 56-152365 | 11/1981 |
| JP | 57-045767 | 3/1982 |
| JP | 57-024157 | 5/1982 |
| JP | 57-073471 | 5/1982 |
| JP | 57-125567 | 8/1982 |
| JP | 57-125569 | 8/1982 |
| JP | 57-125570 | 8/1982 |
| JP | 57-127903 | 8/1982 |
| JP | 57-162867 | 10/1982 |
| JP | 58-002136 | 1/1983 |
| JP | 58-003367 | 1/1983 |
| JP | 58-221559 | 2/1983 |
| JP | 58-165473 | 9/1983 |
| JP | 59-016068 | 1/1984 |
| JP | 59-83270 | 5/1984 |
| JP | 59-108446 | 6/1984 |
| JP | 59-190771 | 10/1984 |
| JP | 59-208973 | 11/1984 |
| JP | 60-010868 | 1/1985 |
| JP | 60-035868 | 2/1985 |
| JP | 60-014563 | 4/1985 |
| JP | 60-220655 | 11/1985 |
| JP | 61-006163 | 2/1986 |
| JP | 61-210754 | 9/1986 |
| JP | 62-038933 | 2/1987 |
| JP | 62-92654 | 4/1987 |
| JP | 62-98848 | 5/1987 |
| JP | 62-239757 | 10/1987 |
| JP | 500138/88 | 1/1988 |
| JP | 009353/1988 | 1/1988 |
| JP | 63-114442 | 5/1988 |
| JP | 246067/1988 | 10/1988 |
| JP | 01-098362 | 4/1989 |
| JP | 117436/1989 | 5/1989 |
| JP | 298158/90 | 12/1990 |
| JP | 41855/91 | 2/1991 |
| WO | WO 08101664 A1 | 6/1981 |
| WO | WO 82/02132 | 6/1982 |
| WO | WO 08401073 A1 | 3/1984 |
| WO | 00370/87 | 1/1987 |
| WO | WO 87/00375 | 1/1987 |
| WO | WO 08702208 A1 | 4/1987 |
| WO | WO88/02966 | 4/1988 |
| WO | WO88/05985 | 8/1988 |
| WO | WO89/02139 | 3/1989 |
| WO | WO89/11768 | 11/1989 |
| WO | WO90/10989 | 9/1990 |
| WO | WO90/11661 | 10/1990 |
| WO | WO 91/15818 | 10/1991 |
| WO | WO 92/06548 | 4/1992 |
| WO | WO 92/09164 | 5/1992 |
| WO | WO 92/15166 | 9/1992 |
| WO | WO93/05483 | 3/1993 |

OTHER PUBLICATIONS

Molotsky and Weaver, Jr. "Briefing; play it again, on hold" New York Time, Aug. 25, 1985.*

Bruns, "Agency service review: phone system cross–sells customers" National Underwriter, Oct. 26, 1987.*

Hitchings, "It's really daylight robbery—or is it?" Nationwide News Pty Limited Herald, Aug. 26, 1987.*

Lee, "Jingles and radio spots make hits for Seattle Sound Studio" Scripps–Howard Business Publications et al. Sep. 2, 1985.*

Gillespie "Hold 'Em maximizes phone time, prevents costly lawsuits" San Antonio Business Journal, Feb. 29, 1988.*

US–Sprint;"US Sprint unveils fiber optic 800 service," Business Wire, May 20, 1987.

New Telnet Contracts, "US Sprint to launch 800 service in Sep., " Communications Daily, May 21, 1987.

Powers, Pam, "Toll–Free Fracas; US Sprint enter 800 service fray," Network World, May 25, 1987.

Wallace, Bob, "Marketing team banks on DEC–Rockwell link; Software blends power of VAX and Galaxy ACD," Network World, Feb. 1, 1988.

"Destination Wichita," Wichita Business, May 1988.

*Alaska–Airlines; (ALK) Alaska Airlines offers a Christmas gift to lift any occasion*,Business Wire, Nov. 10, 1986.

*The Teleconnect Dictionary*, ( Harry Newton ed., Bookcrafters, Chelsea, MI 1987).

"Galaxy Switching Products Integrated Switching System (ISS) Call Processing Functional Description," Rockwell International, Aug. 1984, Bates Nos.: Rockwell 03891–03934.

"PABX, Interconnect and the Future Office Controller," International Resource Development, Inc., Aug. 1980, Report #139.

"Common Channel Interoffice Signaling," Bell System Technical Journal (series of articles), Feb. 1978, vol. 57, No. 2, pp. 225–282 [table of contents only].

Kettley, A.W. et al., "TSPS No. 1; Operational Programs," Bell System Technical Journal, Nov. 1970, vol. 49, No. 9, pp. 2625–2623.

Helsey, G., et al., "Building Blocks, D–MUMS Delphi Multi–Media Universal Messaging System, The Building Block Concept, An Overview," Sep. 21, 1981 [Lotito Supplemental Materials 2, Bates Nos. TMOB 360–0010615 to TMOB 360–0010733].

Delphi Communications Corporation, Delta 2 System Concepts and Facilities, vol. 1, System Architecture, Jul. 1981 [Lotito Supplemental Materials 4, Bates Nos. TMOB__360–0010791 to TMOB__360–0010990].

"Store & Forward Voice Switching," Report 145, International Resource Development Inc., Jan. 1980 [Lotito Supplemental Materials 6, Bates Nos. TMOB 360–0018165 to TMOB 360–0018177].

Hattori, Shimmi et al., "A Design Model for a Real–Time Voice Storage System," IEEE Transactions on Communications, vol. COM–30, No. 1, Jan. 1982 [Lotito Supplemental Materials 7, Bates Nos. TMOB__360–0018178 to TMOB __360–0018181].

Molotsky, Irvin, et al., "Briefing; Play It Again, On Hold," The New York Times, Aug. 25, 1985.

Bruns, Don, "Agency service review: phone system cross–sells customers," National Underwriter (Property & Casualty/Employee Benefits Ed.). Cincinnati, Issue 43, pp. 38, Oct. 26, 1987.

Hitchings, B., "It's really daylight robbery—or is it?" Nationwide News Pty Limited Herald, Aug. 26, 1987.

Lee, Gordon, "Jingles and Radio Spots Make Hits for Seattle Sound Studio Puget Sound B," Scripps–Howard Business Publications 1985; Business Dateline; Puget Sound Business Journal, Sep. 2, 1985.

Gillespie, Jon, "Hold 'Em Maximizes Phone Time, Prevents Costly Lawsuits," San Antonio Business Journal, San Antonio, vol. 2, Issue 6; Sec. 1, p. 13, Feb. 29, 1988.

Robert Self, *AT&T Kills 800 Service*, Inbound/Outbound, May 1988.

Wallace, Bob, "Call It Telethievery," ComputerWorld, Jul. 4, 1984, pp. 31–33, 35–36.

S. Sirazi, C. Bestler, T. Rossen and G. Reichard, Jr., "Comparative Study of Hybrid–IPPV Implementations," *NCTA Technical Papers*, 1985, pp. 27–33, presented Jun. 3, 1985 to Cable 85, in Las Vegas, NV.

S. Thomas Emerson, "Voice Response Systems—Technology to the Rescue for Business Users", *Speech Technology*—Jan./Feb. 1983.

Yoshizawa et al., "Voice Response System for Telephone Betting," *Hitachi Review*—Jun. 1977.

Lexis Search Results (Great American Potato–Chip giveaway/Raisin Bran Game/Giants Baseball Trivia—Dial Info): "In The Chips" AdWeek, Jul. 22, 1985.

"San–Fran–Police–League", Business Wire, Aug. 2, 1985.

"Similar Campaigns", DM News, Dec. 15, 1985.

"Phone–Offers Action At Push Of Button", Advertising Age, Feb. 6, 1986.

Boies, Stephen J., "A Computer Based Audio Communication System", *Computer Sciences Department*, Thomas J. Watson Research Center, Yorktown Heights, New York, USA, pp. 701–704—(Article) (Undated).

Winckelmann, W.A., "Automatic Intercept Service", *Bell Laboratories Record*, May 1968, vol. 46, No. 5, pp. 138–143—(Article).

"Proposed Agreement Between National Enterprises Board (N.E.B.) and Delphi", Jan. 30, 1979.

Voysey, Hedley, "Nexos wins rights to comms engine", *Computing*, Sep. 6, ??, vol. 7, No. 36—(Article).

"Appraisal Of The Fair Market Value Of Delphi Communications", Apr. 30, 1980—(Study) Delphi Communications—(Charts and Exhibits).

"Voice–Response System Improves Order Entry, Inventory Control", *Communication News*, Aug. 1976—(Article).

"Periphonics VOICEPACK"—(Brochure) (Undated).

"The Voice Response Peripheral That Turnes Every Touch–Tone Telephone Into A Computer Terminal". Periphonics Corporation—(Brochure) (Undated).

Rabin, Jeff, "Minorities Seek 30% Share of All Lottery Operations", *Sacramento Bee*, Apr. 12, 1985—(Article).

Advertisements (Dial Giants Baseball Trivia Game): *San Francisco Chronicle*, Jul. 3, 1984.

Curtis, Cathy, "976 numbers let you dial–a–whatever", *San Francisco Business Journal*, Nov. 26, 1984—(Article).

Ferrell, Jane, "Three little numbers for instant information", *San Francisco Chronicle*, Aug. 15, 1984—(Article).

"Dallas Telephone Call–In Game Uses Computer Voice Interface", Sep. 24, 1984—(Press Release).

Rivest, R.L., et al., "A Method for Obtaining Digital Signatures and Public–Key Cryptosystems", *Communications of the ACM*, Feb. 1978, vol. 21, No. 2, pp. 120–126—(Article).

Finnigan, Paul F, "Audiotex: The telephone as data–access equipment", *Data Communications*, 1987, pp. 155–161 (Article).

Ozawa, Y., et al., "Voice Response System and Its Applications", *Hitachi Review*, Dec. 1979, vol. 28, No. 6, pp. 301–305—(Article).

"AT&T 2: Reaches agreement with Rockwell (ROK)", Aug. 26, 1986—(Press Release).

"AT&T: Expands Computer speech system product line", Apr. 14, 1986—(Press Release).

Adams, Cynthia, "Conversing With Computers", *Computerworld on Communications*, May 18, 1983, vol. 17, No. 20A, pp. 36–44—(Article).

Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).

Davidson, Leon, "A Pushbutton Telephone For Alphanumeric Input", *Datamation*, Apr. 1966, pp. 27–30—(Article).

Advertisement: Cuervo Gold Beach Chair, VoiceMail Int'l, '83.

"Digital's All–In–1 Voice Messaging", *Digital*—(Brochure) (Undated).

"Access Voice and Mail Messages From One Familiar Source", *Insight*,—(Article) (Undated).

"Get The Message. . . !" "New VoiceMail Features", *Voicemail International, Inc.*, Oct. 1984—(Article).

Brochures (TWA Crew Scheduling/PSA's Reservation System/Universal Studios Program/Dow Phone): "AVIAR The communication system that keeps you flying", VoiceMail Int'l,—(Brochure)(undated).

"TWA VOICEMAIL, Flight Attendants Users Guide" Aug. 1986,—(Brochure).

Holtzman, Henry, "Voice Mail Soars At TWA", *Modern Office Technology*(Reprint), Mar. 1986,—(Article).

"Bid Results via VOICEMAIL—Flight Deck Crew Members", May 1, 1985 (Script).

Borden, W.S., "Flight Attendant Self Input Of Monthly Bids Via Touch Tone Telephone", *In–Flight Services Bulletin*, Sep. 15, 1985—(Memo).

"Look Ma, no operators! Automatic voice system does many airline jobs", *Air Transport World*, Oct. 1986—(Article).

"1,000,000 Shares Common Stock" *Voicemail International, Inc.*, Jan. 10, 1984—(Public Offering Summary).

Levinson, S.E., et al., "A Conversational–Mode Airline Information and Reservation System Using Speech Input and Output", *The Bell System Technical Journal*, Jan. 1980, vol. 59, No. 1, pp. 119–137.

Emerson, S.T., "Voice Response Systems—Technology to the Rescue for Business Users", *Speech Technology*, Jan./Feb. '83, pp. 99–103—(Article).

Moslow, Jim, "Emergency reporting system for small communities", *Telephony*, Feb. 11, 1985, pp. 30–32, 34—(Article).

Rabiner, L.R., et al., "Digital Techniques for Computer Voice Response: Implementation and Applications", *Proceedings Of The IEEE*, Apr. 1976, vol. 64, No. 4, pp. 416–432—(Article).

Moosemiller, J.P., "AT&T's CONVERSANT™ I Voice System" *Speech Technology*, Mar./Apr. 1986, pp. 88–93—(Article).

Frank, R.J., et al., "No. 4 ESS: Mass Announcement Capability", *The Bell System Technical Journal*, Jul./Aug. 1981, vol. 60, No. 6, Part 2, pp. 1049–1081—(Chapter from a Book).

"Chapter I General Description" *D.I.A.L. PRM/Release 3–Version 2* Mar. 1987 (Product Reference Manual).

"Announcing Release 3.3" *D–A–S–H–D.I.A.L. Application and Support Hints*, Jan./Feb. Mar. 1987, vol. 3 No. 1—(Brochure).

"D.I.A.L. Software Release 4", *OPCOM*, Jan. 1988, Version 1—(Product Reference Manual).

Brady, R.L., et al., "Telephone Identifier Interface", *IBM Technical Disclosure Bulletin*, Oct. 1976, vol. 19, No. 5, pp. 1569–1571—(Article).

Corbett, A.J., "Telephone Enquiry System Using Synthetic Speech", *University of Essex*, Dec. 1974, (Thesis).

Yoshizawa, K., et al., "Voice Response System for Telephone Betting", *Hitachi Review*, Jun. 1977, vol. 26, No. 6—(Article).

Sagawa, S., et al., "Automatic Seal Reservation By Touch–Tone Telephone", *Second USA Japan Computer Conference*, 1975, vol. 2, pp. 290–294—(Article).

Smith, S.L., "Computer–Generated Speech and Man–Computer Interaction", *Human Factors*, 1970, 12(2), pp. 215–223—(Article).

Newhouse, A., et al., "On The Use Of Very Low Cost Terminals", *University of Houston*, pp. 240–249—(Paper) (Undated).

Mullen, R.W., "Telephone—home's friendliest Computer", *Inside Telephone Engineer And Management*, May 15, 1985, vol. 89, No. 10—(Article).

"Telephone Computing Entering Service Bureau Business", *American Banker*, Jul. 5, 1979—(Article).

Kutler, Jeffrey, "Technology, System Sharing Improve Phone Banking Outlook", *American Banker*, Dec. 7, 1979, vol. CXLIV, No. 237—(Article).

Kutler, Jeffrey, "Phone Bill Paying Accessed by Pioneer", *American Banker*, Dec. 7, 1979, vol. CXLIV, No. 237—(Article).

"User's Guide", *Dowphone*(Undated).

"Audiotex Information From Dow Jones", *The Computer Review*, Nov. 1984, vol. 2, No. 1—(Article).

"Dow Phone Adds Innovest Systems' Technical Analysis Reports" *IDP Report*, Jan. 3, 1986—(Report).

Perdue, R.J., et al., "Conversant 1 Voice System: Architecture and Applications", *AT&T Technical Journal*, Sep./Oct. 1986—(Article).

Martin, James, "Design of Man–Computer Dialogues", *IBM System Research Institute*, Chapter 16, pp. 283–306—(Chapter from a Book) (Undated).

Kaiseman, D.B., "The Role Of Audio Response In Data Collection Systems", *Proceedings of the Technical Sessions*, Palais des Expositions, Geneva, Switzerland, Jun. 17–19, 1980, pp. 247–251—(Article).

Boies, S.J., et al., "User Interface for Audio Communication System", *IBM Technical Disclosure Bulletin*, Dec. 1982, vol. 25, No. 7A, pp. 3371–3377—(Article).

Kramer, J.J., "Human Factors Problems in the Use of Push-button Telephones for Data Entry", *Bell Telephone Laboratories*, Holmdel, N.J., Apr. 74, pp. 241–258—(Paper).

Cox, Jr., Floyd, "Flora Fax", Jan. 22, 1986—(Letter and Advertisements).

Isayama, Tetsuya, "Automatic Response Processing Equipment as a Multi–media Communication Node", *Japan Telecommunications Review*, 1987, vol. 29, No. 1, pp. 29–36—(Article).

Imal, Y., et al., "Shared Audio Information System Using New Audio Response Unit" *Japan Telecommunications Review*, Oct. 1981, vol. 23, No. 4, pp. 383–390—(Article).

"Distrust of computer kills home service plan" (date and source missing).

"Automatic Call Distributor/Management Information System: Interface 1/1 AESS™Switch between Central Office and Customer Premises Equipment", *Bell Communications Research*, Dec. 1986, Technical Reference TR–TSY–000306, Issue 1—(Article).

"Comparison OF ACD Systems", *Connection*, Feb. 1990—(Chart).

"ACD Comparison", *Aspect*, Feb. 2, 1990—(Final Report).

Lanzeter, Ygal, "Automatic Identification System For Step–By–Step Exchanges", *The Ninth Convention of Electrical and Electronics Engineers In Israel*, Apr. 1975—(Paper).

Flanagan, J.L., et al. "Speech Synthesis", Chapters 1, 39, 42, 45 and 46—(Chapter from a Book).

"Bell Atlantic's Bolger Wants To Be Free", *Telephony*, Jul. 14, 1988—(Article).

"Advanced New Cable TV Technology Developed For Impulse–Pay–Per–View", Jun. 3, 1985—(Search).

Noll, M.A., "Introduction to Telephones & Telephone Systems", Second Edition, Chapter 9—(Chapter from a Book).

"Proposal for Kome Interactive Phone/Database Marketing Systems", "Mediavoice Startup Software Package For Kome".

"Optional Mediavoice Software Package For Kome".

"Why ATI Mediavoice Is The Choice For Success"—(Proposal).

Meade, Jim, Dec. 29, 1992—(Letter).

"All About Voice Response", *Datapro Research Corporation*, Delran, N.J., Mar. 1972 and Sept. 1974—(Article).

"Voice Response in Banking Applications", *Datapro Research Corporation*, Delran, N.J., Oct. 1974 and Feb. 1983—(Article).

Schiller, T.R., "Field Craft Technician Communication With A Host Computer Synthesized Voice", *Proceedings AVIOS '86 Voice I/O Systems Applications Conference*, Sep. 16–18, 1986.

Rabin, Richard, "Telephone Access Applications: The Growth Market For Voice Processing", *Proceedings AVIOS '86 Voice I/O Systems Applications Conference*, Oct. 6–8, 1987.

Schuster, E.R., "B.R.U.T.U.S. Better Registration Using Touch–Tone phones for University Students", *Proceedings AVIOS '86 Voice I/O Systems Applications Conference*, Oct. 4–6, 1988.

"Exxon's Next Prey. IBM and XEROX", *BusinessWeek*, Apr. 28, 1980, pp. 92–96 and 103—(Article).

Weinstein, S.B., "Emerging Telecommunications Needs of the Card Industry", *IEEE Communications Magazine*, Jul. 1984, vol. 22, No. 7, pp. 26–31—(Article).

"Riding Gain", *Broadcasting*, Mar. 7, 1983—(Article).

Pickup, Mike, "Bank from home, by screen or by phone", *Building Society Gazette*, Jul. 1988—(Article).

Pickup, Mike, "Voice Response", *Computer Systems*, Sep. 1986—(Article).

Rabiner, L.R., et al., "Isolated and Connected Word Recognition—Theory and Selected Applications", *IEEE Transaction Communications*, May 1981, Com. 29, No. 5, pp. 621, 622, 633, 644–646, 655–659—(Article).

Takahashi, K., et al., "The Audio Response System for Telephone Reservation".

U.D.C.Oka, Y., et al., "Development of Ventilating Equipment for Shinkansan Train", *U.D.C.*—(Articles in Japanese).

Pagones, M.J., et al., "New services follow increased digitization on the long–haul transmission network", *AT&T Bell Laboratories Record*, 1983, vol. 61, pp. 25–33—(Article).

"New phone service tells customer who's calling", *Bell Laboratories Record*, 1984, vol. 62, p. 9—(Article).

Hirschman, C.B., et al., "LASS: Putting the telephone customer in charge", *Bell Laboratories Record*, 1985, vol. 63, pp. 10–16—(Article).

"AT&T building communications network for Defense Department" and "AT&T inaugurates pay–per–view TV", *Bell Laboratories Record*, 1986, vol. 64, p. 2—(Article).

"Power To. . .", *Dialogic Corporation*, Littleton Road,—(unidentifiable Article).

"Representative Customer List For Interface Technology's Total Entry System", "Toes Solutions—Pharmaceutical Manufacturer", "The Voice Response Solution For Answering Customer/Sales Calls", "Toes Solutions—Orthopedic Equipment" and "Toes Solutions—Convenience Store"—(Articles).

Lummis, R.C., Speaker Verification: A Step Toward the "Checkless Society", *Bell Laboratories Record*, pp. 254–259—(Article).

Flanagan, J.L., et al., "Synthetic voices for computers", *IEEE Spectrum*, Oct. 1970, vol. 7, No. 10, pp. 22–45—(Article).

Rabiner, L.R., et al., "Computer Synthesis of Speech by Concatenation of Formant–Coded Words", *The Bell System Technical Journal*, May/Jun: 1971, pp. 1541–1558—(Chapter from a Book).

Flanagan, J.L., et al., "Wiring Telephone Apparatus from Computer–Generated Speech", *The Bell System Technical Journal*, Feb. 1972, pp. 391–397—Chapter from a Book).

Hornsby, Jr., Thomas G., "Voice Response Systems", *Modern Data*, Nov. 1972, pp. 46–50—(Article).

Diffie, W., et al., "New Directions In Cryptography", *IEEE Transactions On Information Theory*, Nov. 1976, vol. IT–22, No. 6, pp. 644–654—(Article).

Rosenthal, L.H., et al., "Automatic voice response: Interfacing man with machine", *IEEE Spectrum*, Jul. 1974, vol. 11, No. 7—(Article).

Rosenthal, L.H., et al., "A Multiline Computer Voice Response Utilizing ADPCM Coded Speech", *IEEE Transactions on Acoustics, Speech, and Signal Processing*, Oct. 1974, vol. ASSP–22, No. 5, pp. 339–352—(Article).

Flanagan, James L., "Computers that Talk and Listen: Man–Machine Communication by Voice", *Proceedings for the IEEE*, Apr. 1976, vol. 64, No. 4, pp. 405–415—(Article).

Maisel, Ivan, "To Put Your Baseball Savvy On The Line, Pick Up The Phone And Call", *Sports Illustrated*, Sep. 3, 1984—(Script).

Brown, Merrill, "Hollywood Saga: Who Bought J.R.?", *The Washington Post*, Final Edition, Oct. 14, 1984—(Script).

"Special Olympics; Teams with baseball trivia expert Brad Curtis", *Business Wire*, Sep. 30, 1985—(Script).

Lucas, W.A., et al., "The Spartanburg Interactive Cable Experiments In Home Education", *Rand Corp.*, U.S. Department of Commerce, National Technical Information Service, Feb., 1979—(Publication).

Martin, James, "Viewdata And The Information Society", —(Book).

Gawrys, G.W., "Ushering In The Era Of ISDN", *AT&T Technology*, 1986, vol. 1, No. 1, pp. 2–9—(Article).

Cummings, J.L., et al., "AT&T Network Architecture Evolution", *AT&T Technical Journal*, May/Jun. 1987, vol. 66, Issue 3, pp. 2–12—(Article).

Yates, C.E., "Telemarketing And Technology: Perfect Business Partners", *AT&T Technology*, 1987; vol. 1, No. 3, pp. 48–55—(Article).

Herr, T.J., "ISDN Applications In Public Switched Networks", *AT&T Technology*, 1987, vol. 2, No. 3, pp. 56–65—(Article).

"Only the best. Only from Florafax", *Florafax*—(Advertisement).

Aldefeld, B., et al., "Automated Directory Listing Retrieval System Based on Isolated Word Recognition", *Proceedings of the IEEE*, Nov. 1980, vol. 68, No. 11, pp. 1364–1379—(Article).

Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).

Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).

"The Voicestar Series By Periphonics", *Periphonics*, Jan. 1986—(Publication).

"Bank–From–Home system by Periphonics Corporation".

"Bill Payment Success–Story", *Periphonics Corporation*.

"A History of Imagination", *Periphonics*.

"Banking Success Story", *Periphonics Corporation*.

"DataVoice and the PDT II", *Periphonics Corporation*.

"Banking Success Story", *Periphonics Corporation*—(Brochures).

Schulman, Roger, "TeleLearning: The Computer Brings the Classroom Home", *Family Computing*, Sep. 1984, pp. 50–53—(Article).

"ICS launches new ?–home interactive video service package", *Cable Vision*, Sep. 3, 1984, pp. 71/73—(Article).

"The Remarketing of Prestel", *Which Computer?*, Aug. 1984, pp. 106, 107 and ?—(Article).

"Four–Line TeleClerk Calls, Answers, Stores, Surveys", *Hardcopy*, Jan. 1985, vol. 14, No. 1—(Article).

"Peripheral Speaks On Phone", *Hardcopy*, Dec. 1984—(Article).

Page from *What's new in Computing*, Apr. 1985—(Article).

Page from *Today*, A Compuserve Publication, Jun. 1985—(Article).

Page from *Computer Communications*, Feb. 1984, vol. 7, No. 1—(Article).

Gits, Victoria, "Interactive device doesn't interrupt telephone calls", *Cable Vision*, Jun. 17, 1985, p. 20—(Article).

Cullwik, Tony, "Reach Out & Touch The Unix System", *Unix Review*, Jun. 1985, pp. 50, 52, 53, 56—(Article).

Blackwell, Gerry, "Dial–a–Quote: first Candian commercial audiotex service", *Computing Canada*,—(Article).

Applebaum, Simon, "Two–way television", *Cable Vision*, Aug. 8, 1983, p. 66—(Article).

Sw??ne, Michael, "Fiber–optic TV network lets viewers talk back", *Info World*—(Article).

Morrill, C.S., et al., "User Input Mode and Computer–Aided Instruction", *Human Factors*, 1968, 10(3), pp. 225–232—(Chapter from a book).

Results of Lexis Search Request for "Dial Info or DialInfo", Date of Search Apr. 13, 1992, pp. 1–38.

Results of Lexis Search Request for "Phone Programs or International Information Network", Date of Search Apr. 15, 1992, pp. 1–35.

Van Gieson, Jr. W.D., et al., "Machine–Generated Speech For Use With Computers, and the problem of fitting a spoken word into one half second", *Computers and Automation*, Nov. 1968, pp. 31–34—(Article).

Patel, Jay, "Utility of voice response system depends on its flexibility", *Bank Systems& Equipment*, Dec. 1988, pp. 101/103—(Article).

Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25—(Article).

Gaines, B.R., et al., "Some Experience in Interactive System Development and Application", *Proceedings of the IEEE*, Jun. 1975, vol. 63, No. 6, pp. 894–911—(Article).

"Application For Registration Of Equipment To Be Connected To The Telephone Network", *Federal Communication Commission*, FCC Form 730.

Dudley, Homer, "The Vocoder", Circuit Research Department, Dec. 1939, pp. 122–128—(Chapter from a book).

"Voice Response System Order Entry, Inventory Control".

"Vendor Index", *Audiotex Directory&Buyer's Guide*, Fall/Winter 1989/90, pp. 114–156.

Francas, M., et al., "Input Devices For Public Videotex Services", *Human–Computer Interaction—INTERACT '84*, 1985, pp. 171–175—(Paper).

Labrador, C., et al., "Experiments in Speech Interaction With Conmentional Data Services", *Human–Computer Interaction—INTERACT '84*, 1985, pp. 225–229—(Paper).

Long, J., et al., "Transaction Processing Using Videotex or Shopping on Prestel", *Human–Computer Interaction—INTERACT '84*, 1985, pp. 251–255—(Paper).

*Electrical Communication*, 1981, vol. 56, Nos. 1–4, pp. 1–110—(Paper).

Conway, R.W., et al., "Tele–CUPL: A Telephone Time Sharing System", *Communication of the ACM*, Sep. 1967, vol. 10, No. 9, pp. 538–542—(Article).

Marill, T., et al., "DATA–DIAL: Two–Way Communication with Computers From Ordinary Dial Telephones", *Communications of the ACM*, Oct. 1963, vol. 6, No. 10, pp. 622–624—(Article).

Witten, I.H., "Communicating With Microcomputers", pp. 121–158—(Chapter from a Book).

"Call–It–Co. Hangs Up On Dial–It In Four Markets", *The 976 Exchange*, 1984, vol. 2, pp. 1–6 (Article).

"DECtalk Help Boston's Shawmut Bank Cut Costs And Improve Service", *Digital*—(Article).

"VTK 81 Voice Computer", *Voicetek*, 1987 (Brochure).

"How a Computerized "Voice" Answers Customers'Inquiries", *Bank Automation Newsletter*Feb. 1985, vol. 19, No. 2 (Article).

Rickman, J., et al., "Speech Synthesizers—Communications Interface—Implementing A Touch Tone Telephone Talker With DECtalk", *The DEC Professional*, May 1985, pp. 38, 39, 42–44 (Article).

"DECTALK DELIVERS", *Digital Review*, Sep. 1985—(Article)—"DEtalk turns a telephone into a terminal"—"UNIX and Digital",—"Legal protection for semiconductor chips",—"Product safety",—*DECWORLD*, Apr. 1985, vol. 9, No. 2, pp. 1, 3, 5, 6–8—(Article).

"UNIX and Digital", —.

"Product safety", —*DECWORLD*, Apr. 1985, vol. 9, No. 2, pp. 1, 3, 5, 6–8—(Article).

"DECtalk: A New Text–to–Speech Product" *Digital Guideline*, Mar. 1984, vol. 8, No. 3, pp. 1–8—(Article).

*Straight Talk*, A Newsletter about the DECtalk Speech Synthesizer from Digital Equipment Corporation, vol. 1, No. 1, pp. 1–6.

*Straight Talk*, A Newsletter about the DECtalk Speech Synthesizer from Digital Equipment Corporation, vol. 1, No. 2, pp. 1–7.

*Straight Talk*, A Newsletter about the DECtalk Speech Synthesizer from Digital Equipment Corporation, vol. 1, No. 3, pp. 1–8.

*Straight Talk*, A Newsletter about the DECtalk Speech Synthesizer from Digital Equipment Corporation, vol. 1, No. 4, pp. 1–8.

*Straight Talk*, A Newsletter about the DECtalk Speech Synthesizer from Digital Equipment Corporation, vol. 2, No. 2, pp. 1–8.

*Straight Talk*, A Newsletter about the DECtalk Speech Synthesizer from Digital Equipment Corporation, vol. 2, No. 4, pp. 1–8.

Various References/Articles attached with a letter from Smithwin Associates, dated Apr. 22, 1992: Riley A.A., "Latest 2–way communication by computer and telephone"??evens, W.?., "Computer Helps Children to Add", *The New York Times*, Apr. 20, 1970.

Harvey, R.W., *Times*, The Kiplinger Magazine "A Computerized System ???", Nov. 23, 1970, p. 14, (unidentifiable Article).

"Hardware for the 'cashless society'", *Electronic Design 3*, Feb. 4, 1971, p. 26.

Tennant, R.P., "Advanced credit system smooths operation and hastens payout", *Data Processing Magazine*, Jun. 1971, vol. 13, No. 6, pp. 34–35.

"Computers that talk back to you", *Business Week*, Date ??.

Smith, Gene, "Chatting Via Computer", *New York Times*, Sep. 12, 1971.

*EDP Weekly*, (unidentifiable Article).

"Did Anybody Here Call a Computer", *Data Management*, Feb. 196?.

Skala, Martin, "Straight talk from a computer", *Christian Science Monitor*, Jun. 14, 1973.

"Computer for Watergate Probe", *Science*, Jun. 15, 1973.

"Tapping AT&T for a $50–million refund", *Business Week*, Jun. 9, 1973.

"Distrust of computer kills home service plan".

Schrerer, Ron, "Chitchat with a computer", *Christian Science Monitor*, Apr. 16, 1975, p. 2.

"Trying Out the Pay–by–Phone Service", *Technology Review*, Mar./Apr. 1976, p. 15.

"Pentagon seeks more control", *Electronics*, Apr. 5, 1976, p. 39.

"Everyman's Computer Terminal", *Industrial Research*, Mar./Apr. 1976, p. 14.

"DOD could save on test equipment".

"Talking computer speeds Ford parts", Apr. 25, 1976.

"Customers of Ten Banks Paying Bills by Phone", *Computer World*, 1976, p. 12.

"FAA to test computerized voice response to queries from pilots", *Electronics*, Nov. 25, 1976, p. 43.

Miller, F.W., "Voice Response Comes to Life with Order Entry", *Infosystems*, Oct. 1981, pp. 62/64.

Suppes, Patrick, "University–Level Computer–Assisted Instruction At Stanford: 1968–1980", *Institute for Mathematical Studies In The Social Sciences, Stanford University*, 1981, pp. 589–716.
Lerner, E.J., "Products that talk", *IEEE spectrum*, Jul. 1982, pp. 32–37.
Carlsen, Clifford, "Megaphone plans to blare message on national scale", *Times*, Mar. 2, 1987.
Michelson, Marlene, "All kinds of information at your fingertips by phone", *Business Times*, Sep. 8, 1986, vol. 3, No. 19.
Lacter, Mark, "At Megaphone, It's Always Show Time", *San Francisco Chronicle*, Jun. 9, 1986.
Table of Contents, *Megaphone Press Book*, pp. 1–3.
"Miss Simpson, will you dial–a–joke for me please?", Cartoon.
Lacter, Mark, "Narrating Fantasy Messages—It's No Dream Job", *San Francisco Chronicle*, Jun. 9, 1986.
"Megaphone Serves High–Tech Showbiz", *San Francisco Chronicle*, Jun. 9, 1986.
"Megaphone Reaches Unique Market", *San Francisco Chronicle*, Jun. 9, 1986.
Feuer, Jack, "Asher/Gould: Megaphone Dials–a–Shop", *Adweek*, May 12, 1986.
Symanovich, Steve, "Novelty over for phone porn vendors", and continuation "Big firms breathing down necks of small phone porn outfits" *San Francisco Business Journal*, May 5, 1986.
Wilke, John, "A 'Dream' Business That's Just A Phone Call Away", *Information Processing*.
Ketcham, D.E., "Dial–a–You–Name–It", *San Francisco Chronicle*, 1986.
Carter, Alan, "What? You didn't know Erica was engaged again?", *Daily News*, Mar. 12, 1986.
"Firm plugs into sales with time, temp lines", *Crain's New York Business*, Mar. 3, 1986, vol. II, No. 9.
Pitts, Gail, "Phone–in trivia games ring up profits", *The Denver Post*, Feb. 3, 1986.
"Merge Towards Success" IIN and Megaphone, *The 976 Exchange*, Winter 19?6, vol. 4.
Nelson, David, "From dating to soap operas, 976 numbers come on line", *San Jose Business Journal Magazine*, Jan. 27, 1986.
Greengard, Samuel, "Dial–A–Deluge", *Business*, Nov. 1985.
"Numbers, Please", *Business*, Nov. 1985.
"The 976 Telelease Co.", *Business Opportunities Journal*, Dec. 1985.
"One–time refund for '976' charges", *San Francisco Examiner*, Nov. 7, 1985.
Kent, Debra, "Interactive phone network stretches for calls", *Advertising Age*, Oct. 17, 198?.
"Making Your Phone Talk To Computers", *U.S. News*, Sep. 23, 1985.
Mulqueen, John, "Int'l Information Network Eyes Contact With British Telecom", *Communications Week*, Sep. ??.
Moorhead, Derrol, "Humor, romance: just a call away", *Rocky Mountain Collegian*, Sep. 19, 1985, vol. 94, Iss. 32.
Keppel, Bruce, "Move Under Way to Curb Abuse of Popular Dial–It Service", *Los Angeles Times*, Sep. 1, 1985.
"Dial–a–stock", *Forbes*, Aug. 1985.
Sowa, Tom, "Games people play now include phone trivia", *Spokesman–Review*, Jul. 1985.

Dougherty, P.H., "Advertising Telephone Is Growing As Medium", *The New York Times*, Jul. 17, 1985.
Larson, Judy, "976 numbers entice adults–and kids", *Fremont Argas*, Jul. 8, 1985.
Barbieri, Richard, "Prime Time for the Telephone", *Channels*, May/Jun. 1985, pp. 54–55.
"Bank Provides Financial Fuel To Fast Track Company", *The Financial Center Bank*, First Quarter 1985, vol. II, No. 1.
"Don't Phone Santa", *San Francisco Chronicle*, Letters to the Editor, Mar. 29, 1985.
Carvalho, Deborah, "Will Hillary find happiness with Bob?", *Contra Costa Times*, Mar. 15, 1985.
Murphy, Win, "Dial–a–romance", Mar. 13–19, 1985.
?, Martha, "Love, laughs, luck: Just a phone call away", *Burlington County Times*, Feb. 17, 1985.
Robinett, Stephen, "Blood From A Rock", *Venture*, Jan. 1985, pp. 38–41, 44–45.
Du Brow, Rick, "Lates hot lines for instant trivia pursuit", *Los Angeles Herald Examiner*, Dec. 6, 1984.
"Keep up with favorite soap operas", *Contra Costa Times*, Nov. 30, 1984.
Hanna, Barbara, "Inside Radio/TV".
Behr, Debra, "Victory makes and writes its own on–the–road news", and "Whose calling? Michael fans most likely. . .", *Los Angeles Times*, Nov. 29, 1984.
"Newcomer MEGAPHONE Has Magnanimous Goals", *The 976 Exchange*, Fall 1984, vol. 2.
"Phone Santa", *Vecaville Reporter*, Nov. 10, 1984.
"Dial 976 for Profits", *Time*, Sep. 3, 1984.
Pendleton, Mike, "For A Fee Your Phone Can Inform", *Burrelle's*, Jul. 19, 1984.
"Phone numbers to get details about soaps", *Burrelle's*, Jul. 18, 1984.
Gansberg, A.L., "976 phone prefix as new entertainment fad", *The Hollywood Reporter*, Jun. 21, 1984.
Carvalho, Deborah, "Another 'GH' actor discontented with the soap", *Contra Costa Times*, May 26, 1984, p. 4.
"Keep up with your favorite soap operas", *San Francisco Examiner*.
Du Brow, Rick, "Dial–a–soap' service offers daily TV summaries", *Los Angeles Herald Examiner*, Apr. 26, 1984.
News briefs, Feb. 1968.
Martin, J., et al., "The Computerized Society—An apprisal of the Impact of computers on society over the next fifteen years", Chapter 10, pp. 211–226—(Chapter from a Book).
New products, *Datamation*, Jul. 1966, vol. 12, No. 7, pp. 7/89—(Article).
Meacham, L.A., et al., "Tone Ringing and Pushbutton Calling", *The Bell System Technical Journal*, 1958, pp. 339–360—(Book).
Suppes, Patrick, "The Uses of Computers In Education", *Scientific American*, Sep. 1966, vol. 215, No. 3, pp.—(Article).
Bruckert, E., et al., "Three–tiered software and VLSI aid developmental system to read text aloud", *Electronics*, Apr. 21, 1983, pp. 133–138—(Article).
Hochman, David, "Implementing Automatic Number Identification", *Telecommunications*, Dec., 1978, vol. 12, No. 12—(Article).
Martin, James, "Telecommunications and the Computer", 2nd Edition, Introduction, pp. 20–23, Chapter 5, pp. 94–95, Chapter 18—(Chapter from a Book).

Martin, James, "Telematic Society", Chapter 6, pp. 45–48, Chapter 9, pp. 67–69, Chapter 20, pp. 181–188—(Chapters from a Book).
Martin, James, "The Wired Society", pp. 53–55, 71–79, 99–100, 204–205, 229–231—(Chapters from a Book).
Martin, James "Future Developments in Tele–Communications", 2nd Edition, Box A, Chapter 1, p. 5, Chapter 7, pp. 95–111, Chapter 9, pp. 149–105, Chapter 12, pp. 207–209, Chapter 18, pp. 310–311, Chapter 19, pp. 314–317, 320, Chapter 20, p. 330, Chapter 23, pp. 379–401—(Chapters from a Book).
Ferrarini, E.M., "Infomania", pp. 59–61, 176–177, 191, 213–214, 223, 245, 250, 257, 285, 286—(Book).
Kimura, Y., et al., "Audio Response System", vol. 55, No. 10, pp. 49–54—(Article in Japanese).
Takano, H., "Characteristics of Multipair Exchange Area Telephone Cable with Cellular Polyethylene Insulation by Gas Injection Blouing", p. 55—(Article in Japanese).
Takahashi, T., et al., "SR–2000 Voice Processor and Its Application", *NEC Research and Development*, 1984, No. 73, pp. 98–105—(Paper).
"Concept Diagram Voicemail International System".
"Voicemail Instruction Manual", *Televoice International*, Jun. 1981, Index.
Eckhouse, John, "Voice mail spells relief for phone frustration", *San Francisco Examiner*, Feb. 7, 1982—(Article).
Meade, Jim, "Throw away those pink Call–back slips", *InterOffice*, Jan./Feb. 1984, vol. 3, No. 1—(Article).
Welsh, Jack, "Everybody's Talking About Talking Bouquets", *Design for Profit*, Spring 1986, pp. 7–10—(Article).
Mosco, Vincent, "Pushbutton Fantasies", Contents, Chapter 3 and 4, pp. 67–118—(Chapters from a Book).
Bretz, Rudy, "Media for Interactive Communication", Chapter 5, pp. 110–116, Chapter 7, pp. 143–153—(Chapters from a Book).
Robinson, G., et al. ""Touch–Tone "Teletext A Combined Teletext–Viewdata System", *IEEE Transactions on Consumer Electronics*, Jul. 1979, vol. CE–25, No. 3, pp. 298–303—(Article).
Voice News, Mar. 1982.
Voice News, Jun. 1982, William W. Creitz.
Voice News, Oct. 1982, p. 5.
Voice News, Nov./Dec. 1983.
"Consultant Report 28?", *AIS American Bell Advanced Information Systems*, Apr. 1983, pp. 27, 118–119, 123–124—(Report).
"T–1 Board Sets Deliver High Performance All Digital T–1 Solutions", *NMS Natural MicroSystems*—(Product Bulletin).
"VBX Product Family Overview", *NMS Natural MicroSystems*, pp. 1–20—(Brochure).
"Machine Operation Maual", May 12, 1978, Issue 1, pp. 1–3, 9–10—(Manual).
Davey, J.P., "Dytel Western Region Sales Training Maual", 1985—(Manual).
Gutcho, Lynette, "DECtalk—A Year Later", *Speech Technology*, Aug./Sep. 1985, pp. 98–102—(Article).
Daniels, Richard, "Automating Customer Service", *Insurance Software Review*, Aug./Sep. 1989, pp. 60–62—(Article).
Golbey, S.B., "Fingertip Flight Service", Oct. 1985—(Article).
"ARO Goes Pushbutton", *Newsletter*, Nov. 1985, p. 9—(Article).

"ROLM Centralized Attendant Service", *ROLM Corporation*, 1979.
"AIS, Versatile Efficient Information Service", *Fujitsu Limited*, 1972, pp. 153–162—(Brochure).
Smith, S.L., et al., "Alphabetic Data Entry Via the Touch–Tone Pad: A Comment", *Human Factors*, 1971, 13(2), pp. 189–190—(Book).
Holtzman, Henry, "Still an Infant Technology VOICE MAIL", *Modern Office Technology*, Jun. 1985, pp. 78–80, 82, 84, 90—(Article).
Leander, Monica, "Voice Response—A Technology for Solving Management Problems", *Speech Technology*, Mar./Apr. 1986, pp. 50–52—(Article).
Stolker, Bud, "CompuCorder speech storage and output device. (evaluation)", *Creative Computing*, Jul. 1983, pp. 1–7.
Witten, I.H., et al., "The Telephone Enquiry Service: a man–machine system using synthetic speech", *Int. J. Man–Machine Studies*, Jul. 1977, 9, pp. 449–464—(Book).
Gould, R.L., "Fidelity's Automated Voice Response System", *Telecommunications*, Jan. 1981, pp. 27–28—(Article).
"Fidelity Automated Service Telephone", *Fidelity Group*, 4 pages—(Manual).
"Data Set 407 Interface Specification", *Manager—Data Systems & Operations*, Jun. 1975, Issue 2, pp. 1–69 plus Table of Contents—(Manual).
Fitzwilliam, J.W., et al., "Transaction Network, Telephones, and Terminals", *The Bell System Technical Journal*, Dec. 1978, vol. 57, No. 10, pp. 3325–3537—(Book).
*Inbound Outbound*, May 1988, complete issue.
Koch, Helmut, "Concord Design Services , Inc. Corporate Description", *Exacom*.
Federal Communications Commission, FDC Form 484, Registration, Registrant: Concord Design Services, Inc.
*Exacom Telecommunication Systems*—Brochure.
General Description Installation and Operation Manual for Direct Inward Dial (DID) Trunk Interface Unit, *Exacom Telecommunication Systems*, Nov. 21, 1989, Issue 3—(Manual).
General Description Installation and Operation Manual for Answering Service Monitor System, *Concord Design Services, Inc.*, Dec. 19, 1986, Issue 1—Manual.
"Dialogic Voice Solutions", *Dialogic Corporation*, pp. 1–72.
"Why Is T–1 Important And How Can It Be Used", *Dialogic Corporation*, Application Note, pp. 1–6.
"Use of Dialogic T–1 For Telemarketing Applications", *Dialogic Corporation*, Application Note, pp. 1–6.
"Use of Dialogic T–1 In Operator Service Applications", *Dialogic Corporation*, Application Note, pp. 1–6.
"Use of Dialogic T–1 In Telephone Company Networks", *Dialogic Corporation*, Application Note, pp. 1–10.
"Use of Dialogic T–1 Equipment in CPE Gateways", *Dialogic Corporation*, Application Note, pp. 1–4.
"Integrating Analog Devices Into Dialogic–Based T–1 Voice Processing Systems", *Dialogic Corporation*, Application Note, pp. 1–16.
"Use of Dialogic Components in Automatic Number Identification (ANI) Systems", *Dialogic Corporation*, Application Note, pp. 1–16.
"Dialogic Unit Pricing", pp. 1–6.
"Voice '92 Spring Conference & Exposition", 1992, pp. 1–24—(Brochure).
"Telecom Developers '92", Jan. 1992—(Advertisement).

Newton, Henry, "The Sheer Thrill Of It All", *Teleconnect*, May 1991.

"AFIPS Conference Proceedings", 1987 National Computer Conference, Jun. 15–18, 1987, Chicago, Illinois "Dynamic Network Allocation".

"Calling your computer is as easy as calling your broker, says AT&T", *Record*, Nov. 1985.

Singleton, L.A., "Telecommunications in the Information Age", Chapter 12, pp. 115–125—(Chapter from a Book).

Weitzen, H.S., "Telephone Magic", pp. 28–31, 38–39, 54–55, 62–67, 70–79, 82–85, 88–91, 106–115, 118–121, 126–127, 134–137, 176–177, Index—(Chapters from a Book).

Weitzen, H.S., et al., "Infopreneurs", pp. 18–19, 138–145, 206–209, Index—(Chapters from a Book).

Sullivan, Kathleen, "Paper firm relies on voice–based inventory system", *IDG Communications, Inc.*, Sep. 10, 1984—(Script).

"VTK Training Section", and "Disk Initialization Procedures for VTK–30/60", *Voicetek Corporation*—(Manual).

"VoiceStor Systems Integration Guide", *Voicetek Corporation*, May 2, 1983—(Manual).

"VTK 60 Voice Computer—Technical Description", *Voicetek Corporation*, Oct. 1986—(Manual).

"Voicetek VS–50 Telephone Interface System", Apr. 25, 1984, System Integration Guide—(Manual).

"VTK Voice System—Programmers Guide", *Voicetek*—(Manual).

"Disk Initialization Procedures for VTK–30/60", *Voicetek Corporation*—(Manual).

"VTK81 Voice Computer—Technical Description", *Voicetek Corporation*, Oct. 1986—(Manual).

"VTK Voice System—VTK/CE Guide", *Voicetek*, Jul. 6, 1987—(Manual).

Newton, Harry, "Newton's Telecom dictionary", *Telecom Library Inc.*, 1991—(Advertisement).

"1987 Buyers Guide", *Teleconnect*, Jul. 1987, pp. 197–210—(Brochure).

Syntellect Inc.—Advertisements.

Various copies of Business cards.

Guncheon, M.C., "The Incredible Dial–A–Message Directory", *Contemporary Books, Inc.*, 1985—(Directory).

"Voice Box Maintenance Manual", *Periphonics*, 1986—(Manual).

"Voicepac Maintenance Manual", *Periphonics*, 1984—(Manual).

Dyer, Ellen, "Wichita Firm Sells 25% Share", Dec. 14, 1987, and "Spectrum Carving Role In Volatile Business", Jul. 7, 1986, Search Results.

"Don't Miss The Unique Gift Idea Of The Year", *Yam Educational Software*, 1987—(Advertisement).

"Welcome to the future of advertising", *Teleline, Inc.*, 1990—(Presentation).

"Greeting Card Project", *Teleline, Inc.*, Nov. 7, 1988—(Flow Chart).

Sharkey, Betsy, "Dialing for Dollars and Data", *Adweek*, Nov. 16, 1987, pp. 6–8—(Article).

Gay, Verne, "CBS may tie rates to buying p?", 1988—(Article).

Flanagan, J.L., et al., "Synthetic Voices For Computers", *IEEE International Conference on Communications*, 1970, pp. 45–9 –45–10—(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2—(Paper).

"DT1000 DIGITALKER Speech Synthesis Evaluation Board", *National Semiconductor Corp.*, Oct. 1980—(Manual).

"Data Set 407C Interface Specifications Nov. 1977", *Bell System Technical Reference*, Nov. 1977, pp. 1–50—(Paper).

Broomfield, R.A., et al., "Making a data terminal out of the Touch–Tone telephone", *Electronics*, Jul. 3, 1980, pp. 124–129—(Paper).

Godfrey, D., et al., "The Telidon Book—Designing and Using Videotek Systems", pp. 1–103—(Book).

"Industry Marketing Bulletin", *Honeywell EDP Wellesley Hills*, Aug. 9, 1967.

"Honeywell Communications Configuration Charts And Aids In Designing", *Data Communications*, pp. 3–1–3–7 and A.

"Burroughs Audio Response System", Reference Information for Sales Representatives, pp. 1–6.

"New Product Announcement", *Burroughs Corporation*, Feb. 5, 1968.

"Stand–Alone Lockbox Application Voice Response (Slave) Communication System Functional Specification", *Cognitronics Corporation*, Feb. 19, 1982, p. 21.

"Unlock lockbox reporting. with Cognitronics Voice Response Communications System/Banking", *Speech–maker a division of Cognitronics Corporation*.

"Voice Response for Banking", *Cognitronics Corporation*-(Brochure).

"Voice response application brief", *Speech–maker*—(Brochure).

"Instant credit authorization is an easy touch when any telephone is a *voice response*computer terminal", *Speech–maker a division of Cognitronics Corporation*—(Article).

Slutsker, Gary, "Relationship marketing", *Forbes*, Apr. 3, 1989—(Article).

Finnigan, P.F., "To Our Shareholders", Jun. 1985, Apr. 7, 1986, Apr. 10, 1987—(Letters).

"International Programs" (Voicemail).

Finnigan, "Our guest", *Radio–Schweitz AG Telekommunikation und Flugsicherung*, Jan. 1983, pp. 12–14—(Bulletin).

Finnigan, P.F., "Voice mail", *1983 National Computer Conference*, May 16–19, 1983, Anaheim, CA, pp. 375–377 and Abstract.

"Conversations in Your Mailbox", *Software News*, Jan. 1985—(Article).

Fredric, Paul, "Voice Int'l Radio Page America To Offer A 'Pocket News Network'", *Communications Week*, Jul. 8, 1985—(Article).

"Voice–Messaging System: Use It While You're In, Not Out", *Information WEEK*—(Article).

"Corporate Performance—Companies To Watch", *Fortune*, Sep. 30, 1985—(Article).

"Dream Weaver", *Jon Lindy*, Aug. 1986, pp. 32–35, 37—(Article).

"Turn any telephone into a complete electronic message service", *Voicemail*—(Brochure).

Pages from Company Brochure, *Televoice International, Inc.*

"VMI Big Talker", *Voicemail International, Inc.*—(Newsletter).

"Newsline", *Voicemail International, Inc.*, Oct. 1984 and Nov. 1984.

"Voiceletter No. 1", *Voicemail International, Inc.*, Dec. 1985.

"A New, More Productive Way to Use the Telephone", *Voicemail International, Inc.*—(Brochure).

"While You Were Out. . ." —(Brochure).

"?For People Who Can't Afford To Miss Messages", *Voicemail International, Inc.*, —(Brochure).

"Voicemail The electronic news service saves time, money and nerves", *Radio–Suisse Ltd.*, (Voicemail Agent for Europe)—(Brochure).

"Are You Being Robbed of Your Time. . .?", *Voicemail International, Inc.*—(Brochure).

"Voicemail Instruction Maual B–85", *Televoice International*, Nov. 1980—(Manual).

"Local Telephone Numbers" (for Voicemail) and "Televoice Is As Easy As 1, 2, 3!", *Televoice International*—(Manual).

"Voicemail Instruction Manual C–25", *Televoice International*, Jun. 1981—(Manual).

"Telephone Numbers" (for Voicemail) and "How To Use Voicemail", *Televoice International* —(Manual).

"Message Receiving/Sending" (and others), *Voicemail International, Inc.*,—(Manual).

"You Can Use Voicemail To Send And Receive Messages At Anytime Anywhere In The World", *Voicemail International, Inc.*, 1981 —(Brochure).

"Advanced User Guide", *Voicemail International, Inc.*,—(Manual).

"Voicemail's Basic User's Guide", *Voicemail International, Inc.*,—(Manual).

"Welcome To Dowphone", *Dowphone*, Jan. 1986—(Manual).

"Telephone 1–800 Check–PDR", *Officers of Medical Economics Company, Inc.*, 1986—(Circulation/Brochure).

"Turn your telephone into an efficient electronic "mailbox"", *Western Union*, Jan. 1984,—(Brochure).

"Western Union Voice Message User's Guide", *Western Union*, Jul. 1984—(Brochure).

"PSA's 24 hour reservation system", *PSA*, Sep. 1986—(Brochure).

"To Better Serve Your Business, We're On Call Days, Nights and Weekends", *Maryland Business Assistance Center*—(Brochure).

"Voice Response: Breaks Trough Call Blockage", *Business Week*, Aug. 26, 1985—(Advertisement for Preception Technology Corporation).

"Tools for heavy hitters", *Forbes*, May 6, 1985.

"The Fidelity Automated Service Telephone", *Fidelity Group*—(Manual/Brochure).

"Stockquote Hotline", *Norwest Brokerage Services*—(Brochure).

"All You Need To Get The Stock Quotes And News You Want." *Dowphone*, 1984—(Advertisement).

"The Most Respected Name In Telemarketing", *West Interactive Corporation*—(2 Brochures).

Borison, V.S., "TRANSACTION—telephone gets the fact at the point of sale", *Bell Laboratories Record*, Oct. 1975, pp. 377–383—(Article).

Demeautis, M., et al., "The TV 200 A Transactional Telephone", *Communication& Transmission n. 5*, 1985, pp. 71–82—(Article).

Eriksson, G., et al., "Voice and Data Workstations and Services in the ISDN", *Ericsson Review*, May 1984, pp. 14–19—(Article).

Schrage, Michael, "A Game Von Meister in Pursuit of Profits", *Washington Post*, Sep. 23, 1985—(Article).

Svigals, J., "Low Cost Point–Of–Sale Terminal", *IBM Technical Disclosure Bulletin*, Sep. 1982, vol. 25, No. 4, p. 1835.

Turbal, A., "Telepayment And Electronic Money The Smart Card", *Commutation& Transmission n.5*, 1982, pp. 11–20—(Article).

"Voice Mail", *Sound& Communications*, Apr. 1983, vol. 28, No. 12, pp. 84–85—(Article).

Aso, Satoshi, "Trends and Applications of Voice Output Devices", *2209 J.E.E. Journal of Electronic Engineering*, Feb. 1982, vol. 19, No. 182, pp. 102–107—(Article).

Kroemer, F., "TELEBOX", Unterrichtsblätter, year 38/1985, No. 4, pp. 131–141 (Article)—no translation.

Kroemer, F., "TELEBOX", Unterrichtsblätter, year 41/1988, No. 2, pp. 67–83 (Article)—no tranlation.

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 56h–1, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth–Oriented Systems," Restaurant Technology, Nation's Restaurant News Newspaper, Jul. 1, 1985 at 51.

"Let your fingers do the tapping . . .and the computer the talking," Modern Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

Dial Info Articles (various articles with various dates) (R0016101–R0016188).

Svigals, J., "Security Method For Remote Telephone Banking," IBM Technical Disclosure Bulletin, vol. 23, No. 12, May 1981, pp. 5306–5307 (pb424).

AT&T Conversant Voice Response Systems Historical Overview, Jan. 1988 (FD 023585–FD023596).

"All About Automated Attendant Systems," Datapro Research Corporation, Mar. 1987 (SM 10000682–SM1000691).

"New Product—Dytel's Automated Switchboard Attendant," reprinted from Business Communications Review, Mar.–Apr. 1984, pp. 39–41 (SM10006976–SM1000699).

Arbogast, James G. et al., "Home Diabetes Monitoring Through Touch–Tone Computer Data Entry and Voice Synthesizer Response," Annual Symposium on Computer Applications in Medical Care 8th Care Proceedings—Eighth Annual Symposium on Computer Applications in Medical Care, 1984 (MMI 020731).

Perdue, Robert J., et al., "AT&T Voice Processing System Architectures," AT&T Technical Journal, Sep./Oct. 1990, pp. 52–60 (MMI 024142–MMI 024151).

Sable, E.G., et al., "AT&T Network Services Architecture Capabilities, Administration and Performance," AT&T Technical Papers, International Switching Symposium—ISS '87, AT&T Network Systems, Mar. 15, 1987.

"The Stored Program Controlled Network" The Bell System Technical Journal, Sep. 1982.

The World's Telephones, a Statistical Compilation as of Jan. 1980, AT&T Long Lines, 1981 (Book).

Engineering and Operations in the Bell System, AT&T Bell Laboratories, 1983 (Book).

Joel, A.E., "A History of Engineering and Science in the Bell System, Switching Technology (1925–1975)," Bell Telephone Laboratories, 1982 (Book).
"ISDN—Proceedings of the conference held in San Francisco, Nov. 1986," OnLine, New York: London.
Raack, G.A., et al., "Customer Control of Network Services," IEEE Communications Magazine, Oct. 1984 (A2171089) also ISS 84, Florence Italy, May 1984.
Soderberg, J.H., "Machines at your Fingertips," Bell Laboratories Record, Jul. 1969 (A21717175).
Gawrys, G.W. et al., "A New Protocol for Call Handling Functions for the SPC Network," Globecrom '82 Conference Record, Nov./Dec. 1982.
Buss, C.M., "Tuning the Human/Machine Interface for AT&T Advanced 800 Service," IEEE, Jul. 1985.
Asmuth, R.L., et al., "Transaction Capabilities for Network Services," Globecom '85 IEEE Global Telecommunications Conference, New Orleans, Dec. 1985.
Mahood, Gerald K., "Human Factors in TOUCH–TONE Data Systems," Bell Laboratories Record, Dec. 1971 (A21717170).
"4 ESS System Evolution," Bell System Technical Journal, Aug. 1981.
Basinger, R.G., et al., "Calling Card Service—Overall Description and Operational Characteristics", The Bell System Technical Journal, Sep., 1982.
Confalone, D.E., et al, "Calling Card Service—TSPS Hardware, Software, and Signaling Implementation", The Bell System Technical Journal, Sep., 1982.
Eigen, D.J., et al., "Calling Card Service—Human Factors Studies", The Bell Technical Journal, Sep., 1982.
Lexis Search, Nov. 1, 1984, re: System 85 Computer Process.
Lexis Search, Jan. 28, 1985, re: Rolm Releases Four–Channel Phonemail Voice Message Unit.
Inquiry Letter To The F.C.C., From Attorneys For the Prior Title Holder Seeking Rulings That A Particular Game wold Not Be Considered A Lottery Under F.C.C. Reply Letter From The F.C.C. To The Inquiry Letter Stating The Requested Rulings.
Reply Letter From The F.C.C. To The Inquiry Letter Stating The Requested Rulings.
A page (p. 7) from literature on the Charles Schwab corporation, which is not dated nor identified.
A page (p. 4) from an annual report dated Mar. 1, 1989, though the actual date on which the report was distributed to the public is unknown.
An early brochure based on a Mar., 1989, survey by Charles Schwab & Co., Inc.
A trademark scan (U.S. Federal) indicating a first date of use for Telebroker in Jun. 18, 1988.
Bulfer, Andrew F., "AT&T's Pay–Per–View Television Trial", published in AT&T Technical Journal, May/Jun., 1987.
Friedes, A., et al., "ISDN opportunities for large business—800 service customers," IEEE International Conference on Communications, '86, Jun. 22–25, 19086, vol. 1, pp. 28–32.
Allyn, Mark R. et al., "Planning for people: Human factors in the design of a new service," Bell Laboratories Record, May 1980, pp. 155–161.
Hanson, Bruce L., et al., "No. 1A VSS New custom calling services," Bell Laboratories Record,Jun. 1980, pp. 174–180.
Aarons, D., "The Voice of the 80's," PC Magazine, vol. 4, No. 5, Mar. 5, 1985, p. 114 (A21707135).

"ACD 'Magic' from AT&T's Merlin," Telecommunications Product Review, vol. 13, No. 4, Apr. 1986 (A21708371).
"Actor Promotes Phone Services," Hammond Louisana Star, Aug. 23, 1984 (A21708860).
Allerbeck, M., "Experience with the Voice Mail System EMS 2000 Info—Results of an Acceptance Study," ISS '84 Florence, May 1984, Session 14 A, paper 6, p. 1.
Allyn, Mark R., et al., "Human Factors in the Design of a New Service," Bell Laboratories Record, vol. 58, No. 8, May 1980 (A21709530).
Amano, Furnino, et al., "Imagephone??: Integrated Voice/Data Terminal With Hand–Drawing Man–Machine Interface," IEEE, 1985 (A03701430).
Ambrosio, Johanna, "Electronic and Voice Mail; They're No Match for Each Other–Yet," Computerworld, May 19, 1986, p. 53 (A21708461).
"American–Network: Files Complaint Against Pacific Northwest Bell," Business Wire, Jun. 4, 1986 (A21708495).
"American–Network: Signs Letter of Intent to Merge L D Communications Long Distance Service into the Company," Business Wire, Aug. 14, 1984 (A21708856).
Andrews, Edmund L., "Patents: Computer System Lets TV Audience Join Show," The New York Times, Dec. 24, 1988 (A01331146).
Arnst, Catherine, Press Release, Reuters, Sep. 16, 1984 (A21708908).
"AT&T Announces Major Additions to Telemarketing Products and Services," Telephone News, Dec. 14, 1987 (A21723927).
"AT&T; AT&T Announces New Software Enhancements," Business Wire, Feb. 10, 1987 (A21707782).
"AT&T Announces New Software Enhancements for its PBX," PR Newswire, Feb. 10, 1987 (A217007779).
"AT&T Computer System will be Produced Here," The Columbus Dispatch, Sep. 9, 1985 (A01354694).
"AT&T CPU Puts Voice Recog on Any Phone," Article Source Unknown (A01354681).
"AT&T Conversant Voice Response System," Information Packet, Date Unknown.
"AT&T Inaugurates Pay–Per–View TV," Bell Laboratories Record, Jan. 1986 (A21708191) repeated (A21716664).
"AT&T's Digital MERLIN," Telecommunications Product Review, vol. 13, No. 7, Jul. 1987 (A21724743).
"AT&T's Flagship System 75: A Comprehensive Analysis of the System 85's 'Little Cousin', " Telecommunications Product Review, vol. 11, No. 7, Jul. 1984 (a21724612).
"AT&T Forms Unit to Sell Synthetic Speech Systems," Wall Street Journal, Sep. 10, 1985 (A01354689).
"AT&T Plans Computer Unit," The New York Times, Sep. 10, 1985 (A01354690).
"AT&T; Showtime's Viewer's Choice, Viacom Cable and AT&T to Test Pay–Per–View Ordering System," Business Wire, Dec. 5, 1985 (A21708103).
"AT&T Sports Service," PR Newswire, Sep. 24, 1980 (A21710432).
"The AT&T System 25," Telecommunications Product Review, vol. 13, No. 8, Aug. 1986 (A21706368).
Press Release, PR Newswire, Nov. 1, 1984 (A21708963).
AT&T Technical Journal—The 5ESS Switching System, vol. 64, No. 6, Part 2, Jul.–Aug. 1985 (A21723626).
Excerpt from AT&T Technical Journal, Sep.–Oct. 1990, pp. 53–60 (A21723942).

"Automated Switchboard Attendant Helps Insurance Company Control Net Expenses," Communications News, Jul. 1985 (A21726011).

Aversano, Nina, "The Telephone as Computer," Review of Business, Fall 1989, p. 5 (A21723928).

Ayres, Paul, "Voice Response Pay–By–Phone Matures," Computerworld, Nov. 9, 1979, p. 47 (A21725960).

Baker, Janet M., "Voice–Store–And–Forward: The Voice Message Medium," Speech Technology, Aug.–Sep. 1984 (A21724633).

Bakke, Bruce B., "Electronic Voice Mailbox: Potential for Fast Growth," BC Cycle, Jun. 29, 1984 (A21708785).

Bakke, Bruce, B., "GTE's 'Voice Mailboxes' Page the World," U.P.I., Apr. 11, 1983 (A21713359).

Barbetta, Frank, "AT&T Offers Digital PBX Enhancements," Electronic News, vol. 30, Nov. 5, 1984, p. 69 (A21708967).

Barbetta, Frank, "Custom Functions Offered in New AT&T Co. Package," Article Source Unknown.

Barkauskas, B.J., et al., "Network Services Complex: A Generalized Customer Interface to the Telephone Network," IEEE International Conference on Communications, Conference Record, vol. 2, Jun. 1983, p. 805 (A21725715).

Barlin, David, "Switch–Hitter: A Data Man's Guide to the World of Voice," Data Communications, Oct. 1984, p. 114 (A21708926).

Basso, Richard J., et al., "Expanding the Capabilities of the ? Traffic Service Position System," Bell Laboratories Record, Feb. 1983, pp. 22–27 (A21724556).

Belcher, Jerry, "Earthquakes in Mexico; U.S. Relief Includes Hardware, Experts; Cash Aid Suggested," Los Angeles Times, Sep. 22, 1985 (A21708026).

"Bell Files Tariffs on CO–Based Switching System in PA.," Communications, Date Unknown (A21725944).

Bell Laboratories Record, Aug. 1984, Cover Page and Table of Contents (A21708811).

The Bell System Technical Journal, May–Jun. 1982 (A21709814).

Excerpt from The Bell System Technical Journal, Oct. 1980, pp. 1384–1395.

Bertoglio, O., et al., "An Interactive Procedure for Voice Messaging Services in a Traditional Network," CSELT Technical Reports, vol. 12, Supplement 10, No. 3, Jun. 1984 (A21708755).

Bingham, Sanford, "Groceries By Phone," Inbound/Outbound, Aug. 1988 (A21725728).

"Some Tips on Integration," Inbound/Outbound, Aug. 1988 (A21725731).

Black, Philip, "How ISDN Services Could Make or Break the Big Network," Data Communications, Jun. 1984, p. 247 (A21708771).

"'Blast' from Data Systems Runs Under DG's AOS/VS," Computerworld, May 3, 1982, p. 38 (A21724423).

Booker, Ellis, "How to Save Big Bucks on Phone Calls," Computer Decisions, vol. 16, Nov. 15, 1984, p. 16 (A21708983).

Borchering, J. W., et al., "Customized Switching Systems," ISS '84 Florence, May 1984, Session 14 A, Paper 4, pp. 1–5 (A21725533).

Bowling, Tom, "Pay TV: A Pay–Per–Minute System Prototype," Television: Journal of the Royal Television Society, Mar.–Apr. 1984, pp. 79–83 (A21724588).

Brady, Erik, "Players, Fans Get Back in the Swing," USA Today, Date Unknown (A21706710).

Brady, Erik, "Resentful Fans Verbally Strike Back," USA Today, Date Unknown (A21706709).

Brooke, Jill, "A Hi–Tech Interactive TV Service is Planned," New York Post, Jan. 20, 1989 (A01331148).

Brown, Jim, "Contracts; Rolm Wins College Bid," Network World, mar. 9, 1987, p. 4 (A21707859).

Brown, Jim, et al., "ICA Preview; AT&T May Steal Show," Network World, May 26, 1986, p. 1 (A21708473).

Brown, Jim, "PBX Market; Rolm Beefs up CBX Line Capacity," Network World, Feb. 9, 1987, p. 4 (A21707777).

Brown, Jim, "VMX 5000 Series; Voice Messager Debuts," Network World, Oct. 13, 1986, p. 6 (A21706653).

Brown, Jim, "Voice Mail; Rolm to Accounce New Low–Cost Phonemail," Network World, Feb. 2, 1987 (A21707763).

Buckhout, Wayne, "Columbus–Born AT&T Computer Listens, Talks and Shows Promise," Article Source Unknown, Sep. 10, 1985 (A01354692).

Bulfer, Andrew F., et al., "A Trial of a National Pay–Per–View Ordering and Billing System," NCTA, 1986 (A21724669).

Burstyn, H. Paris, "Phone Features: The Next Wave," High Technology, Jun. 1986 (A21726009).

Capital Cities/ABC Video Enterprises, Inc. Teams with FDR Interactive Technologies to Explore Applications for New Telephone Technology, Capital Cities/ABC, Inc. Broadcast Group, Jan. 19, 1989 (A01331147).

Carlson, Rolf, et al., "Text–To–Speech conversion in Telecommunications," Proceedings of the Tenth International Symposium on Human Factors in Telecommunications, Jun. 1983, pp. 239–245 (A21725801).

Press Release, PR Newswire, Dec. 5, 1985 (A21708106).

Chaplin, Dwight, "A Kids' Game," Article Source Unknown, (A21706674).

Charlish, Geoffrey, "Telephone Message that Failed to Get Accross to the U.K.," Financial Times, Jan. 16, 1986 (A21708203).

Collins, Francis R., "Reality of Equal Access: Implementation Problems," Telephone Engineer & Management, vol. 88, Sep. 1, 1984, p. 128 (A21708884).

"Company News: Phone Service to be Tested," The New York Times, Jan. 20, 1989 (A01331395).

"Components," Electronic News, 1984 (A21726007).

"Computerized Telecommunications Switching Systems," Article Source Unknown.

Connolly, James, "Republican Convention Set to Test Telecommunications," Computerworld, Jul. 9, 1984, p. 17 (A21708804).

Conroy, Cathryn, "Audiotex Arrives," Monitor, Date Unknown, (W71189).

"Corporate Preoccupation with Costs Spurs Telephone Management Sales," Computerworld Focus, May 14, 1986, p. 13 (A21708457).

Cox, John D., "Talk Into Telephone, Command a Computer," The Sacramento Bee, Sep. 10, 2985 (A01354683).

"CPU, PBX Vendors Drawing Alliances," Computerworld, Apr. 23, 1984, p. 15 (A21708674).

Crawford, K. E., et al., "4A Toll Crossbar Application," The Bell System Technical Journal, vol. 57, No. 2, Feb. 1978, pp. 283–323 (A21716223).

Croxall, L. M., et al., "Operational Experience with the 5ESs™ Switch," ISS Florence, Session 42 A, Paper 4, May 1984 (A21725550).

Cummings, Steve, "Voice–Mail Systems Attract Tenative Interest," PC Week, vol. 3, No. 49, Dec. 9, 1986, p. 140 (A21707565).

Curtis, Janice, "At a Turning Point, VMX Makes Moves to Boost Voice Messaging Business," Dallas Business Courier, vol. 2, No. 13, Section 1, Jul. 14, 1986, p. 19 (A21706328).

Daniel, Heidi C., "Inventor Battles Computer Giants," South Florida Business Journal, Aug. 12, 1985 (A21707969).

Press Release, Communications Daily, vol. 4, No. 177, Sep. 11, 1984, p. 7 (A21708903).

Danner, Patrick, "Dial Info Charges Electronics Giant Disconnected Deal," San Francisco Business Times, vol. 2, No. 33, Apr. 18, 1988 (A21724767).

Excerpt from Data Communications, Sep. 1985, pp. 399–410 (A21707991).

Davis, Judith R., "Voice Messaging Systems," Patricia Seybold's Office Computing Report, vol. 10, No. 9, p. 1–28 (A21716964).

Day, J. F., et al., "Networking Voice and Data with a Digital PBX," AT&T Technology, Date Unknown (A21707584).

Whitten, W. B., II, "Advanced Interfaces Speed Delivery of Services," AT&T Technology, Date Unknown (A21707593).

"Definity Announcement Includes Other New Products," Telecommunications Product Review, vol. 16, No. 3, Mar. 1989 (A21712758).

DeLessio, N. X., et al., "An Integrated Operator Services Capability for the 5ESS System," ISS '84 Florence, May 1984, Session 22 C, Paper 3, p. 1–5 (A21725538).

Desmond, Paul, "Patented Call–Routing Tool Boon for Retail Industry; Instalink Will Use ISDN for Automatic Number ID," Network World, Aug. 1, 1988 (A21712653).

"Dial–A–Drill," The New York Times, Jan. 20, 1969 (A21725951).

"Dialing for Pennies," California Living Magazine, Aug. 12, 1984 (A21708855).

"Distributed data Processing and Messaging Systems," Data Communications, May 1986, p. 105 (A21708428).

Dix, John, "AT&T Breathes New Life into its Switch–and–Wire Beast," Network World, Oct. 27, 1986, p. 1 (A21706662).

Dix, John, "AT&T Tries Different Tack," Computerworld, Nov. 25, 1985, p. 19 (A21708097).

Dix, John, "AT&T Unleashes 'Gazelle,'" Computerworld, Apr. 30, 1984, p. 2 (A21708710).

Dix, John, "Enhancements Out for AT&T's High–End PBX," Computerworld, Nov. 12, 1984, p. 99 (A21708970).

Brown, Jim, "VMX 5000 Series: Voice Messager Debuts," Network World, Oct. 13, 1986, p. 6 (A21706653).

Dix, John, "Ford Motor Co.; Driving Down Costs with Voice Mailboxes," Network World, Jul. 14, 1986, p. 32 (A21706326).

Dix, John, "Hello, This is a Voice Mail Recording.," Network World, Jul. 14, 1986, p. 1 (A21706331).

Dix, John, "Rolm; Long–Awaited Redwood to Debut at ICA Today," Network World, Jun. 2, 1986, p. 4 (A21708493).

Dix, John, "Switch Management: DEC Tools Debut at ICA," Network World, Jun. 9, 1986, p. 8 (A21708497).

Dix, John, "Unified Messaging: AT&T Reveals New Message Blueprint," Network World, Sep. 22, 1986, p. 1 (A21706473).

Dix, John, "Voice/Data PBXs: More than Today's Users Need?." Computerworld, Apr. 23, 1984, p. 14 (A21708669).

"Dollars from Dialing," Fortune, Mar. 16, 1987, p. 10 (A21707648).

Dorros, Irwin, "Evolving Capabilities of the Public Switched Telecommunications Network," Business Communications Review, Jan.–Feb. 1981 (A21725652).

Dowd, Ann Reilly, et al., "Dollars from Dialing," Fortune, Mar. 16, 1987, p. 10 (A21707869).

Drinkwater, Lary, "Voice Processing: An Emerging Computer ? Technology," Speech Technology, Aug.–Sep. 1984, pp. 50–54 (A21708826) (illegible).

Edwards, M., "Digital PBXs Zero in on the Key Role as Hub of Office," Communications News, vol. 21, No. 12, Dec. 1984, p. 44 (A21708992).

Egly, Diana G., et al., "Mnemonic Aids for Telephone–Based Interfaces," Proceedings of the Eleventh International Symposium on Human Factors in Telecommunications, Sep. 1985 (A21725818).

Eichenwald, Kurt, "Just a Phone Call Away: More Dial–It Services," The New York Times, Apr. 16, 1988 (A21725852).

Excerpt from Electrical Communication Facilities (in Japanese), vol. 33, No. 9, 1981 (A21724248).

"Electronic Switching: Digital Central Office Systems of the World," Edited by Amos E. Joel, Jr., IEEE Press, 1982 (A21716673).

"Electronic Voice Mail Revolutionizing Communications," Tulsa Business Chronicle, vol. 5, No. 26, Jun. 30, 1986 (A21708510).

Press Release, PR Newswire, Mar. 20, 1984 (A21708647).

Elliot, Thomas R., "A Voice in the Wilderness," Computerworld, Jun. 13, 1984, p. 76 (A21708779).

Emerson, Jim, "Catalog Business," DM News, Dec. 15, 1985 (A21708115).

Emerson, Jim, "Eliminating Live Operators," DM News, Dec. 15, 1985 (A21708114).

Engelbardt, Robert M., "Island Paradise Gets System Update," Telephone Engineer & Management, vol. 88, Sep. 15, 1984, p. 104 (A21708904).

Evans, S. A., et al., "Talking and Listening to the Conversant 1 Voice System," AT&T Technology, Date Unknown (A21710392).

Exacom Model AM–200 Answering Service Monitor System, General Description Installation and Operation Manual, Issue 1, Dec. 19, 1986 (W11483).

Fantel, Hans, "Video: Movies Hot Off the Tube," The New York Times, Mar. 29, 1987 (A21707890).

"The Father of Voice Messaging," Network World, Nov. 1984, p. 57 (A21708942).

Feldman, Robert, "New AT&T Packages Designed to Spruce up Systems 75/85," MIS Week, Jun. 2, 1986, p. 30 (A21725895).

Fine, Happy, "Tavern on the Bluegrass," Eastern Basketball, Date Unknown, (A21706749).

"Firm Created After Patent Suit Against First Data," Reuters, Oct. 17, 1994 (A01331388).

Fischell, David R., et al., "Interactive Voice Technology Applications," AT&T Technical Journal, Sep.–Oct. 1990 (A34100164).

Foster, Robin Harris, "In the Forefront with Integrated Call Centers," AT&T Technology, vol. 7, No. 4, 1992 (A21712913).

Froehlich, F. E., et al., "The Switched Network Transaction Telephone System," The Bell System Technical Journal, vol. 57, No. 10, Dec. 1978, pp. 3475–3485 (A21725995).

Froehlich, Leopold, "Are Smart Buildings a Dumb Idea? If They're Going to Prosper, Shared Service Providers Will Have to Move from Telephony into Office Automation," Datamation, vol. 31, Oct. 1, 1985, p. 101 (A21708046).

Gates, G. W., et al., "Software," The Bell System Technical Journal, vol. 61, No. 5, May–Jun. 1982, pp. 863–883 (A21725913).

Gawron, L. J., et al., "Scanned–Image Technologies Bring New Ways to Conduct Business," AT&T Technology, vol. 6, Nov. 4, 1991 (A21713611).

Gawronski, Jane Donnelly, et al., "Audio Response System to Practice Mental Computation Skills," Proceedings of the Digital Equipment Computer Users Society, vol. 1, No. 2, Fall 1974, pp. 633–636 (A21725979).

Gawrys, G. W., "ISDN: Integrated Network/Premises Solutions for Customer Needs," IEEE, 1986, pp. 1.1.1–1.1.5 (A21725555).

Gaylord, D. M., "Better Health for Hospitals with DIMENSION 2000 PBX," Bell Laboratories Record, Jul.–Aug. 1981, pp. 170–173 (A21724371).

Gerald, Jeannette A., "A Voice Response System for General Aviation Pilots," Article Source Unknown (A21708877).

Gibson, Stanley, "Audix Upgrades Include Messaging, Billing, Management," Computerworld, Dec. 15, 1986, p. 29 (A21707568).

Gibson, Stanley, "Octel Links Voice Mail System to Rolm PBX," Computerworld, Dec. 8, 1986, p. 42 (A21707564).

Gillon, A. C., et al., "Voice Power Gives You Voice Messaging—And Then Some," AT&T Technology, vol. 4, No. 2, 1989 (A21712712) repeated (A21724818).

Gitten, L. J., et al., "5ESS System Evolution," ISS Florence, Session 41 A, Paper 1, May 1984 (A21725543).

Goecke, D., et al., "A Software Engineering Approach Applied to the Complete Design and Production Process of Large Communication Systems Software," ISS '84 Florence, Session 13 C, Paper 1, May 1984.

Goldstein, Mark L., "Send A Message. Now! New Digital Networks Cn Give Companies a Competitive Edge," Industry Week, Jul. 21, 1986, p. 43 (A21706347).

"Gotchal, " Edited by John A. Conway, Forbes, Mar. 10, 1986, p. 9 (A21708345).

Gottlieb, Dan, "Does the Bell Toll for Voice/Data Independents?," Purchasing, Dec. 13, 1984, pp. 103–108 (A21724641).

Grau, Jeff, "IBM Hints at Entering Voice Response Market in 1992," Article Source Unknown, Dec. 11, 1990 (A01346366).

Greene, James E., et al., "Voice Response System Sticks to the Script and Saves Time, Money and Tempers for University Students and Administrators," Communication Age, Jan. 1986 (A21724080).

Grumhaus, Audrey, "What's New in Telephone Service: Some Bad News for Nuisance Callers," The New York Times, Nov. 16, 1986 (A21725855) repeated (A21725857).

Grunbaum, Rami, "Genesis Electronics Heeds the Voice Mail Calling," The Business Journal—Sacramento, vol. 2, No. 49, Mar. 10, 1986 (A21708341).

Gunderson, Gary W., "Computer Consoles; Can Your Community Save Lives when Seconds Count?," Business Wire, Feb. 11, 1987 (A21707785).

Hafner, Katherine, "Hello Voice Mail, Goodbye Message Slips," Business Week, Jun. 16, 1986 (A21708507).

Hafner, Katherine, "System 85 Targets Leading–Edge Users: NBI," Computerworld, Sep. 5, 1983, p. 53 (A21724580).

Hafner, Katherine, "Temporary Telephones," Network World, May 2, 1984 (A21708739).

Hafner, Katherine, "The Venture Capital Adventure," Network World, Aug. 1, 1984 (A21708837).

Hamel, Bob, "Voice Messaging: VMX Gives Firms Edge," Network World, Mar. 16, 1987 (A21707864).

Hanson, Robert J., "The DSC–2000 VoiceServer System," Speech Technology, Aug.–Sep. 1984, pp. 55–65 (A21708818).

Herits, E., et al., "A New Look for the White Pages," Bell Laboratories Record, Jun. 1980 (A21709547).

Hardy, James O., et al., "Handling Coin Toll Calls—Automatically," Bell Laboratories Record, Sep. 1980, pp. 256–262 (A21710422).

Harrar, George, "Interview: Ed Landry; Making Office Connections at John Hancock," Computerworld, Apr. 14, 1986, p. 63 (A21708404).

Hasui, Kouya, et al., "Man–Machine Interfaces in Office Communication Systems," IEEE Communications Magazine, vol. 24, No. 7, Jul. 1986, pp. 18–23 (A03701435).

Coover, Edwin R., "Voice–Data Integration in the Office: A PBX Approach," IEEE Communications Magazine, vol. 24, No. 7, Jul. 1986, pp. 24–29 (A03701442).

Haszto, E. D., et al., "ALLIANCE Teleconferencing Services Boost Business Efficiency," AT&T Technology, vol. 3, No. 1, 1988 (A21724796).

Heberle, W., "Accumulation of the Signals when Using the Pushbutton Telephone for Data Entry," Proceedings of the $5^{th}$ International Symposium on Human Factors in Telecommunications, Sep. 1970 (A21725766).

Heffron, W. G., et al., "Transaction Network Service," The Bell System Technical Journal, vol. 57, No. 10, Dec. 1978, pp. 3331–3347 (A21725986).

Henricks, Mark, "DSC Makes Japanese Connection," Dallas–Fort Worth Business Journal, vol. 9, No. 30, Mar. 17, 1986 (A21708347).

Hillhouse, Joseph, "PABX, the Hub: Keeping Communications on Track," Computer Decisions, vol. 16, Nov. 15, 1984, p. 84 (A21708974).

Hindlin, Eric, "PBXs Becoming Practical Alternative to LANs," PC Week, vol. 4, Mar. 17, 1987, p. C16 (A21707870).

Hird, E. V., "Party Line Cost Cutters," Telephone Engineer & Management, vol. 90, May 1, 1986, p. 51, (A21708442).

Hollitz, John, "Giving Information without Human Intervention," The Business Journal—Sacramento, vol. 3, No. 26, Section 1, Sep. 29, 1986, p. 25 (A21706505).

"Home Shopping Network Halts Talks," The Washington Post, Feb. 19, 1987 (A21707804).

"The HORIZON Call Management System Tackles High Call Volume Demands," Telecommunications, Product Review, Jan. 1983 (A21724553).

Horton, L. A., et al., "AT&T Systems Link the University of Maryland," AT&T Technology, vol. 7, No. 2, 1992 (A21712897) repeated (A21725512).

Horwitt, Elisabeth, "AT&T Enchancements Fill Gaps in System 75 Digital PBX," Computerworld, Jun. 16, 1986 (A21708505).

Horwitt, Elisabeth, "Rolm to Unveil Low–End PBX: Digital System Bucks Feature–Rich Trend," Computerworld, Jun. 2, 1986, p. 8 (A21708489).

Howitt, Doran, "Boom For Voice Mail Systems," InfoWorld, Oct. 29, 1984, pp. 37–38 (A21708940).

Hubbard, Thomas Leo, "Richardson: High–Tech Prosperity," Dallas Magazine, vol. 66, No. 2, Feb. 1987 (A21707741).

Huber, K. M., et al., "Getting the Message with UMS," AT&T Technology, vol. 1, No. 1, 1986 (A21708123).

Swann, L., "Universal Operations Systems—Integrated Building Blocks," AT&T Technology, vol. 1, No. 1, 1986 (A21708141).

Hunter, John J., "Telephone Tag Alternative: Voice Messaging Unshackles Users from Traditional Telephone Limitations," Network World, Jul. 13, 1987 (A21714278).

Hutchins, Dexter, "The Legal Battles Over Voice Messaging," Fortune, Oct. 28, 1985 p. 104 (A21708066).

"IBM Gives Voice to PS/2, RS/5000 Platforms," Voice Processing Newsletter, vol. 10, No. 22, Aug. 1, 1991 (A01346371).

"IBM Introduces 2 Phone Systems," The New York Times, Date Unknown (A01346365).

"IBM, Inventor Reach Patent Agreement," The Washington Post, Aug. 30, 1985 (A21707976).

"IBM Reaches Patent Agreement with Inventor," U.P.I., Aug. 29, 1985 (A21707974).

"IBM–Rolm Eye CBX–SNA Link," Computerworld, Jan. 5, 1987 (A21707572).

"IBM Says New Line of Big Computers is Faster than Promised," Wall Street Journal, Date Unknown (A01346364).

"ICA Slates Huge Meeting, Exhibit; Includes Program and List of Exhibitors," Telephone Engineer & Management, vol. 88, Apr. 15, 1984, p. 96 (A21708657).

IEEE Transactions on Consumer Electronics, vol. CE–25, No. 3, Jul. 1979 (A21725141).

"Index to Theses," Edited by Geoffrey M. Paterson, et al., vol. XXVI, Part 1, 1977 (A21718028).

"Industry Leaders License Katz Interactive Technology Patents," PR Newswire, Sep. 25, 1995 (A01331383).

Press Release, Communications Daily, vol. 5, No. 126, Jun. 28, 1985, p. 5 (A21724661).

"Inside an Internetworking Voice–Mail Processor," Data Communications, Oct. 1986, p. 158 (A21706523).

"Integratec's Niche is Collecting on Delinquent Bank Card Accounts," American Banker, Aug. 10, 1988, p. 22 (A21724771).

"Card Titan Sees Gold in Electronic Commerce," Financial Service Online, Jul. 1996, p. 8 (A21724775).

"International Communications Network Service Installed by Commercial Cable," The Magazine of Bank Management, Jun. 1984, p. 126 (A21708770).

"International Information Network Acquisition," PR Newswire, Nov. 7, 1985 (A21708093).

"International Information Network Agreement," PR Newswire, Dec. 16, 1985 (A21708117).

"International Information Network Announces Agreements," PR Newswire, Feb. 12, 1986 (A21708309).

International Information Network Contract, Article Source Unknown, Feb. 25, 1986 (A21708312).

"International Information Network Earnings," PR Newswire, Dec. 9, 1985 (A21708110).

"International Information Sets Financing Program," PR Newswire, oct. 22, 1985 (A21708064).

Press Release, Communications Daily, vol. 6, No. 41, Mar. 3, 1986, p. 11 (A21708337) repeated (A21706387).

"Megaphone Intl Wins Calif. Lottery Contract," PR Newswire, Aug. 4, 1986 (A21706387).

"Introducing Voice Quote," The Washington Post, Oct. 9, 1986 (A21707805).

Press Release, Communications Daily, vol. 6, No. 189, Sep. 30, 1986, p. 7 (A21706510).

Press Release, Communications Daily, vol. 6, No. 189, Sep. 30, 1986 (A21706511).

Jenkins, Avery, "Iowa State Launching Campus Wide Network," PC Week, vol. 4, Feb. 3, 1987, p. C14(A21707767).

Jerman, Max, et al., "A CAI Program for the Home," Educational Technology, Dec. 1971, p. 49 (A21725984).

Johnson, Eric, "Analysts Say that Voice–Message Will Talk up $1 Billion," Data Communications, Jan. 1984, p. 50 (A21708551).

Johnson, J.W., et al., "Integrated Digital Services on the 5ESS™ System," ISS'84 Florence, May 1984, Session 14 A, Paper 3, pp. 1–8 (A21725525).

Johnson, David, "'Pay Radio' Tunes in Charities, Turns off Some Consumer Groups," Los Angeles Times, Part 6, Aug. 24, 1986, p. 1 (A21706399).

Excerpt from Journal of Information Processing Society of Japan (in Japanese), vol. 23, 1981 (A21724246).

Excerpt from Journal of the Institute of Electronics and Communication Engineers of Japan (in Japanese), vol. 60, No. 10, 1977 (A21725080).

Kaplan, Jeffrey M., "$4^{th}$ Generation Lacking," Network World, Oct. 6, 1986, p. 38 (A21706646).

Kaplan, Jeff, "The Uncertain Future of Centrex," Network World, Mar. 14, 1984, p. 17 (A21708640).

Karpinski, Richard, "IBM Offers Voice Processing Line," Telephony, Aug. 5, 1991, (A01346377).

"Katz Scratch Fever," Telemedia News and Views, Date Unknown (A01331216).

Katzel, Jeanine, "Selecting and Installing a Plant PBX System," Plant Engineering, vol. 37, Mar. 3, 1983 (A21713341).

Kawakami, Tokuhiro, et al., "Speaker Independent Speech Recognition and Audio Response System and Facsimile Response System," NEC Technical Journal, vol. 39, No. 7, 1986, pp. 54–79 (A21708159).

Kelleher, Joanne, "Users; Mastering DEC," Computerworld Extra!, Sep. 24, 1986, p. 61 (A21706475).

Kemezis, Paul, "The Shared Tenant–Services Debacle and Lessons from it" Data Communications, Sep. 1986, p. 94 (A21706444).

Koike, H., et al., "An Office–Use Voice StorageSystem with Elaborate User's Operativity," Proceedings of the Tenth International Symposium on Human Factors in Telecommunications, Jun. 1983, pp. 197–203 (A21725793).

Koike, Tsunehiko, et al., "Parcor–Type Audio Response Unit (in Japanese)," Article Source Unknown (A21724841).

"Kokusai Voicemail to Start International Voicemail Service," COMLINE Daily News Telecommunications, Mar. 10, 1987 (A21707861).

Kolodziej, Stan, "Where is the Electronic Messaging Explosion?," Computer World, Oct. 16, 1985, p. 21 (A21708056).

Korzeniowski, Paul, "Voice Messaging: ETS Demise Hits Rolm, Octel Users," Network World, Aug. 4, 1986, p. 1 (A21706390).

Kylin, J. C. et al., "Benefits of Integrating Data Bases into the SPC Network," ICC '79 Conference Record, vol. 1, Jun. 1979 (A21726001).

Lawson, Michael, "AT&T Leaves 'Super–PBX' money on the table for Northern Telecom," Data Communications, Sep. 1987 (A21712210).

Lazarus, George, "Pepsi Also Won the Super Bowl," Chicago Tribune, Jan. 30, 1987 (A21707647).

Lee, Linda, et al., "Meridian SL Information Services," Telesis, 1985, pp. 13–19.

Leibowitz, Ed, "The Wonder Years: Intriguing ACD Trends for the 1990s," Teleconnect, vol. 8, No. 4, Apr. 1990, p. 84 (A21712064).

Levin, David, "Private Branch Exchanges: The Best Time to Shop Might Be Right Now," Data Communications, Aug. 1987, p. 100 (A21714315).

Lineback, J. Robert, "VMX Girds for a Fight in Market it Pioneered," Electronics, May 12, 1986, pp. 55–56 (A21708453).

Lukeson, David R., "CLASS: The Smart Local Telephone Network," Proceedings of the International Congress on Technology and Technology Exchange, Oct. 1984, pp. 100–103 (A21725864).

"The LUMA Visual Telephone," Telecommunications Product Review, vol. 13, No. 7, Jul. 1986 (A21706313).

Lyman, Guy C., III, "Voice Messaging Comes of Age," Speech Technology, Aug.–Sep. 1984, pp. 45–49 (A21724634).

Mankin, Eric., "Playing TV Telephone: New System Opens Door for Audience Participation," Electronic Media, Apr. 24, 1989 (A01331389).

Marino, P. J., et al., "AT&T Communications ISDN Plans," IEEE, 1985, pp. 247–251 (A21723894) repeated (A21725560).

"Marubeni to Install Voice–Box–Mail System," Japan Economic Journal, Mar. 13, 1984, p. 9 (A21708639).

Mason, G. C. W., "Use of Recorded Announcements for Guidance of Users of Telecommunications Networks," Proceedings of the Eighth International Symposium on Human Factors in Telecommunications, Sep. 1977, pp. 257–262 (A21725784).

Massey, David K., "Voicetek Hears Sweet Success with Market Strategy," Boston Business Journal, vol. 7, No. 21, Section 1, Jul. 20, 1987, p. 6 (A21714290).

"The Master of Triva," The Sporting News, Aug. 19, 1985 (A21706671).

Matheson, David, "ISDN: The Technology has Discovered its Purpose," Telemarketing, May 1990 (A40002414).

Maxemchuk, N. F., "An Experimental Speech Storage and Editing Facility," The Bell System Technical Journal, vol. 59, No. 8, Oct. 1980 (A21724241).

Mearns, Allison B., et al., "Calling Card—Don't Tell It—Dial It," Bell Laboratories Record, May–Jun. 1982, pp. 117–119 (A21709811) repeated (A21709808).

Michaelson, Marlene, "Business Services Use 'Dial A' Formats," Contra Costa Times, Sep. 8, 1986 (A21707858).

Mier, Edwin E., "A Big Bonanza in Little Switches," Data Communications, Jun. 1984, p. 68 (A21708764).

Miles, J. B., "AT&T System Upstages its FTS Rivals at Shows; The FTS 2000 Telecommunications Contract," Government Computer News, vol. 6, No. 4, Feb. 27, 1987, p. 1 (A21707808).

Miles, J. B., "Bypass Starts to Soar; More Businesses are Avoiding the Public Phone Network as New Technologies Surface and Telecomm Costs Rise," Computer Decisions, vol. 17, Nov. 5, 1985, p. 82 (A21708087).

Miles, J. B., "Network Control Under Control; Corporations Seeking Unified Network Management Systems May Find Hope in Several New Offerings," Computer Decisions, vol. 18, Jul. 15, 1986, p. 70 (A21706340).

Excerpt from Modern Office Technology, Jul. 1986 (A21706315).

Moore, Steve, "Project Management; Anatomy of a Cutover, Part 1" Network World, Aug. 25, 1986, p. 26 (A21706408).

Moore, Steve, "Project Management; Anatomy of a Cutover, Part 2" Network World, Sep. 1, 1986, p. 35 (A21706447).

Press Release, Data Communications, Aug. 1984, p. 58 (A21708825).

"MTV—Networks Signs with American Express Affiliate FDR Interactive Technologies," Business Wire, Mar. 28, 1989 (A01331393).

"NAB in the 'Big D.,'" Broadcasting, vol. 112, Mar. 30, 1987, p. 83 (A21707892).

"National Railways' Seat Reservation System by Touch Tone Telephone," Electrical Communication Facilities, vol. 38, No. 339, 1975 (A21724984).

"Newly Formed company Assigned Several Interactive Technology Patents Following the Settlement of Multimillion Dollar Patent Lawsuit," Business Wire, Oct. 17, 1994 (A01331386).

"New AT&T Device Made in Columbus," Columbus Citizen Journal, Sep. 7, 1985 (A01354693).

"New Products Telecommunications," Sound & Communications, vol. 28, No. 12, Apr. 1983, pp. 84–85 (A21713354).

"New Systems Stem Losses from Credit Card Debt; Technology Streamlines Phone Contacts," American Banker, Aug. 10, 1988 (A21724777).

"New Voice Processing Products Mean Improved Customer Service," Article Source Unknown, (A01346357).

Newton, Harry, "AT&T Information Systems One Year Later," Office Administration and Automation, vol. 45, Jan. 1984, p. 37 (A21708557).

Newton, Harry, "Dumb Smart Switches," Teleconnect, May 1991, pp. 14–18.

Newton, Harry, et al., "Send Us Your Pre–1989 Brochures," Computer Telephony, Oct. 1996, pp. 16–26 (A01331210).

Nishikado, Iwamasa, et al., "Voice Storage System for Centralized Extension System," Review of the Electrical Communication Laboratories, vol. 32, No. 6, 1984, pp. 1010–1018 (A21725924).

Press Release, The American Banker, Oct. 20, 1986, p. 13 (A21706658).

"Northern–Telecom–2; (NT) Northern Telecom Anounces Software Feature Package," Business Wire, Feb. 18, 1987 (A21707802).

"No. Telecom Upgrades Digital PBX," Electronic News, vol. 30, Apr. 30, 1984, p. 63 (A21708708).

Nowogrocki, Jim, "City, County Speed About $1 Million on 911," St. Louis Business Journal, vol. 6, No. 43, Section 3, Aug. 4, 1986, p. 1C (A21706393).

"Office Automation Advances 'White Collar' Productivity," Dun's Business Month, vol. 126, Mar. 1986, p. 59 (A21708336).

The Official Proceedings of Speech Tech '85, Media Dimensions, Inc., Apr. 1985, Cover and General Information Pages.

Excerpt in Japanese, Article Reference Unknown (A21724849).

Press Release, PR Newswire, May 9, 1986 (A21708451).

Paznik, Megan Jill, "Voice Mail: Pitfalls and Promises," Administrative Management, vol. 48, Mar. 1987, p. 16 (A21707849).

"The PBX Marketplace: Private Branch Exchanges," Administrative Management, vol. 47, Jan. 1986, p. 45 (A21708194).

"Peek at Future of 'General Hospital'" Times–Picayune, Date Unknown (A21708536).

Pelline, Jeff, "AT&T System Links Voice to Computer," San Francisco Chronicle, Sep. 10, 1985 (A01354691).

"Perception Technology; (PCEP) Perception Technology Announces ANI, DID Enhancements," Business Wire, Feb. 27, 1987 (A21707811).

Petit J. C., et al., "GALAXIE: Toward Adaptive Distributed Control Systems," ISS '84 Florence, May 1984, Session 41 A, Paper 3.

Petrosky, Mary, "Interactive Speech System From AT&T's Business Unit," Infoworld, vol. 7, Issue 38, Sep. 23, 1986 (A21708029).

Pfister, George M., "The PBX: What Matters, What Doesn't," Datamation, vol. 30, Aug. 1, 1984, p. 121 (A21708831).

Plakias, Mark, "The Katz that Ate the Canary," Telemedia News and Views, vol. 2, No. 11, Nov. 1994 (A01331037).

Pollack, Andrew, "Audiotex: Data By Telephone," The New York Times, Jan. 5, 1984 (A21725850).

Portantiere, Nick, "AT&T Introduces System 25 Digital PBX," Electronic News, Jul. 7, 1986, p. 34 (A21706324).

Power of Attorney for USPA 5,109,404 Inventor Ronald A. Katz.

Prell, E. M., et al., "The Changing Role of the Operator," International Switching Symposium, May 1979, pp. 697–703 (A21725933).

Prince, Terry, et al., "A Telephone for the 'Checkless' Society," Bell Laboratories Record, Sep. 1972, pp. 249–253 (A21725647).

"Profit from Impulse Pay–Per–View," Advertisement for Science Dynamics Corporation, Telephony, Jul. 14, 1986 (A21706337).

"Prudential Insurance Mortgage by Phone Program," PR Newswire, Feb. 19, 1986 (A21708310) repeated (A21708311).

Pulford, Jack, "Aurona System is Built to Grow," Telephone Engineer & Management, vol. 88, Aug. 1, 1984, p. 78 (A21708841).

Putnam, Jane, "Winners," Contra Costa Sun, Aug. 14, 1985 (A21706705).

"Putting an End to Telephone Tag," ABA Banking Journal, Feb. 1987, (A21707747).

Raack, G. A., et al., "Customer Control of Network Features," ISS '84 Florence, May 1984, Session 14 A, Paper 2 (A21725520) repeated (A21725717).

Raimondi, Donna, "AT&T Debuts Primary Rate for System 85," Computerworld, Feb. 23, 1987, p. 41 (A21707806).

Rappaport, David M., "Voice Mail: Key Tool or Costly Toy," Data Communications, Oct. 1986, p. 153 (A21706526).

"Redwood by Rolm," Telecommunications Product Review, vol. 13, No. 6, Jun. 1986 (A21708487).

Rees, Norm, "Flexible Voice Response Software Speeds Development for Resellers," Speech Technology, Mar./Apr. 1988, pp. 46–49.

Results of Lexis Search Request for "Call Interactive", Date of search Aug. 5, 1996 (A01331399).

Rice, Valerie, "AT&T Enters Speech–Processing Business, Names First Customers," Investor's Daily, Sep. 10, 1985 (A01354684).

Riederer, S. A., "Conversant VIS Means Business," AT&T Technology, vol. 5, No. 4 (A21711986).

Rangnekar, S., et al., "AT&T Voice Mail Service," AT&T Technology, vol. 5, No. 4 (A21711992).

"Ring System; Provides District of Columbia with Automatic Number and Location Identification to Aid in Emergency Services Response," Business Wire, Aug. 7, 1986 (A21706396).

Press Release, PR Newswire, Mar. 3, 1986 (A21708338).

Rippeteau, Jane, "'Smart' Way to Get Message Accross," Financial Times, Jun. 12, 1986 (A21708502).

Rogers, Thomas, et al., "Scouting—A Worthwhile Trivial Pursuit," The New York Times, Aug. 9, 1985 (A21707968).

"Rolm–Corp; Appoints Harvey and Zalisk as Vice President," Business Wire, May 21, 1986 (A21708472).

"Rolm–corp; Introduces Redwood for Branch Offices and Small Businesses," Business Wire, Jun. 2, 1986 (A21708491).

"Rolm; Links PhoneMail to IBM VM Host," Business Wire, May 5, 1986 (A21708447).

"Rolm Releases Four–Channel Phonemail Voice Message Unit," Computerworld, Jan. 28, 1985.

"Rolm; Rolm Announces PhoneMail Network," Business Wire, Feb. 9, 1987 (A21707775).

"Rolm; Rolm Awarded Major contract by Columbia University," Business Wire, Mar. 2, 1987 (A21707855).

"Rolm; Rolm CBX II 9000AE Offers Abundant System Power for Applications Growth," Business Wire, Feb. 3, 1987 (A21707765).

"Rolm; 15–Node Rolm System to be Installed at University of Rochester," Business Wire, Nov. 11, 1985 (A21708096).

Roman, David R., "Building Up Your Personal Computer; Part II: Data–Input Devices," Computer Decisions, vol. 16, Mar. 1984, p. 110 (A21708630).

Rosenbaum, Art, "This 'Maniac' Spreads His Loot Around," San Francisco Chronicle, Jul. 24, 1986 (A21706875).

Rosinski, R. R., "Uses of AT&T Speech Processing Technology," AT&T Technology, vol. 5, No. 4, Date Unknown, pp. 4–5 (A21723940).

Ruhl, H. W., et al., "Sprein—A Voice I/O Mail Order System with Telephone Access," Article Source Unknown.

Salter, Stephanie, "When the 'Say Hey Kid' Met the 'Say How' Bunch," San Francisco Examiner, Date Unknown (A21706704).

Sanger, David E., "A Driving Force Leaves Rolm," The New York Times, Jan. 15, 1986 (A21708200).

Press Release, PR Newswire, Sep. 17, 1985 (A21708022).

Schindler, Paul E., Jr., "AT&T Talking up Conversant 1 Unit," Information Week, Sep. 16, 1985 (A21723912).

Schinke, David, "Speaker Independent Recognition Applied to Telephone Access Information Systems," Speech Tech '86, 1986 (A21718178).

Schulman, Henry, "AT&T Device: Talk to Computer By Phone," The Oakland Tribune, Sep. 10, 1985 (A01354685).

Schumaker, Robert M., Jr., "Phone–Based Interfaces: Research and Guidelines," Proceedings of the Human Factors Society 36th Annual Meeting, 1992, pp. 1051–1055.

Schwartz, Jeffrey, "IBM Enhances Voice Processing," Article Source Unknown (A01346375).

Schwartz, P., et al., "JISTEL 500—Time Division Exchange Including Voice and Data with Voice Messaging," ISS '84 Florence, May 1984, Session 21 A, Paper 6, pp. 1–4.

Scully, Sharon, "Product News; Saturn PBX Revamped," Network World, May 19, 1986, p. 4 (A21708470).

Seaman, John, "Voice Mail: Is Anybody Listening?," Computer Decisions, vol. 16, May 1984, p. 174 (A21708731).

"Select List of Telecommunications Providers," The Magazine of Bank Management, Aug. 1986, p. 32 (A21706373).

Semilof, Margie, "High–End Voice/Data PBXs: Voicing Doubts about Data," Network World, Mar. 31, 1986, p. 65 (A21708354).

"Senate Panel Meets Today; C&P Objects to House Decision Awarding Telephone Contract to AT&T–IS," Communications Daily, vol. 5, No. 238, Dec. 10, 1985, p. 4 (A21708112).

Session No. 13—Contemporary Developments in Addressability and Pay–Per–View, Pay–Per–View Conference, Apr. 28, 1985, p. 21 (A21707196).

Sharma, Ranjana, "PBX Users Benefit from Vitality of ACD Market," Network World, Oct. 17, 1988 (A21712686).

Shaw, Peter, "The Need for BT's Managed Information Services," British Telecommunications Engineering, vol. 11, Apr. 1992, pp. 2–6.

Shepherd, John, et al., "Managed Recorded Information Services—An Overview," British Telecommunications Engineering, vol. 11, Apr. 1992, pp. 7–13.

Shimizu, Hiroshi, "Advanced Credit Call Service," Japan Telecommunications Review, Oct. 1986, pp. 247–250.

Press Release, PR Newswire, Dec. 5, 1985 (A21708108).

Siragusa, Gail, "Voice Mail Takes Off: Send and Receive Messages by Phone," Administrative Management, vol. 47, Apr. 1986, p. 43 (A21708393).

"Small Company Initial Public Offerings: Dec. 1983," Goldhirsch Group, Inc., Mar. 1984, p. 138 (A21708624).

Smith, Tom, "Production Use of ISDN Lives up to Expectations," Network World, Feb. 26, 1990 (A21712004).

Snow, Stephen A., "Consumers Show Strong Preference for Automated Telephone Call Processing," Business Wire, Oct. 19, 1988 (A21724781).

"AT&T to Offer New Service," Reuter Newswire, Nov. 21, 1988 (A21724788).

"Soap Opera Updates Now Available in Area," Contra Costa Times/TV, May 28, 1984, p. (A21708748).

"Something for Everyone at NAB's Equipment Exhibition," Broadcasting, vol. 112, Mar. 23, 1987, p. 63 (A21707873).

Song, D, et al., "System 12 Line and Trunk Testing," ISS Florence, May 1984, Session 32 A, Paper 5, p. 1.

"Special Information Tones Provide Computer with Vital Call Data," Bell Laboratories Record, Nov. 1981 (A21710768).

Staehler, R. E., "Toward a More Automated Network—TSPS Enhancements Lead the Way," Telephony, Feb. 8, 1982, pp. 45–48 (A21725941).

"The Stamp of Approval for Voicemail," Article Source Unknown, (A21707760).

Stern, Aimee, "Cable Operators Fight Back; Pay–Per–View TV," Dun's Business Month, vol. 129, Feb. 1987 (A21707748).

Stewart, Alan, "Signaling Changes for Interconnects; NATA 86 Trade Show," Telephone Engineer and Management, vol. 90, Dec. 15, 1986, p. 72 (A21707569).

Stix, Gary, "Many Brands—Light Work," Computer Decisions, vol. 17, Sep. 10, 1985, p. 92 (A21708015).

Press Release, Communications Daily, vol. 5, No. 148, Jul. 31, 1985, p. 7 (A21708033) repeated (A21724666).

"International Information Network Earnings," PR Newswire, Sep. 30, 1985 (A21708033) repeated (A21724666).

"International Information Sets Financing Program," PR Newswire, Oct. 22, 1985 (A21708034) repeated (A21724667).

Stoffels, Bob, "REA Takes its Show on the Road: Engineering and Management Seminars," Telephone Engineer *& Management, vol. 88, May 15, 1984, p. 129 (A21708746).

"Strike Three," S. F. Progress, Aug. 7, 1985 (A21706708).

Strom, David, "Telephone or MIS Managers: Who Flips the PBX Switch; Management and Use of New Communications Technology; Connectivity—Focus on LANs," PC Week, vol. 4, Feb. 17, 1987, p. C1 (A21707798).

Sullivan, Linda, "Ameritech Services Signs Leading National Information Provider as a Master Dealer," Business Wire, Sep. 25, 1989 (A21724794).

Susca, Paul, "Telemarketing: Reach Out and Sell Someone," Network World, May 4, 1987 (A21714122).

Swan, Gary E., "Gift to Kids Wasted if Ballplayers Strike," San Francisco Chronicle, Date Unknown (A21706673).

"System 85 Voice Messaging Due in '85," Data Communications, Dec. 1984, p. 204 (A21709005).

Tagg, Ed. "Automating Operator–Assisted Calls Using Voice Recognition," Speech Technology, Mar./Apr. 1988, pp. 22–25.

Takahashi, Y., "Technique to Use Chinese Letters for the On–Line System in Marketing Business," Packaging Technology, vol. 19, No. 11, 1981 (A21724264).

Talmadge, Candice, "MetroCal Dumps Richards for K–C," Adweek, Jan. 5, 1987 (A21707728).

"Tech Deals," Phillips Business Information, vol. 7, No. 120, Jun. 25, 1996 (A01331382).

Telecommunication Technology, vol. 4, No. 4, Apr. 1986, p. 68 (A21724070).

"'Teleguide' Network Gives Tourists the Answers," ComputerData, Apr. 1983 (A21724569).

"Telephone Service Offers the Latest News on the Soaps," Augusta, GA Chronicle–Herald, Jul. 28, 1984 (A21724626).

Telephony, Sep. 29, 1980 (A21716447).

"Test Your Baseball I. Q. and Win Four Tickets to All–Star Workout Day," Contra Costa Times, Date Unknown (A21706787).

Tetschner, Walt, "PC–Based Voice Processing Software Tools," Speech Technology, Mar.–Apr. 1988, pp. 42–45.

Tetschner, Walt, "The Voicetek VTK 90 Voice Computer," Speech Technology, Mar.–Apr. 1987, pp. 102–106.

"They've Got Your Number in AT&T's first Primary–Rate Test," Data Communications, Feb. 1988, p. 15 (A21712494).

"Toshiba Telecom Introduces Universal Instrumentation for Entire Line of Key and PBX Systems," Telecommunications Product Review, vol. 11, No. 2, Feb. 1984 (A21708573).

"Tracking the Trucks," Network World, Sep. 5, 1984, p. 55 (A21708897).

Excerpt from Transportation Technology (in Japanese), vol. 30, No. 7, 1975 (A21725045).

"Trivia Promo Chips Away for Frito–Lay," Advertising Age, Date Unknown (A21707650).

"Trivial Tickets," The fort Wayne Journal–Gazette, Aug. 11, 1985 (A21706713).

"Two Firms Introduce FMS Products," Energy User News, vol. 9, Aug. 6, 1984, p. 12 (A21708848).

Tyson, David O., "Voice Mail Technology Streamlines Bank Telephone Messaging Services," The American Banker, Oct. 15, 1986, p. 13 (A21706655).
Upton, Molly, "No Clear Winner in War of Mails," Computerworld, May 19, 1986, p. 60 (A21708459).
Vanandel, M. A., "While You're Away, AUDIX Will Answer," AT&T Technology, vol. 3, No. 3, 1988 (A21724808).
"Vendor Support Eases GOP Costs," Computerworld, Aug. 27, 1984 (A21708865).
"View from Silicon Valley: Silicon Valley Companies Battle for Advantage, Compatibility," Communications Daily, vol. 4, No. 90, May 8, 1984, p. 1 (A21708743).
Virzi, Robert A., "Skip and Scan Telephone Menus: User Performance as a Function of Experience," Proceedings of the Human Factors Society 36$^{th}$ Annual Meeting—1992, p. 211–215.
Vizcarrondo, John, et al., "HOBIS: New Designs on Hotel Billing," Bell Laboratories Record,Jan. 1980 (A21709392).
"VMX Announces InfoLink: New capability in Voice Messaging Arena," Business Wire, Jun. 16, 1987 (A21714159).
"VMX/Honneywell; (VMXI) (HON) Take Voice Messaging 'Down Under' After Signing Distribution/OEM Agreement for Australia and Pacific Basin," Business Wire, Sep. 3, 1986 (A21724699) repeated (A21706451).
"VMX Inc. Adds Internal Revenue Service to Voice Message (SM) Users," Southwest Newswire, Feb. 8, 1984 (A21708587).
"VMX, Inc. Announces Another Good Quarter," Soutwest Newswire, Aug. 1, 1984 (A21708846).
"VMX, Inc. Announces First Quarter Results," Southwest Newswire, Oct. 18, 1985 (A21708063).
"VMX, Inc. Announces Landmark Approval of first Voice Message System in Japan," Southwest Newswire, Jun. 1, 1984 (A21708776).
"VMX: (VMXI) AT&T Tops List of Seven License Agreements Granted in Third Quarter," Business Wire, Sep. 9, 1986 (A21706457).
"VMX–Inc; (VMXI) Hosts First International Networking Seminar," Business Wire, Jul. 18, 1986 (A21706345).
"VMX, Inc. Provides First Voice Message (SM) Systems to Three Bell Operating Companies," Southwest Newswire, Dec. 11, 1984 (A21709007).
"VMX, Inc. Releases Audited Fiscal 1984 Financials—It was a Very Good Year," Southwest Newswire, Aug. 7, 1984 (A21708852).
"VMX; (VMXI) Voice Messaging Leader VMX, Inc. Launches New Generation Technology with VMX(R) 5000 Series," Business Wire, Oct. 7, 1986 (A21706650).
"VMX; (VMXI) Voice Messaging Patent–Holder VMX Inc. Moves into France after Signing Distribution Agreement with Jeumont–Schneider," Business Wire, Sep. 15, 1986 (A21706459).
"VMX; (VMXI) VMX 5000 Series Voice Messaging System Scores High Sales During First Quarter," Business Wire, Mar. 10, 1987 (A21707862).
Press Release, Communications Daily, vol. 4, No. 209, Oct. 26, 1984, p. 6 (A21708939).
Press Release, Computerworld, Oct. 7, 1985, p. 68 (A21708055).
Press Release, PR Newswire, Jan. 18, 1984 (A21708570).
Press Release, PR Newswire, Apr. 10, 1984 (A21708655).
Press Release, PR Newswire, Oct. 16, 1984 (A21708935).
Press Release, PR Newswire, Jan. 24, 1986 (A21708207).

Voice Mail Brochure, Radio–Suisse Ltd., Date unknown (W70172).
Voice Mail User Instructions, Voicemail International, 1991 (W70211).
"Voice Messaging Capability from VMX," The Magazine of Bank Management, Oct. 1985, p. 86 (A21708037).
Voice Processing International Conference Program, Jul. 1986 (A21723351).
Voice Processing—The New Revolution, Proceedings of the International Conference, Jul. 1986 (A21722980).
"Voice System Tunes up Automaker's Communications," Computerworld, Nov. 12, 1984, p. 35 (A21708972).
"Voice '92," Conference Information and Program, 1992 (W11651).
Press Release, Communications Daily, vol. 4, No. 110, Jun. 6, 1984, p. 9 (A21708778).
"Votrax Announces Centrum 9000, Model 5," Source Unknown, Oct. 16, 1987 (A21724763).
Waite, Andrew J., "Applying IVR Systems," Inbound/Outbound, Sep. 1988, pp. 30–39 (A21725733).
Walker, Murt, "CCS7 Offers New Paths to Revenue Generating Services," AT&T Technology, vol. 6, No. 2, 1991, pp. 8–19 (A21713600).
Wallace, Bob, "All Voice Systems Are Not Alike," Network World, Sep. 14, 1987 (A21712240).
Wallace, Bob, "Comnet '87; AT&T Announces ISDN Interface for System 85," Feb. 16, 1987.
Walters, R. E., et al., "Voice Processing Systems in British Telecom," British Telecommunications Engineering, vol. 9, Jul. 1990, pp. 88–97.
Warner, Edward, "Bank's Speech Synthesizers Greet Financiers' Calls with Daily Balance," Computerworld, Oct. 22, 1984, p. 6 (A21708937).
Watt, Peggy, "Local Phone Companies Eyeing Market for Voice Mail Services," Computerworld, Mar. 24, 1986, p. 23 (A21708350).
Watt, Peggy, "Republicans Ready for High–Tech: GOP Convention will Feature Voice Message System," InfoWorld, Aug. 27, 1984 (A21708862).
Weinstein, Bob, "Stock Exchange Gets News by Phone," Inbound/Outbound, Oct. 1988, pp. 39–46 (A21725744).
Weinstein, Bob, "Stopping the Broker's Bottleneck," Inbound/Outbound, Nov. 1988, pp. 22–23 (A21725753).
West Interactive Settles with FDR: Patent Suit Settlement Could Have major Industry Impact, Enterprise Communications, Nov. 1994 (A01331040).
Whalen, Bernie, "Marketers Expand Applications of Dial–It 900 Technology," Marketing News, Nov. 26, 1982 (A21725861).
"What's An 'Automated' Attendant," Inbound/Outbound, Jul. 1989, pp. 40–42 (A21724789).
"Whether to Answer the Phone," The Washington Post, Dec. 7, 1986 (A21707563).
Whitten, W. B., "Advanced Interfaces Speed Delivery of Services," AT&T Technologies, vol. 2, No. 3 (A21707593).
"Who Switches Data Along with Voice? PBX Users, Increasingly," Data Communications, Feb. 1987, p. 77 (A21707751).
Wilpon, Jay G., et al., "Speech Recognition: From the Laboratory to the Real World," AT&T Technical Journal, Sep.–Oct. 1990, pp. 14–24 (A21723481).
Wise, Deborah C. "This Computer Even Deciphers Noo Yawk Talk," Business Week, Sep. 23, 1985, pp. 40–42 (A01354687).

Witten, Ian H., "Making Computers Talk: An Introduction to Speech Synthesis," Prentice–Hall, 1986 (A21708148).

Witten, Ian H., "Principles of Computer Speech," Academic Press, 1982 (A21709597).

Wolfe, R. M., et al., "Telecommunications Data Base Application with the 3B™20 Processor," ISS '84 Florence, May 1984, Session 22 A, Paper 2 (A21725518).

Wollenberg, Skip, "American Express Affiliate Plans Interactive Phone Service," The Associated Press, Jan. 19, 1989 (A01331396).

Wong, Stephanie Lam, "Just a Phone Call Away," San Francisco Chronicle, Date Unknown (A21707649).

Wood, Lamont, "Stretching the Workday; Corporate Users Find that Voice Mail Saves them Time in Transmitting Important Messages," Computer Decisions, vol. 18, Dec. 2, 1986, p. 44 (A21707561).

Wood, Lamont, "Will New Alliances Forge Better Links? Private Branch Exchange Vendors Merge with Computer Firms," Computer Decisions, vol. 18, Jul. 29, 1986, p. 40 (A21706353).

Worrall, D. P., "New Custom Calling Services," The Bell System Technical Journal, vol. 61, No. 5, May–Jun. 1982 pp. 821–839 (A21725897).

"Worthwhile Trivia," The New York Times, Date Unknown (A21706711).

"Yes! Songs For You," Advertisement, Source Unknown (W73764).

Youngs, E. A., "The Changing Role of Human Factors Work Supporting New Telecommunications Products and Service," Proceedings of the Tenth International Symposium on Human Factors in Telecommunications, Jun. 1983 (A21725809).

Youngs, E. A., "Effects of Automating Operator Services on Customers and Operators," Proceedings of the Eighth International Symposium on Human Factors in Telecommunications, Sep. 1977, pp. 251–255 (A21725776).

"Zenith; Centel Plans Zenith Phonevision Pay–Per–View Cable TV System," Business Wire, Dec. 5, 1985 (A21708105).

Zeno, Charlie, "Trivia Buff's Special Party for 678 Kids," Contra Costa Times, Date Unknown (A21706788).

Zuckerman, Steve, "Ogilvy & Mather/Dallas Looks for Partner to Go After Bigger Accounts," Dallas Business Courier, vol. 2, No. 21, Section 1, Sep. 8, 1986, p. 12 (A21706454).

Complete Issue of Bell Labs News, vol. 21, No. 40, Oct. 5, 1981 (A21710762).

Complete Issue of Bell Labs News, vol. 25, No. 36, Sep. 30, 1985 (A21724662).

Complete Issue of Bell Labs News, vol. 26, No. 31, Aug. 18, 1986 (A21706398).

Complete Issue of Bell Labs News, vol. 27, No. 33, Aug. 17, 1989 (A21710741).

Bell of Pennsylvania Press Release, Mar. 13, 1984 (A21725876).

Dorros, Irwin et al., "Reaching into the Future with Stored Program Control," Bell Laboratories Record, Dec. 1980, pp. 387–393 (A21710507).

Complete Issue of Voice News, vol. 4, No. 9, Oct. 1984 (A21708913).

Complete Issue of Voice News, vol. 6, No. 7, Jul./Aug. 1986 (A21706303).

Complete Issue of Voice News, vol. 7, No. 2, Feb. 1987 (A21707730).

Complete Issue of Voice News, vol. 7, No. 3, Mar. 1987 (A21707834).

Complete Issue of Voice News, vol. 7, No. 5, May 1987 (A21714110).

Complete Issue of Voice News, vol. 7, No. 10, Oct. 1987 (A21724749).

"Network Communications Applications and Services," AT&T Communications Consultant Liaison Program, Issue 1, Jun. 1984.

"DST DST Systems Inc. Mutual Fund System Audio Response System," DST Systems, Inc., 1985 (Manual).

"Tele–Account Voice Response System Enhancements Functional Specifications Mar. 18, 1985," Mar. 18, 1985 (Manual).

"Periphonics Project Management Review Meeting," Mar. 21, 1985 (Agenda).

Boni, D., "Call Coding Report," Apr. 11, 1985 (Memo).

Vollmer, H.D., "Periphonics Management Review," May 1, 1985 (Meeting Minutes).

"DST Conversion Flow," Apr. 12, 1985 (Chart).

"Tele–Account Audit Report," Source Unknown, Jul. 26, 1984.

"Tele–Account Problem Report," Source Unknown, Jul. 26, 1984.

"100 Cool Call Things," Callcenter, Oct. 5, 2000.

Aisenberg, A., et ano., "A Distributed Control System For Public Telephones In Israel," *The 11th Convention of Electrical and Electronics Engineers In Israel*, Oct. 1979.

Aldrich, Nancy, "Choosing A Telecommunications Consultant," *Hospital Topics*, Mar./Apr. 1981, pp. 7–8.

An, Chungming, et al., "Helping The Stored Program Controlled Network Respond Quickly," *Bell Laboratories Record*, May/Jun. 1982, pp. 120–122.

Anderson, Lee, "French 'Smart Cards' Explained To American," *Telephony*, Apr. 19, 1982, pp. 100–101, 174.

Antelman, Leonard, "Hart Industries Files Bankruptcy," *Electronic News*, Dec. 7, 1981.

Arden, Bruce W., *What Can Be Automated?: The Computer Science And Engineering Research Study(COSERS)*, MIT Press, 1980.

Armstrong, Scott, "The 'Smart Card': Revolution In The Way You Pay Bills?, " *The Christain Science Monitor*, Sep. 13, 1983.

Arnold, P.A., "Card Operated Payphones Can Simplify Service And Security," *Telephony*, Sep. 27, 1982, pp. 56–57.

"Autelca Proudly Introduces TelcaStar," (Advertisement), *Telecommunications Journal*, Sep. 1985.

Ayres, Paul, "One Bank's Approach," *Bank Administration*, Jan. 1980, vol. LVI, No. 1, pp. 30–32.

Baggott, A.J., "Token Meters," *Telecommunications Journal*, Apr. 1977, pp. 35–37.

Bagley, John, et al., "Impacts Of Calling Card Service (CCS) Implementation," *GTE Automatic Electric Journal*, May–Jun. 1982, pp. 99–108.

Berenyi, Ivan, "Telefax, Smart Phones Debut In Hungary, But Service Remains Limited," *Telephony*, Sep. 23, 1985, pp. 85–86.

Bertman, Lee A., "How To Make Your Communication System Less; Communications Are Integrally Related To Cost Containment, Employee Retention, And Increased Revenue," *Hospital Topics*, Jul./Aug. 1984, pp. 6–9.

Block, Victor, "FCC Rules Pay Phones Subject To Regulation," In the Nation's Capital, *Telephony*, Jun. 3, 1985, pp. 16–18.

Bowin, William F., "Understanding the Pay Station—Types Control, Terminology, Improvements (All In Simple English)," *Telephone Engineer& Management*, Jun. 15, 1972, pp. 54–60.

Brooks, A.P., "Operand Consistency Attendant: An Associative Solution To The Data Field Consistency Problem," *IBM Technical Disclosure Bulletin*, Jun. 1976, vol. 19, No. 1, pp. 222–224.

"Broward Man Charged in Phone Fraud," Nov. 24, 1981.

Caisperlein, Hermann, et ano., "Münzfunkfernsprecher Bei Der Deutschen Bundesbahn," *Die Bundesbahn*, 1980, pp. 551–554.

"Call Up The Future With The Phonocard. Pre–Paid Card Public Telephone Box.," (Advertisement), *Telecommunications Journal*, Aug. 1979.

Cane, Alan, "The 'Electronic Cheqbook' Makes Its Debut," *Financial Times*, Aug. 9, 1983.

Cariou, J., et ano., "The Freephone Service: A New Application For The E12 System," *Commutation and Transmission*, No. 5, 1982, pp. 63–73.

Chen, David. D et ano., "Approximating The Performance Of Two Phase Locking Using An Iteration Solution Model," *The University Of Michigan Computing Research Laboratory*, Apr. 1984.

"Coin–Operated Phones—Back to the Future," *TE&M*, Mar. 15, 1987, pp. 57–59, 61.

Crabbe, E., et al., "DMTM: A Data Management And Transmission Module," *GTE Automatic Electronic Journal*, Second Quarter 1983, pp. 51–56.

Curran, L., "Revisiting the Luddites," *Byte Publications, Inc.*, vol. 9, No. 1 Jan. 1984, p. 4.

Dickerson, Brian, "Bell Cuts WATS Service To Hart," *The Miami Herald*, 1981.

Dickerson, Brian, "Canadian Firm Could Get Hart Industries' Remaining Assets," *The Miami Herald*, Jan. 16, 1982.

Dickerson, Brian, "Credibility The First Hurdle For Discount Phone Call Firm," *The Miami Herald*, Mar. 9, 1981.

Dickerson, Brian, "FCC Delay Snarls Long–Distance Phone Plan," *The Miami Herald*, Dec. 1980.

Dickerson, Brian, "Hart Delays Long Distance Service Again," *The Miami Herald*, Jun. 3, 1981.

Dickerson, Brian, "Hart Gets Approval For Long–Distance Calls," *The Miami Herald*, Apr. 29, 1981, p. 6D.

Dickerson, Brian, "Hart Industries' Lines Still Clogged," *The Miami Herald*, Jul. 15, 1981.

Dickerson, Brian, "State Orders Hart to Offer Full Refunds," *The Miami Herald*.

"80 Years Of Public Telephones," *NTT Business*, vol. 32, No. 1, 1981, pp. 8–11.

Estes, Betty A., "Charge–A–Call Spreading Rapidly," *Telephone Engineer& Management*Jan. 1, 1979, p. 89.

"FCC Approves World's First Smart Card Telephone," *Southwest Newswire*, Jul. 15, 1985.

"Fernspechapparate," Einführung, *Electrisches Nachrichtenwesen*, Band 58, vol. 1, 1983, pp. 54–55, 58–59.

Finneran, Michael F., "Data Comm Focus—Packet Switching," *Business Communications Review*, Nov./Dec. 1985, pp. 35–40.

"Fire Destroys Hart Industries," *The Miami Herald*, 1981.

"For Every Telephone Call, *Monoprint* Records The Price, The Hour, The Date, The Length, The Number, And That's Not All. . .," Advertisement, *Telecommunications Journal*, Dec. 1979.

"France: Poised To Deliver The Backbone For The Information Age," Special Advertising Section, *Data Communications*, Jun. 1983.

Freeman, Peter, *Software Systems Principles: A Survey*, 1975, pp. 136–137.

"French EFT Program Enters Its Final Phase," Newsfront, *Data Communications*, Jun. 1983.

"French Phone Booths Get Smarter", Dataletter, *Data Communications*,Oct. 20, 1982.

"The French 'Smart Card' Finally Arrives In The U.S.," *Data Communications*, Nov. 1984, pp. 263–265.

Fritz, Mark S., et ano., "Bloomington Hospital's Experience With Lifeline®," *Hospital Topic*, Sep./Oct. 1982, pp. 14–18.

Gechtman, V., et al., "Customer Line Usage Studies," *The 11th Convention of Electrical and Electronics Engineers In Israel*, Oct. 1979.

Grizzle, Jessy W., et ano., "A Decentralized Control Strategy For Multiaccess Broadcast Networks," (1982) pp. 75–88.

Grunig, R., "Halser Mailmaster F 204 Franking Machine," Hasler Review, vol. 11, No. 1, 1978.

Haberman, E., "Microcomputer Controlled Telephone Line Scanner," *The Tenth Convention of Electrical and Electronics Engineers In Israel*, Oct. 1977.

Haggerty, Maryann, "Firms Sell Varying Ways to Save," *The Miami News*, Aug. 8, 1981.

Haggerty, Maryann, "Talk Is Cheaper Long–Distance Callers Have Alternatives To Bell," *The Miami News*, Aug. 8, 1981.

Harrop, Peter, "New Electronics For Payment," (source unknown), 1982, pp. 339–342.

"Hart Industries Settles," Jul. 28, 1981.

Harvey Dean, "This BOSS Works for Residence Customers" *Bell Laboratories Record,* Mar. 1980, pp. 81–86.

"Heidi Wants A Safe, Sturdy Card And a Card–Operated Payphone That Works. You Too." Autelca, Telcastar Card (Advertisement).

Higashiyama, Fukuo, et ano., "Credit Call Service," *Janpa Telecommunications Review*, Oct. 1980, pp. 308–309.

"The History Of The Payphone," http://www./kitecom.co.uk/phone/histor1.html.

Hughes, Le A., "Busy. . .busy. . .busy. . .New Phone Service Faces First–Day Problems," *The Miami Herald*, Jul. 8, 1981.

Hughes, Le A., "Hart Users Still Hear Busy Signals," *The Miami Herald,*(date unknown).

"IC Cards Are On The Way," *TE&M*, May 15, 1987, pp. 71, 74–75.

Komatsu, Hiroyuki, "Station Message Detailed Accounting System KX–400," *IWATSU Gino*, vol. 21, No. 1, 1982.

Kutler, Jeffrey,"Experts Discussing Future Of Smart Card Wonder When Their Chip Will Come In," Back Page, *American Banker*(date unknown).

Lannon, John F., "How To Save Money And Increase Your Telecommunications Capabilities," *Hospital Topics*, Sep./Oct. 1992, pp. 30–34.

Lawser, John J., et ano., "Realizing The Potential Of The Stored Program Controlled Network," *Bell Laboratories Record*, Mar. 1979, pp. 85–89.

Lessin, Arlen R., "Smart Card Technology and How It Can Be Used," *American Banker*, May 20, 1982.

Lipman, Andrew D., "Computer II And Coinless Pay Phones," *Telephony*, Sep. 16, 1985, pp. 53–57.

Lissandrello, George J., "Future's Bright For Smart Cards," Telephone *Engineer& Management*, Nov. 1, 1985.

"Long–Distance Refunds Sought," Article, unknown source, unknown date.

Lucking, K.F.C., "Card Operated Pre–Payment Metering," Sangamo Electricity Metering, U.K., 1978.

"MAKATEL, Das Authorisierungstelefon Im Geschaftsverkehr Mit Kreditkarten", unknown source, unknown date.

Matsui, Hiroyuki, et al., "A Multi–Functional Telephone With Memory Cards Which Expand Talking Services," *IEEE Transactions On Consumer Electronics*, vol. 34, No. 3, Aug. 1988, pp. 749–758.

Meier, Albin R., "Major Real Estate Developers Building Huge New Telephone Resale And Tenant Services Industry," *Business Communications Review*, date unknown, pp. 21–22.

Merzer, Martin, "Cut–Rate Long Distance Calls Replace AT&T's Monopoly," *Miami Herald*, Sep. 29, 1980, Communications p. 6.

"Microprocessor–Controlled Telephone System," New Products, *Telecommunications Journal*, Mar. 1983, p. 151.

Mier, Edwin E., "Inside the Smart Card," *Data Communications*, Jun. 1982.

Mills, Mark, "Memory Cards: A New Concept In Personal Computing," *BYTE Publications, Inc.*, Jan. 1984, pp. 154–156, 159–160, 162, 164, 166, 168.

Peterson, Erlend D., "The Brigham Young University Touch–Tone Telephone Data Entry and Computer Voice Response Registration System: An Analysis of Student Acceptability," A Dissertation presented to the Department of Educational Administration Brigham Young University, Apr. 1985.

Schaffer, S., "'PCM' Switching System," *The Tenth Convention of Electrical and Electronics Engineers In Israel*, Oct. 1977.

"Smart Cards im Vormarsch: Elektronisches Geld," *Kommunikationstechnik*, Mar. 1985, pp. 39–41.

Walker Leigh, Vanya, "US Vanguard Visits France To Look At The Smart Card," *American Banker*, Aug. 11, 1982.

Webster's II New College Dictionary, Houghton Mifflin Company, 1995, pp. 401, 1134.

Yehoshua, Etkin, et. ano., "Design Principles And Implementation Of Business Communication Systems (TBA–62)," *The 11th Convention of Electrical and Electronics Engineers in Israel*, Oct. 1979.

Bonnell, Fraser, "Audio Response At Tymshare," Nov. 5, 1982.

Calabrese, Thomas E., "Advanced Function VRU Applications," The Travelers Companies, date unknown.

Carroll, Bob, "Linking ACDs With Audio Response Units," *telemarketing*, Sep. 1985, pp, 40–43.

"Center Closed–By–Gate Announcement," Switching Systems Division, Rockwell Telecommunications, Inc., Downers Grove, IL, Technical Data Sheet, *Rockwell International*, date unknown.

"CLASS Feature: Calling Number Delivery," *Bell Communications Research*, Technical Reference, TR–TSY–000031, Issue 2, Jun. 1988.

Cloward, William H., "Sophisticated High Speech Capacity Voice Response Applications For End Users," The Official Proceedings Of Speech Tech '86, Voice Input/Output Applications Show And Conference, Apr. 28–30, 1986, New York, NY, pp. 58–61.

"Cost–Saving Features In An ISDN Future," Telecommunications By Rockwell, *Rockwell International*, date unknown.

Friedes, A., et al., "ISDN Opportunities For Large Business–800 Service Customers," IEEE International Conference on Communications '86, Toronto, Canada Jun. 22–25, 1986, pp. 28–32.

Grant, Steven C., et ano., "The Teleconnect Guide To Automatic Call Distributors," Bookcrafters, Chelsea, MI, 1985, pp. 4–16.

"Integrated Switching System Functional Description," *Rockwell International*, date unknown.

"Gate Call Limiting Option," Communications Switching Systems Division/Dallas, TX, Technical Data Sheet, *Rockwell International*, date unknown.

"Gate Call Limiting Option," Switching Systems Division, Rockwell Telecommunications, Inc., Downers Grove, IL, Technical Data Sheet, *Rockwell International*, date unknown.

Hladik, William M., et al., "Mechanizing The Customer Access To Network Trouble Reporting Operations," Bell Communications Research,Inc., ISSLS 88, The International Symposium On Subscriber Loops And Services Proceedings, Boston, MA, Sep. 11–16, 1988, pp. 0262–0266.

"Rockwell Sales And Marketing System Option," Switching Systems Division, Rockwell Telecommunications, Inc., Downers Grove, IL, Technical Data Sheet, *Rockwell International*, date unknown.

Wang, Emil, "Intelligent Call Processing In Automatic Call Distributors," *Business Communications Review*, Jan.–Feb. 1988, pp. 22–26.

General Trading Co., Inc., VoiceStar Proposal Jan. 29, 1988 (Vz Cal 339367–339414).

Gitlin, Bob, "Impersonal Touch? Risk Management Resources' Bottom Line Outweighs Criticism of Voice Processing," Communications News, Feb. 1, 1990, vol. 27, No. 2.

Periphonics Corporation, Bank of American Versatel Home Banking System, Sep. 2, 1980 (Vz Cal 339415–339456.

Steven C. Grant and Yvonne Brooks Grant, *The Teleconnect Guide to Automatic Call Distributors*, $2^{nd}$ Ed. Jan. 1985, ("The Teleconnect Guide").

*Special Feature: The Automated Switchboard Attendant in the Telemanagement Report*, pp. 49–56, vol. 2, No. 5 (15), Jun. 1984 ("The Telemanagement Report").

Via Cable, vol. 2, No. 7 (Nov. 1982).

Via Cable, vol. 3, No. 1 (Dec./Jan. 1983).

CableData U.S. Computer System Annual Report (1982).

Letter from Douglas Semon, Director of Engineering, New Technology Development, Viacom Cable to Mr. Semir Serazi, CATV Division, Zenith Electronics Corp., dated Feb. 22, 1985.

Letter from Andrew Paff, Manager, New Business Development to Donna Brickell, Project Manager, Pacific Bell, dated May 21, 1985.

*A Trick of a National Pay–Per–view Ordering and Billing System*, published by the 1986 Convention Technical Program Committee of the National Cable Television Association (Mar. 1986).

Viacom Cable Memo dated May 30, 1986.

Customer Interface User Manual dated Oct. 18, 1986.

Viacom Memo dated Nov. 26, 1986.

Undated document entitled "Pacific/CATV Hybrid Pay–Per–View Feature".

The Yankee Group, "Cable and the Telcos: From Confrontation to Détente," Jun. 1983, pp. 162–167.

"The Voice," VCT Quarterly Newsletter, vol. 1, No. 2, Winter 1986, pp. 1–6 (Vz Cal 291279–291284).

"The Voice," VCT Quarterly Newsletter, vol. 2, No. 3, Winter 1987, pp. 1–6 (Vz Cal 291273–291278).

Reisman, Bert, "New IBM Audio Response Unit Enables Computer To Answer Information Inquiries With Voice Messages," IBM Technical Information, Jan. 24, 1964, pp. 1–3 (press release).

"IBM system/360 Component Description, IBM 7772 Audio Response Unit," IBM Systems Reference Library, File No. S360–09, Form A27–2711–0, 1966, pp. 5–29 (Vz Cal 92638–92669).

"The Mississauga Transit Demonstration of the Automatic Bus Passenger Information Concept," Prepared for the Urban Transportation Research Branch of Canadian Surface Transportation Administration Transport Canada, Montreal, Quebec, Mar. 1979, 10 pages (Vz Cal 114898–114906).

Oliver, G.P., "Architecture of System X, Part 3—Local Exchanges," *POEEJ*, vol. 73, Apr. 1980, pp. 27–34 (Vz Cal 92702–92709).

Letter from Murphy (ASI Teleprocessing) to Koprucu (International Tech) re ASI Teleprocessing and its SolidVoice System, May 27, 1980 (Vz Cal 134785).

Shepard, H., et al., "Functional Specification for Bank of America, EBR—Bank Card Systems, San Francisco, California, Aug. 8, 1980," Aug. 8, 1980 (Vz Cal 137696–137721).

"Calling Card Service Debuts in St. Louis, Marks a significant change in customer calling service," *Bell Labs News*, Oct. 5, 1961?, 2 pages (Vz Cal 134090–134090–134091; and duplicate under Vz Cal 93043–93044).

"BT–II Data Entry/Voice Response Processor," PTC, Perception Technology Corporation, 6 pages (Vz Cal 133904–133909).

Special Edition: 1983 Buyer's Guide Issue, Speech Technology, Math/Machine Voice Communications, vol. 1, No. Jan./Feb. 1983, 9 pages (introductory pages for the following articles) (Vz Cal 80988–80996).

Lea, Wayne, "Selecting the Best Speech Recognizer for the Job," *Speech Technology*, Jan/Feb. 1983, pp. 10–29 (Vz Cal 80997–81016).

Voiers, William D., "Evaluating Processed Speech Using the Diagnostic Rhyme Test," *Speech Technology*, Jan/Feb. 1983, pp. 30–39 (Vz Cal 81017–81026).

Rubinchek, Benjamin, "Toward Standards for Speech I/O Systems," *Speech Technology*, Jan/Feb. 1983, pp. 40–42 (Vz Cal 81027–81031).

Sorace, R.E., et al., "Interactive Voice and Video Game Shows Off Speech Recognizer Advances," *Speech Technology*, Jan/Feb. 1983, pp. 45–53 (Vz Cal 81032–81041).

"Voice Leaders Speak Out," *Speech Technology*, Jan/Feb. 1983, pp. 55–69 (Vz Cal 81042–81056).

Bell, Donald, et al., "Designing Experiments to Evaluate Speech I/O Devices and Applications," *Speech Technology*, Jan./Feb. 1983, pp. 70–79 (Vz Cal 81057–811066).

Stoughton, Alan M., "Personal Computers Deliver Economical Speech Aids to the Handicapped," *Speech Technology*, Jan/Feb. 1983, pp. 80–88 (Vz Cal 81067–81075).

DeSipio, Richard G., et al., "Avionics System Plays 'Ask and Tell' with Its Operator," *Speech Technology*, Jan/Feb. 1983, pp. 89–93 (Vz Cal 81076–81080).

Baker, Janet M., et al., "Aspects of Stochastic Modeling for Speech Recognition," *Speech Technology*, Jan/Feb. 1983, pp. 94–97, 105–106 (Vz Cal 81081–81087).

Prull, Dale W., "Signal Squeezing Produces High–Quality Speech in PCM Systems," *Speech Technology*, Jan/Feb. 1983, pp. 107–115 (Vz Cal 81088–81096).

Chan, Chi Foon, et al., "A Total Approach to Speech Recognition," *Speech Technology*, Jan/Feb. 1983, pp. 116–118, 121–128, 130 (Vz Cal 81097–81109).

"What's The Best Way to Analyze Speech and Other Non–Stationary Signals?" "Digital Sound" *Speech Technology*, Jan/Feb. 1983, 2 pages (Vz Cal 81110–81111).

Datavoice Technology, Publication #3850201A, Jan. 1983, Periphonics (Vz Cal 140657–140678).

Shepard, H., et al., Functional Specification for First Hawaiian Bank, 165 South King Street, Honolulu, Hawaii 96847, Original: Sep. 26, 1980, First Revision: Sep. 13,1982, Second Revision: Oct. 13, 1983, System No. 2010, Reference No. 12038 (Vz Cal137521–137564).

Computer System Proposal for Oceanic Cablevision, Honolulu, Hawaii, Nov. 17, 1983, by Business Systems, Inc., 2720 Wade Hampton Blvd., Greenville, S.C. 29615 (Vz Cal 92432–92436).

Touch Tone Data Entry/Voice Response Systems, The Perception Technology Corporation Marketing Agreement (Advance Copy), Prepared by: AT&T Information Systems, W. Gourley, R. Fortin, J. Maynes, May 1984 (Vz Cal 79189–79238).

Special Feature, The Automated Switchboard Attendant, *The Telemanagement Report*, vol. 2, No. 5(15)—Jun. 1984, pp. 50–56 (Vz Cal 114914–114921).

Uenohara, Michiyuki, "Speech Products and Their Applications in Japan," NEC Corporation, *Speech Tec* '85, pp. 273–276 (Vz Cal 92690–92693).

"The Automated Switchboard Attendant gives you. . .", Dytel, 4 pages (handwritten date Jun. 1986). (Vz Cal 85945–85948).

Kirvan, Paul F., "Centrex Positions Itself for Your Future," *Business Communications Review*, Jul/Aug. 1985, vol. 15, No. 4, pp. 2–6 (Vz Cal87688–87694).

Hills, Michael T., "Does Equal Access Have a Place in Automatic Route Selection Patterns?" *Business Communications Review*, Jul/Aug. 1985, vol. 15, No. 4, pp. 20–25 (Vz Cal 87695–87700).

McQuillan, John, "Office Automation Strategies," *Business Communications Review*, Jul.–Aug. 1985, vol. 15, No. 4, pp. 38–39 (Vz Cal 87701–87702).

AT&T Speech Response Service Product Description, (Advance Copy) Jul. 22, 1985 (Vz Cal 135020–135033).

Bank–By–Phone, Your most convenient way to bank and pay your bills, California First Bank, Form 2850–D, Rev. 9/85 (Vz Cal 92374–92386).

Kauffman, Marc, "Pay–per–view technologies: Real–time vs. store and forward," *Communications Technology*, Oct. 1985, pp. 36, 48, 50–52 (Vz Cal 92310–92314).

Ferber, Leon, "Voice response IPPV," *Communications Engineering& Design/The Magazine of*, Oct. 1985, 3 pages (Vz Cal 92729–92732).

Wienski, Robert M., et al., "Getting Ready for ISDN," *Business Communications Review*, Nov–Dec. 1985, pp. 2–6 (Vz Cal 87731–87736).

Speech Response Service, Automated Course Registration for College Administrators, AT&T, 1986, 4 pages (Vz Cal 92352–92355, and duplicate under Vz Cal 134803–134806).

Toth, Victor J., "Washington Perspective, Computer III—The Challenge That could Be the FCC's Undoing," *Business Communications Review*, Jan.–Feb. 1986, pp. 25–30 (Vz Cal 140145–140150).
Toth, Victor, "Telecom Legislation: The Time Is Almost Ripe But this Time Let's Do It Right," *Business Communications Review*, Mar.–Apr. 1986, pp. 8–12 (Vz Cal 89987–89994).
Speech Response Service Marketing Guide, Prepared by: AT&T Information Systems, Speech Response Service Product Marketing, Apr. 1986 (Vz Cal 135971–136002).
Letter from Pollpeter (Rockwell International) to Scally (Perception Technology Corporation) re Rockwell's interest in offering an Audio Response Unit as part of the Galaxy ACD (Automatic Call Distributor) Product Line, May 27, 1986, 1 page (Vz Cal 93068).
Draft Baybanks Systems, Inc. Telephone Banking Requirements Report, Project No. 1816, Prepared by: Becca Ellis, Carol Bubilis, Larry Mariasis, Nov. 7, 1986, pp. 1–37, Exhibit A and Exhibit B (Vz Cal 137618–137655).
"AT&T taking role in Ani test in Wis." (date and source illegible) (Vz Cal 82282).
Voice News, vol. 7, No. 1,Jjan. 1987, pp. 1–8 (Vz Cal 79725–79732).
Letter from Brown (CECORP) to Ferber (NUSC/CU) re request for information on CEVOICE (along with CEVOICE Demo Instructions), Apr. 29, 1987, 5 pages total including letter (Vz Cal 92408–92412).
The Aspect CallCenter, *Business Communications Review*, vol. 17, No. 3, May–Jun. 1987, pp. 43–45 (Vz Cal 90444–90472).
Letter from Glenn Appleyard (Phone Programs Inc.) to Scally (Perception Technology Corp.) re Request for Information for equipment to be used by Phone Programs Ilinois, Inc. (1 page ), (Vz Cal 92389).
The Complete Guide to the "Dial–It" Business, by InfoText Magazine, 1988, pp. 1–81 (Vz Cal 92202–92288).
Gordon, James R., "PBX Vendors Jockey for Position," *Business Communications Review*, vol. 18, No. 1, Jan.–Feb. 1988, pp. 7–10 (Vz Cal 90163–90168).
Wallace, Bob, "Amex details experience with ISDN at user meeting; First PRI user cites better productivity, service" *Network World, Inc.*, Oct. 3, 1988, 3 pages (Vz Cal 89844–89846).
Sharma, Ranjana, "On the ACD cutting edge," *Network World, Inc.*, Oct. 17, 1988, 2 pages, (Vz Cal 89842–89843).
"Phone–Based System Reduces Registration Frustration and Costs," T.H.E. (Technological Horizons in Education) Journal, Dec./Jan. 1988/89, 1 page + cover (Vz Cal 92970–92971).
Toader, Adrian, "'900'; Image the opportunities," *Voice Processing Magazine*, $3^{rd}$ quarter 1989, 1 page (Vz Cal 92413).
"Aspect Applications Guide, Application Bridge," *Aspect Telecommunication*, pp. 1, 3, 5, 7, 9, 11, 13, 15 (Vz Cal 92156–92165).
"A Load of Technology and Know–How," *Inbound/Outbound Magazine*, Oct. 1989, 4 pages (Vz Cal 92414–92417).
Teldear Telephone Data Entry & Audio Response, 5 pages, undated (Vz Cal 135886–135890).
Korzeniowski, Paul, "Goal No. 1: Cut down on fraudulent transactions. Goal No. 2: Keep the customer satisfied," undated, pp. 35–37 (Vz Cal 91810–91811).

PEP—Phone Entry Processor, 1984 Cable Data, 2 pages (Vz Cal 134831–134832).
"Data Entry/Voice Response, Today's simplest, most cost–effective approach to data entry and retrieval," by Perception Technology, 8 pages, 5/85 (Vz cal 92344–92351).
Urix Corporation Product Data, 5 pages, 1984 (Vz Cal 134815–134819).
Field, Rebecca R., "SMDR—Designing A Resource Management Tool," *Business Communications Review*, Jan.–Feb. 1985, pp. 19–27 (Vz Cal 87590–87598).
"Voice response systems offer many benefits," *Telecommunication Technology*, vol. 4, No. 4, Apr. 1986, 4 pages (Vz Cal 79092–79095).
Addendum for Columbia: The ANI Feature, Oct. 1986, pp. 1–11 (Vz Cal 96113–06123).
"Getting the Vendor's Attention", "Northern Announces ISDN for SL–1s and SL–100S", "Who Will Play in AT&T UNMA Game?" *Business Communications Review*, Nov.–Dec. 1987, 2 pages (Vz Cal 90550–90551) .
"Lo–Ad Communications, Preliminary Functional Specication," by Ken Teagan (Software Engineer), May 19, 1989, Lo–Ad Communications, pp. 1–14 (Vz Cal 92418–92431).
"Turning the Clock Back to a Good Idea," *Communications & Computer Product& Software News*, Mar./Apr. 1990, reprint by Periphonics, 1 page (Vz Cal 133903).
"Voice mail soars at TWA," undated, 1 page (Vz Ca; 134402).
Letter from Steinhoff (Dytel Corporation) to Pavelle (Symbolics Inc.) re The Automated Switchboard Attendant, enclosing brochure (The Automated Switchboard Attendant Product Notes, Issue 2–Nov. 1993 (1 page letter and 4 page brochure) Dec. 9, 1985 (Vz Cal 92317–92321).
Toth, Victor J., "Washington Perspective, The AT&T and GTE Consent Decrees—One Decree Too Many," *Business Communications Review*, (handwritten date: 1985), 1 page (Vc Cal 87599).
Neville, Thomas J., "Using ANI For Pay–Per–View Television," undated, 1 page (Vz Cal 92315).

\* cited by examiner

*Primary Examiner*—Erik Kielin

(57) ABSTRACT

A system D interfaces with a multiplicity of individual terminals Tl-Tn of a telephone network facility C, at the terminals callers are prompted by voice-generated instructions to provide digital data that is identified for positive association with a caller and is stored for processing. The caller's identification data is confirmed using various techniques and callers may be ranked and accounted for on the basis of entitlement, sequence or demographics. Callers are assigned random designations that are stored along with statistical and identification data. A break-off control circuit may terminate the computer interface aborting to a terminal for direct communication with an operator. Real-time operation processing is an alternative to stored data. The accumulation of stored data (statistical, calling order sequence, etc.) is variously processed and correlated as with developed or established data to isolate a select group or subset of callers who can be readily identified and reliably confirmed. Different program formats variously control the processing of statistical data as for auction sales, contests, lotteries, polls, commercials and so on.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-10, 15-21, 26 and 27 is confirmed.

Claims 11-14 and 22-25 are cancelled.

* * * * *